United States Patent [19]
Favor

[11] Patent Number: 5,819,056
[45] Date of Patent: Oct. 6, 1998

[54] INSTRUCTION BUFFER ORGANIZATION METHOD AND SYSTEM

[75] Inventor: John G. Favor, San Jose, Calif.

[73] Assignee: Advanced Micro Devices, Inc., Sunnyvale, Calif.

[21] Appl. No.: 649,995

[22] Filed: May 16, 1996

Related U.S. Application Data

[60] Provisional application Nos. 60/005,069 Oct. 6, 1995 and 60/005,021 Oct. 10, 1995.

Related U.S. Application Data

[63] Continuation-in-part of Ser. No. 593,765, Jan. 26, 1996, abandoned.
[51] Int. Cl.$^6$ ..................................................... G06F 9/30
[52] U.S. Cl. ..................... 395/380; 395/389; 395/386; 395/388; 395/800.23
[58] Field of Search .................................. 395/380, 800, 395/389, 386, 388, 800.23

[56] References Cited

U.S. PATENT DOCUMENTS

| | | |
|---|---|---|
| 5,101,341 | 3/1992 | Circello et al. . |
| 5,131,086 | 7/1992 | Circello et al. . |
| 5,185,868 | 2/1993 | Tran . |
| 5,201,056 | 4/1993 | Daniel et al. . |
| 5,222,244 | 6/1993 | Carbine et al. . |
| 5,233,696 | 8/1993 | Suzuki . |
| 5,438,668 | 8/1995 | Coon et al. . |
| 5,488,710 | 1/1996 | Sato et al. . |
| 5,513,330 | 4/1996 | Stiles . |

FOREIGN PATENT DOCUMENTS

| | | |
|---|---|---|
| 0 380 854 A3 | 8/1990 | European Pat. Off. . |
| 0 454 984 A2 | 11/1991 | European Pat. Off. . |
| 0 467 152 | 1/1992 | European Pat. Off. . |
| 92 06426 | 4/1992 | European Pat. Off. . |
| 0 498 654 A3 | 8/1992 | European Pat. Off. . |
| 0 506 972 A1 | 10/1992 | European Pat. Off. . |
| 0 651 322 | 5/1995 | European Pat. Off. . |
| 2 263 985 | 8/1993 | United Kingdom . |
| 2 263 987 | 8/1993 | United Kingdom . |
| WO 93/01546 | 1/1993 | WIPO . |
| WO 93/20507 | 10/1993 | WIPO . |

*Primary Examiner*—William M. Treat
*Attorney, Agent, or Firm*—Skjerven Morrill MacPherson Franklin & Friel, L.L.P.; Ken J. Koestner

[57] ABSTRACT

Variable-length instructions are prepared for simultaneous decoding and execution of a plurality of instructions in parallel by reading multiple variable-length instructions from an instruction source and determining the starting point of each instruction so that multiple instructions are presented to a decoder simultaneously for decoding in parallel. Immediately upon accessing the multiple variable-length instructions from an instruction memory, a predecoder derives predecode information for each byte of the variable-length instructions by determining an instruction length indication for that byte, assuming each byte to be an opcode byte since the actual opcode byte is not identified. The predecoder associates an instruction length to each instruction byte. The instructions and predecode information are applied to an instruction buffer circuit in a memory-aligned format. The instruction buffer circuit prepares the variable-length instructions for decoding by converting the instruction alignment from a memory alignment to an instruction alignment on the basis of the instruction length indication. The instruction buffer circuit also assists the preparation of variable-length instructions for decoding of multiple instructions in parallel by facilitating a conversion of the instruction length indication to an instruction pointer.

85 Claims, 13 Drawing Sheets

| | | |
|---|---|---|
| 0000 | 01110100 | 0100 |
| 0001 | 10110100 | 0110 |
| 0010 | 11110000 | 0100 |
| 0011 | 10110010 | 1101 |
| 0100 | 10110011 | 1100 |
| 0101 | 10000001 | 0101 |
| 0110 | 11000010 | 1000 |
| 0111 | 11001010 | 0110 |
| 1000 | 11010010 | 1100 |
| 1001 | 11010010 | 1001 |
| 1010 | 10100100 | 1100 |
| 1011 | 11010110 | 1011 |
| 1100 | 11101000 | 1100 |
| 1101 | 00101000 | 1101 |
| 1110 | 00100010 | 1110 |
| 1111 | 10110000 | 1111 |

FIG. 8

INSTRUCTION BUFFER ORGANIZATION METHOD AND SYSTEM

RELATED APPLICATIONS

This application is a continuation-in-part of application Ser. No. 08/593,765, filed on Jan. 26, 1996, now abandoned, which claims the benefit of U.S. Provisional application Ser. No. 60/005,069, filed Oct. 6, 1995 and U.S. Provisional application Ser. No. 60/005,021, filed Oct. 10, 1995.

BACKGROUND OF THE INVENTION

1. Field of the Invention

This invention relates to processors. More specifically, this invention relates to processors having an instruction decoder for decoding multiple instructions simultaneously and an instruction buffer circuit that converts instructions from a memory alignment to in instruction alignment for preparing instructions for decoding in parallel.

2. Description of the Related Art

Advanced microprocessors, such as P6-class x86 processors, are defined by a common set of features. These features include a superscalar architecture and performance, decoding of multiple x86 instructions per cycle and conversion of the multiple x86 instructions into RISC-like operations. The RISC-like operations are executed out-of-order in a RISC-type core that is decoupled from decoding. These advanced microprocessors support large instruction windows for reordering instructions and for reordering memory references.

In a microprocessor having a superscalar architecture, multiple computer instructions are transferred from a memory, decoded and executed simultaneously so that the execution of instructions is accelerated. A RISC-type processor typically has no problem decoding multiple instructions per cycle because all instructions are the same length. When all instructions are the same length, multiple instructions are easily transferred from memory in parallel because the memory locations of all instructions is known or readily ascertainable, allowing multiple instructions to be simultaneously transferred to instruction registers inside the processor. However, many microprocessors and computers, such as x86 processors that have a complex instruction set computer (CISC) type architecture, use a CISC-type variable-length instruction set in which different instructions have different instruction lengths, varying from one byte (8 bits) to fifteen bytes (120 bits) in length. Thus the locating of multiple instructions is a sequential process, and therefore slow process, because one instruction must be decoded to determine the length of the instruction before the starting location of the next decodable instruction is ascertained.

Decoding of multiple x86 instructions in parallel has additional difficulties. One difficulty is that instructions are supplied to a processor from memory in a memory alignment. The decoder operates on the instructions in an instruction alignment. To rapidly decode instructions in parallel, the alignment of the instructions must be rapidly converted from the memory alignment to the instruction alignment.

What is needed is a system and method for accessing a plurality of variable-length instructions and preparing the variable-length instructions for decoding of multiple instructions in parallel. One aspect of this system and method is a technique for determining the starting point of an instruction and, from this determination, converting instructions from a memory alignment to an instruction alignment.

SUMMARY OF THE INVENTION

In accordance with the present invention, variable-length instructions are prepared for simultaneous decoding and execution of a plurality of instructions in parallel by reading multiple variable-length instructions from an instruction source and determining the starting point of each instruction so that multiple instructions are presented to a decoder simultaneously for decoding in parallel. Immediately upon accessing the multiple variable-length instructions from an instruction memory, a predecoder derives predecode information for each byte of the variable-length instructions by determining an instruction length indication for that byte, assuming each byte to be an opcode byte since the location of the actual opcode bytes are not known. The predecoder associates an implied instruction length to each instruction byte. The instructions and predecode information are applied to an instruction buffer circuit in a memory-aligned format. The instruction buffer circuit prepares the variable-length instructions for decoding by converting the instruction alignment from a memory alignment to an instruction alignment on the basis of the instruction length indication. The instruction buffer circuit also assists the preparation of variable-length instructions for decoding of multiple instructions in parallel by facilitating a conversion of the instruction length indication to an instruction pointer.

In accordance with one embodiment of invention, an apparatus receives a plurality of variable-length instructions arranged in a memory alignment from an instruction source and prepares the instructions for execution. The apparatus includes an instruction cache connected to the instruction source and has a plurality of instruction storage elements and a corresponding plurality of predecode storage elements. Each of the variable-length instructions is stored in one or more instruction storage elements in the memory alignment and the predecode storage elements store predecode information corresponding to the variable-length instructions stored in each instruction storage element. The apparatus also includes a predecoder connected to the instruction cache, which accesses the variable-length instructions, assigns predecode information indicative of instruction length to the instruction storage elements assuming each instruction storage element stores the first byte of a variable-length instruction, and designates the variable-length instructions as first-type and second-type variable-length instructions based on the information indicative of instruction length. The predecoder holds the variable-length instructions and the corresponding predecode information, converts the variable length instructions from the memory alignment to an instruction alignment, and designates the first instruction byte location of a variable-length instruction. A decoder circuit is connected to the instruction cache and receives the variable-length instructions in the instruction alignment and the predecode information. The decoder circuit includes a plurality of first type decoders and a second type decoder. The first type decoders receive a plurality of first-type variable-length instructions, each beginning at the designated first instruction byte locations, and decodes the plurality of first-type variable-length instructions in parallel. The second type decoder decodes a second-type variable length instruction.

Many advantages are achieved using the described system and method. Multiple instructions are advantageously decoded per cycle in a processor architecture that resists decoding in parallel. An inherently serial decoding operation is advantageously converted to a parallel operation. Instructions that can execute in parallel and instructions that cannot are recognized prior to decoding so that decoding in parallel is advantageously accomplished only for those instructions that would benefit from decoding in parallel. Predecode information is advantageously derived and stored as a combination of instruction length and program counter information so that data pointers are easily determined and instructions easily accessed.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 8 is a block diagram of a memory including sixteen addressable memory locations holding sixteen instruction byte values that make up, for example, three variable length instruction codes, in combination with predecode bit codes indicative of following-instruction location information.

DETAILED DESCRIPTION OF THE PREFERRED EMBODIMENTS

Figure 1:
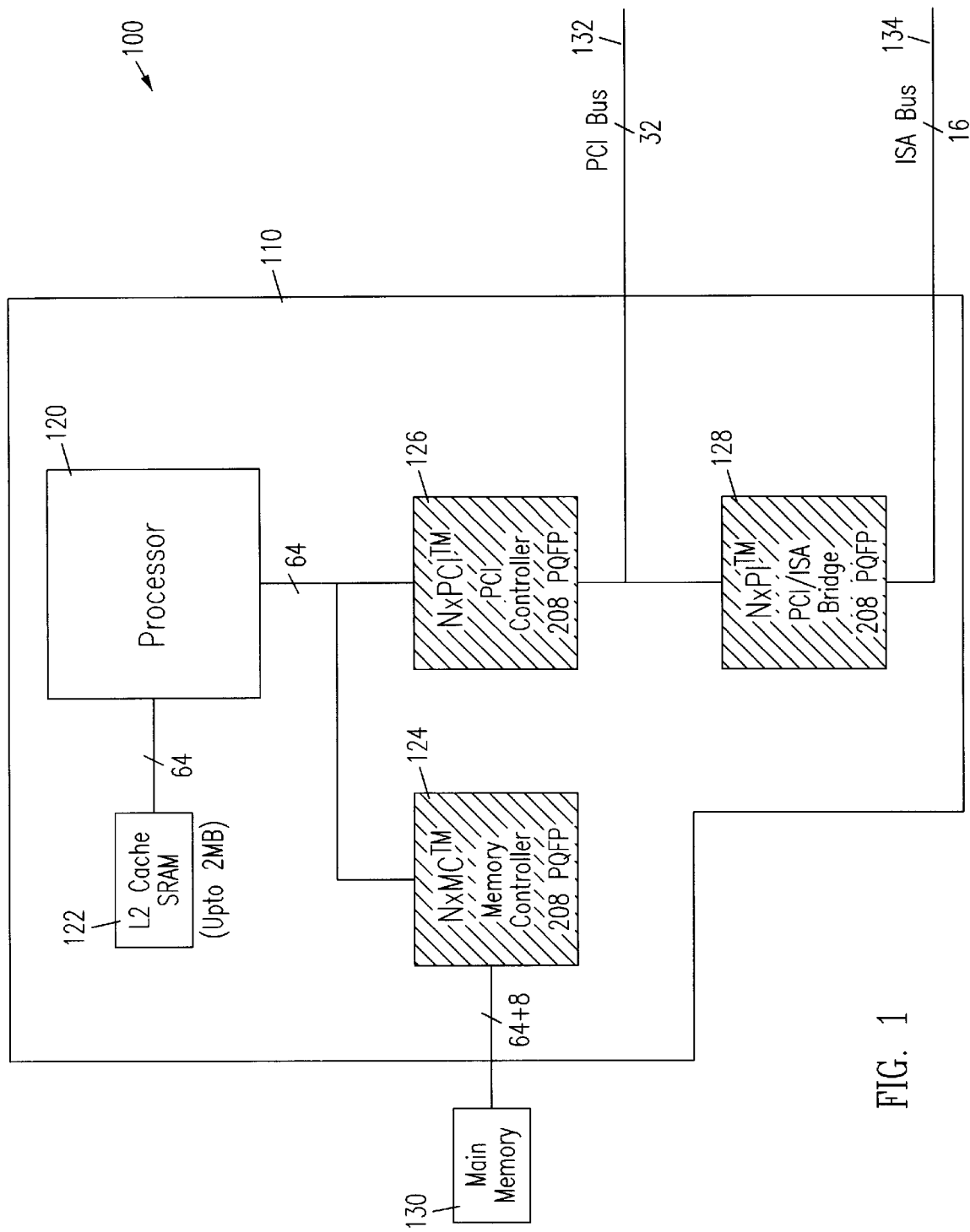
FIG. 1 is a block diagram which illustrates a computer system in accordance with one embodiment of the present invention.

Referring to FIG. 1, a computer system 100 is used in a variety of applications, including a personal computer application. The computer system 100 includes a computer motherboard 110 containing a processor 120 in accordance with an embodiment of the invention. Processor 120 is a monolithic integrated circuit which executes a complex instruction set so that the processor 120 may be termed a complex instruction set computer (CISC). Examples of complex instruction sets are the x86 instruction sets implemented on the well known 8086 family of microprocessors. The processor 120 is connected to a level 2 (L2) cache 122, a memory controller 124 and local bus controllers 126 and 128. The memory controller 124 is connected to a main memory 130 so that the memory controller 124 forms an interface between the processor 120 and the main memory 130. The local bus controllers 126 and 128 are connected to buses including a PCI bus 132 and an ISA bus 134 so that the local bus controllers 126 and 128 form interfaces between the PCI bus 132 and the ISA bus 134.

Figure 2:
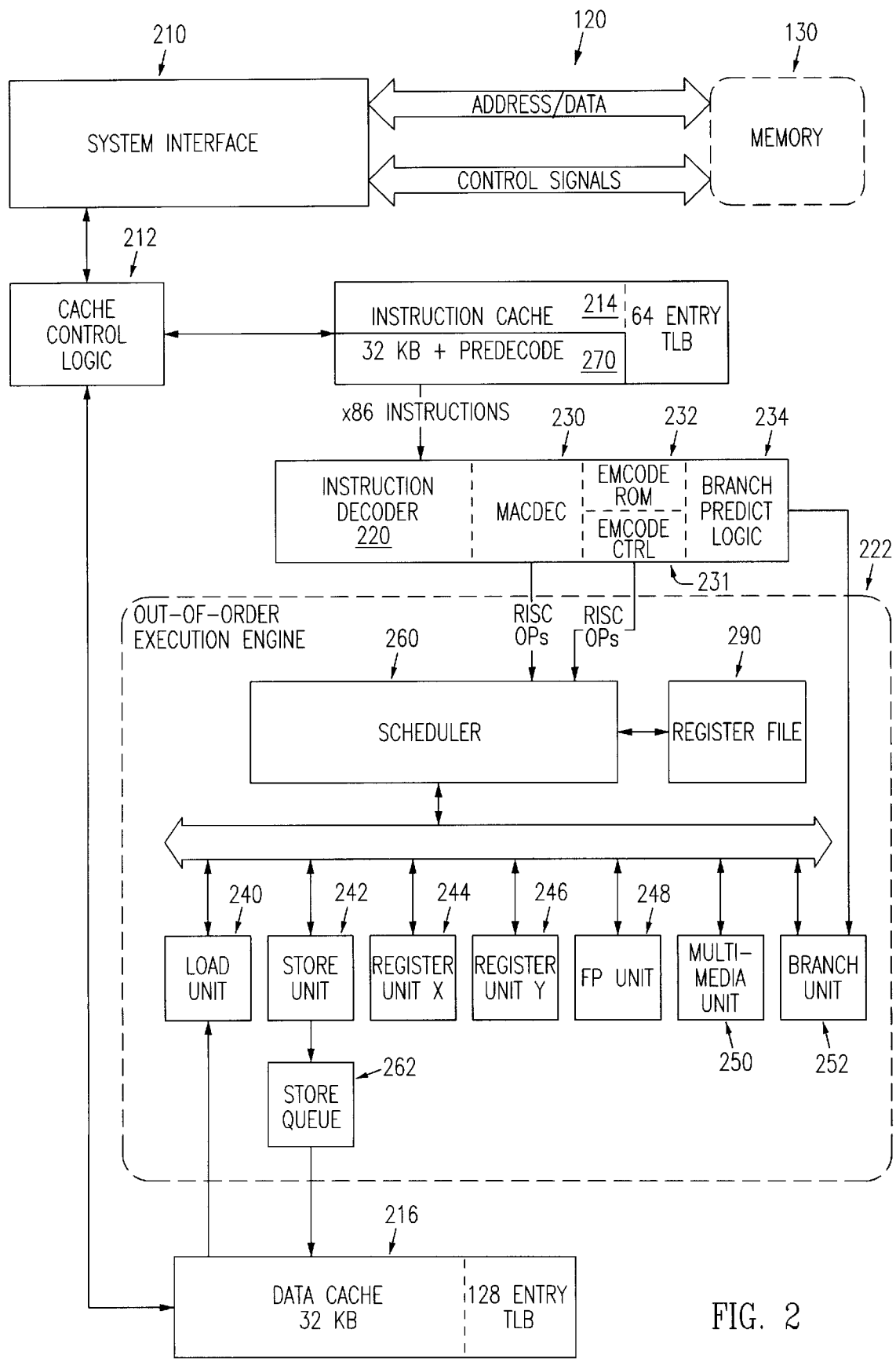
FIG. 2 is a block diagram illustrating one embodiment of processor for usage in the computer system shown in FIG. 1.

Referring to FIG. 2, a block diagram of an embodiment of processor 120 is shown. The core of the processor 120 is a RISC superscalar processing engine. Common x86 instructions are converted by instruction decode hardware to operations in an internal RISC86 instruction set. Other x86 instructions, exception processing, and other miscellaneous functionality is implemented as RISC86 operation sequences stored in on-chip ROM. Processor 120 has interfaces including a system interface 210 and an L2 cache control logic 212. The system interface 210 connects the processor 120 to other blocks of the computer system 100. The processor 120 accesses the address space of the computer system 100, including the main memory 130 and devices on local buses 132 and 134 by read and write accesses via the system interface 210. The L2 cache control logic 212 forms an interface between an external cache, such as the L2 cache 122, and the processor 120. Specifically, the L2 cache control logic 212 interfaces the L2 cache 122 and to an instruction cache 214 and a data cache 216 in the processor 120. The instruction cache 214 and the data cache 216 are level 1 (L1) caches which are connected through the L2 cache 122 to the address space of the computer system 100.

The instruction cache 214 is a 16 KByte instruction cache with associated control logic. The instruction cache 214 is organized as a two-way set associative cache having of line size of 32 Bytes. The instruction cache 214 has a total physical storage of 24 Kbytes for storing 16 Kbytes of instruction and 8 Kbytes of predecode information. This physical storage is configured as three units, including two instruction units and one predecode information unit, of a 512×128 cache RAM structure. The instruction cache 214 is logically dual-ported including a read port and a write port, although the cache has only a single physical port.

Instructions from main memory 130 are loaded into instruction cache 214 via a predecoder 270 for anticipated execution. As the instruction cache 214 is filled with instructions, the predecoder 270 predecodes the instruction bytes, generating predecode information that is also stored in the instruction cache 214. Data in the instruction cache 214 are subsequently transferred to begin decoding the instructions, using the predecode information to facilitate simultaneous decoding of multiple x86 instructions. A fundamental impediment to efficient decoding of x86 instructions is the variable-length nature of these instructions in which x86 instruction length varies in a range from one word to fifteen words. The predecode information facilitates decoding of variable-length instructions by specifying the length of each x86 instruction, thereby designating the instruction boundaries for typically a plurality of x86 instructions. Once the instruction boundaries are known, multiple instruction decoding in parallel is substantially simplified.

The predecoder 270 generates predecode bits that are stored in combination with instruction bits in the instruction cache 214. The predecode bits, for example 3 bits, are fetched along with an associated instruction byte (8 bits) and used to facilitate multiple instruction decoding and reduce decode time. Instruction bytes are loaded into instruction cache 214 thirty-two bytes at a time in a burst transfer of four eight-byte quantities. Logic of the predecoder 270 is replicated sixteen times so that predecode bits for all sixteen instruction bytes are calculated simultaneously immediately before being written into the instruction cache 214. Instructions in instruction cache 214 are CISC instructions, referred to as macroinstructions. An instruction decoder 220 converts CISC instructions from instruction cache 214 into operations of a reduced instruction set computing (RISC) architecture instruction set for execution on an execution engine 222. A single macroinstruction from instruction cache 214 decodes into one or multiple operations for execution engine 222.

Figure 4:
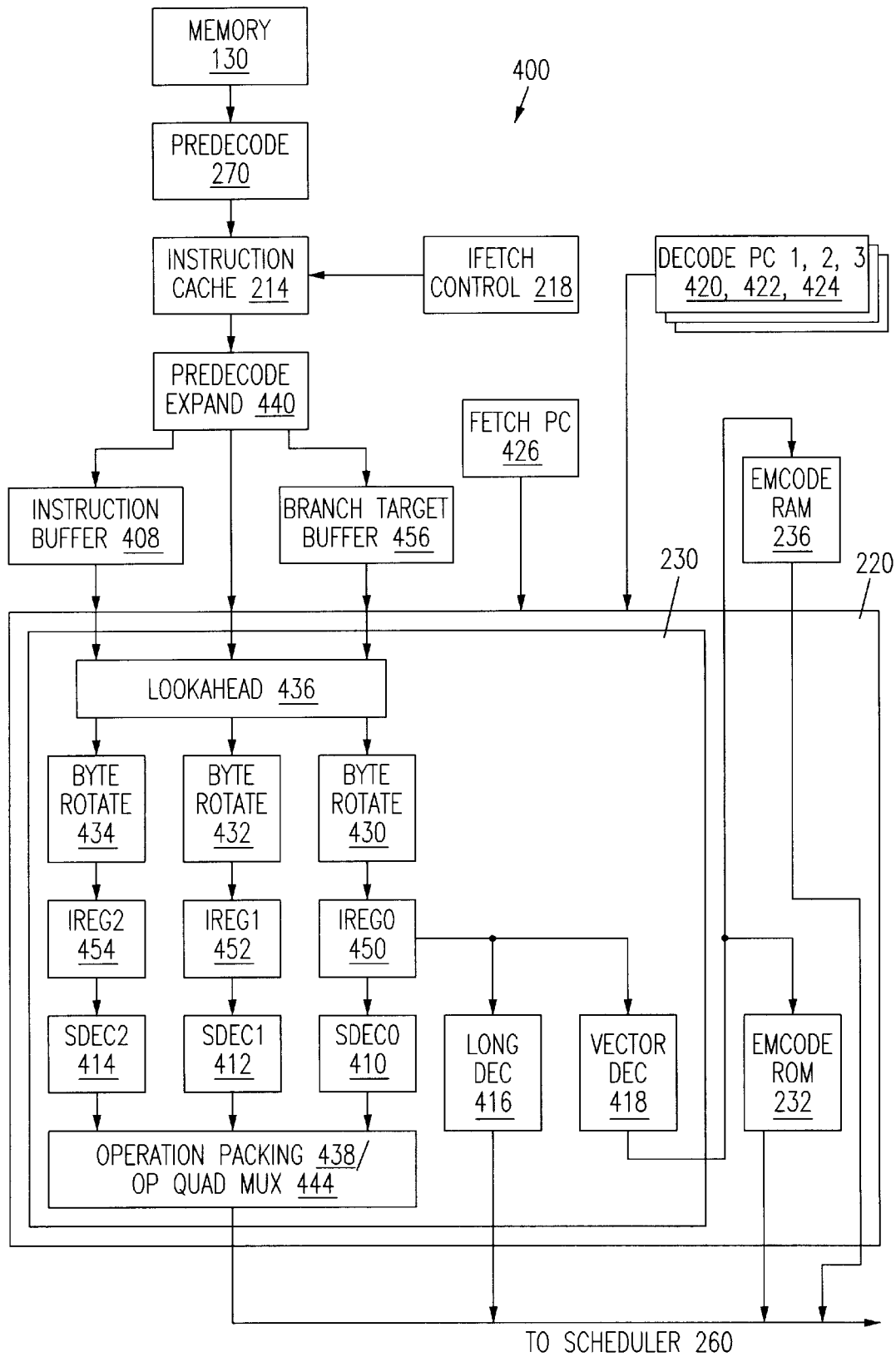
FIG. 4 is a schematic block diagram showing an embodiment of an instruction decoder used in the processor shown in FIG. 2.

Instruction decoder 220 has interface connections to the instruction cache 214 and an instruction fetch control circuit 218 (shown in FIG. 4). Instruction decoder 220 includes a macroinstruction decoder 230 for decoding most x86 instructions, an instruction decoder emulation circuit 231 including an emulation ROM 232 for decoding instructions including complex instructions, and branch predict logic 234 for branch prediction and handling. Several types of macroinstructions are defined relating to the general type of operations into which the macroinstructions are converted. The general types of operations are register operations (RegOps), load-store operations (LdStOps), load immediate value operations (LIMMOps), special operations (SpecOps) and floating point operations (FpOps).

Execution engine 222 has a scheduler 260 and six execution units including a load unit 240, a store unit 242, a first register unit 244, a second register unit 246, a floating point unit 248 and a multimedia unit 250. The scheduler 260 distributes operations to appropriate execution units and the execution units operate in parallel. Each execution unit executes a particular type of operation. In particular, the load unit 240 and the store unit 242 respectively load (read) data or store (write) data to the data cache 216 (L1 data cache), the L2 cache 122 and the main memory 130 while executing a load/store operation (LdStOp). A store queue 262 temporarily stores data from store unit 242 so that store unit 242 and load unit 240 operate in parallel without conflicting accesses to data cache 216. Register units 244 and 246 execute register operations (RegOps) for accessing a register file 290. Floating point unit 248 executes floating point operations (FpOps). Multimedia unit 250 executes arithmetic operations for multimedia applications.

Scheduler 260 is partitioned into a plurality of, for example, 24 entries where each entry contains storage and logic. The 24 entries are grouped into six groups of four entries, called Op quads. Information in the storage of an entry describes an operation for execution, whether or not the execution is pending or completed. The scheduler monitors the entries and dispatches information from the entries to information-designated execution units.

Figure 3:
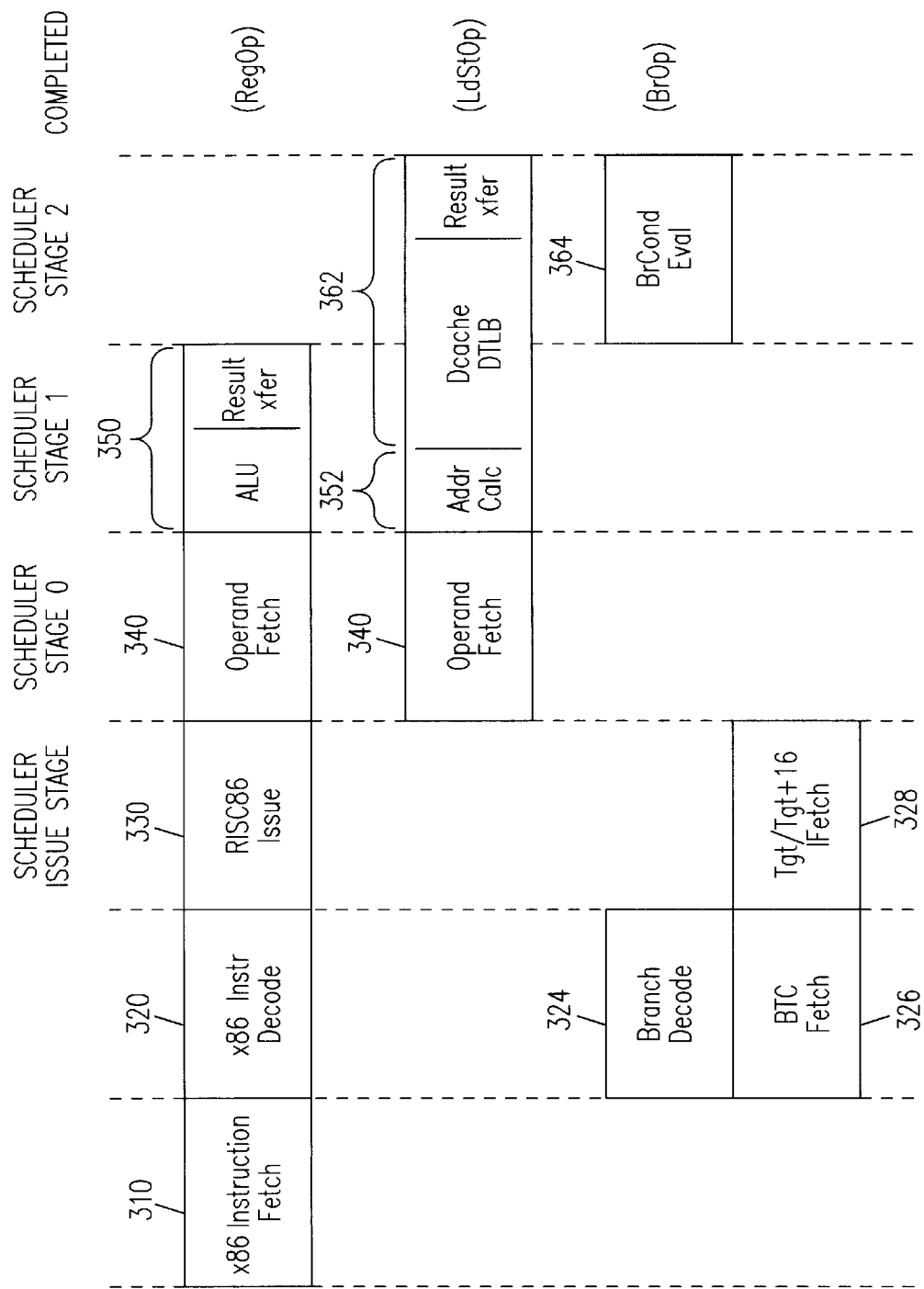
FIG. 3 is a timing diagram which illustrates pipeline timing for an embodiment of the processor shown in FIG. 2.

Referring to FIG. 3, processor 120 employs five and six stage basic pipeline timing. Instruction decoder 220 decodes two instructions in a single clock cycle. During a first stage 310, a fetch cycle stage, the instruction fetch control circuit 218 fetches CISC instructions into instruction cache 214. Predecoding of the CISC instructions during stage 310 reduces subsequent decode time. During a second stage 320, a decode cycle stage, instruction decoder 220 decodes instructions from instruction cache 214 and loads an Op quad into scheduler 260. During a third stage 330, an issue cycle stage, scheduler 260 scans the entries and issues operations to corresponding execution units 240 to 252 if an operation for the respective types of execution units is available. Operands for the operations issued during stage 330 are forwarded to the execution units in a fourth stage 340. For a Regop, the operation generally completes in the next clock cycle which is stage 350, but LdStOps require more time for address calculation 352, data access and transfer of the results 362.

The decode cycle stage 320 includes two half cycles. In a first decode half cycle, the instruction cache 214 is accessed, the D-bit is checked to determine whether the predecode instruction length bits are to be adjusted for D-bit status, and the predecode bits are converted from an indication of length into a pointer. In a second decode half cycle, it is determined whether the instruction cache 214 or a branch target buffer (BTB) is the source of instructions for decoding, and it is further determined whether this instruction source is to provide the instructions or if an instruction buffer is to source the instructions. Also in the a second decode half cycle, the instruction bytes and predecode information are presented to rotators, data is rotated by the rotators to find the starting instruction byte, additional bytes of the first instruction and the predecode information associated with the starting instruction byte. A predecode index is used to rotate the instruction byte data to find a second instruction byte of an instruction and additional bytes of the second instruction. Specifically, low-order bits of a program counter control a first rotator to rotate a first instruction. Subsequent rotators are controlled to rotate subsequent instructions under control of the predecode information of the immediately preceding instruction. Also in the a second decode half cycle, output instruction data are rotated to determine various other fields within an instruction register, any OF prefix is stripped from an instruction, the instruction and control bits are registered, and instruction buffers are updated and the updated data is presented to rotators.

For branch operations, instruction decoder 220 performs a branch prediction 324 during an initial decoding of a branch operation. A branch unit 252 evaluates conditions for the branch at a later stage 364 to determine whether the branch prediction 324 was correct. A two level branch prediction algorithm predicts a direction of conditional branching, and fetching CISC instructions in stage 310 and decoding the CISC instructions in stage 320 continues in the predicted branch direction. Scheduler 260 determines when all condition codes required for branch evaluation are valid, and directs the branch unit 252 to evaluate the branch instruction. If a branch was incorrectly predicted, operations in the scheduler 260 which should not be executed are flushed and decoder 220 begins loading new Op quads from the correct address after the branch. A time penalty is incurred as instructions for the correct branching are fetched. Instruction decoder 220 either reads a previously-stored predicted address or calculates an address using a set of parallel adders. If a previously-predicted address is stored, the predicted address is fetched in stage 326 and instructions located at the predicted address are fetched in stage 328 without a delay for adders. Otherwise, parallel adders calculate the predicted address.

In branch evaluation stage 364, branch unit 252 determines whether the predicted branch direction is correct. If a predicted branch is correct, the fetching, decoding, and instruction-executing steps continue without interruption. For an incorrect prediction, scheduler 260 is flushed and instruction decoder 220 begins decoding macroinstructions from the correct program counter subsequent to the branch.

Referring to FIG. 4, a schematic block diagram illustrates an embodiment of an instruction preparation circuit 400 which is connected to the main memory 130. The instruction preparation circuit 400 includes the instruction cache 214 that is connected to the main memory 130 via the predecoder 270. The instruction decoder 220 is connected to receive instruction bytes and predecode bits from three alternative sources, the instruction cache 214, a branch target buffer (BTB) 456 and an instruction buffer 408. The instruction bytes and predecode bits are supplied to the instruction decoder 220 through a plurality of rotators 430, 432 and 434 via instruction registers 450, 452 and 454. The macroinstruction decoder 230 has input connections to the instruction cache 214 and instruction fetch control circuit 218 for receiving instruction bytes and associated predecode information. The macroinstruction decoder 230 buffers fetched instruction bytes in an instruction buffer 408 connected to the instruction fetch control circuit 218. The instruction buffer 408 is a sixteen byte buffer which receives and buffers up to 16 bytes or four aligned words from the instruction cache 214, loading as much data as allowed by the amount of free space in the instruction buffer 408. The instruction buffer 408 holds the next instruction bytes to be decoded and continuously reloads with new instruction bytes as old ones are processed by the macroinstruction decoder 230. Instructions in both the instruction cache 214 and the instruction buffer 408 are held in "extended" bytes, containing both memory bits (8) and predecode bits (5), and are held in the same alignment. The predecode bits assist the macroinstruction decoder 230 to perform multiple instruction decodes within a single clock cycle.

Instruction bytes addressed using a decode program counter (PC) 420, 422, or 424 are transferred from the instruction buffer 408 to the macroinstruction decoder 230. The instruction buffer 408 is accessed on a byte basis by decoders in the macroinstruction decoder 230. However on each decode cycle, the instruction buffer 408 is managed on a word basis for tracking which of the bytes in the instruction buffer 408 are valid and which are to be reloaded with new bytes from the instruction cache 214. The designation of whether an instruction byte is valid is maintained as the instruction byte is decoded. For an invalid instruction byte, decoder invalidation logic (not shown), which is connected to the macroinstruction decoder 230, sets a "byte invalid" signal. Control of updating of the current fetch PC 426 is synchronized closely with the validity of instruction bytes in the instruction buffer 408 and the consumption of the instruction bytes by the instruction decoder 220.

The macroinstruction decoder 230 receives up to sixteen bytes or four aligned words of instruction bytes fetched from the instruction fetch control circuit 218 at the end of a fetch cycle. Instruction bytes from the instruction cache 214 are loaded into a 16-byte instruction buffer 408. The instruction buffer 408 buffers instruction bytes, plus predecode information associated with each of the instruction bytes, as the instruction bytes are fetched and/or decoded. The instruction buffer 408 receives as many instruction bytes as can be accommodated by the instruction buffer 408 free space, holds the next instruction bytes to be decoded and continually reloads with new instruction bytes as previous instruction bytes are transferred to individual decoders within the macroinstruction decoder 230. The instruction predecoder 270 adds predecode information bits to the instruction bytes as the instruction bytes are transferred to the instruction cache 214. Therefore, the instruction bytes stored and transferred by the instruction cache 214 are called extended bytes. Each extended byte includes eight memory bits plus five predecode bits. The five predecode bits include three bits that encode instruction length, one D-bit that designates whether the instruction length is D-bit dependent, and a HasModRM bit that indicates whether an instruction code includes a modr/m field. The thirteen bits are stored in the instruction buffer 408 and passed on to the macroinstruction decoder 230 decoders. The instruction buffer 408 expands each set of five predecode bits into six predecode bits. Predecode bits enable the decoders to quickly perform multiple instruction decodes within one clock cycle.

The instruction buffer 408 receives instruction bytes from the instruction cache 214 in the memory-aligned word basis of instruction cache 214 storage so that instructions are loaded and replaced with word granularity. Thus, the instruction buffer 408 byte location 0 always holds bytes that are addressed in memory at an address of 0 (mod 16).

Instruction bytes are transferred from the instruction buffer 408 to the macroinstruction decoder 230 with byte granularity. During each decode cycle, the sixteen extended instruction bytes within the instruction buffer 408, including associated implicit word valid bits, are transferred to the plurality of decoders within the macroinstruction decoder 230. This method of transferring instruction bytes from the instruction cache 214 to the macroinstruction decoder 230 via the instruction buffer 408 is repeated with each decode cycle as long as instructions are sequentially decoded. When a control transfer occurs, for example due to a taken branch operation, the instruction buffer 408 is flushed and the method is restarted.

The current decode PC has an arbitrary byte alignment in that the instruction buffer 408 has a capacity of sixteen bytes but is managed on a four-byte word basis in which all four bytes of a word are consumed before removal and replacement or the word with four new bytes in the instruction buffer 408. An instruction has a length of one to eleven bytes and multiple bytes are decoded so that the alignment of an instruction in the instruction buffer 408 is arbitrary. As instruction bytes are transferred from the instruction buffer 408 to the macroinstruction decoder 230, the instruction buffer 408 is reloaded from the instruction cache 214.

Instruction bytes are stored in the instruction buffer 408 with memory alignment rather than a sequential byte alignment that is suitable for application of consecutive instruction bytes to the macroinstruction decoder 230. Therefore, a set of byte rotators 430, 432 and 434 are interposed between the instruction buffer 408 and each of the decoders of the macroinstruction decoder 230. Five instruction decoders, including three short decoders SDec0 410, SDec1 412 or SDec2 414, long decoder 416, and vectoring decoder 418, share the byte rotators 430, 432 and 434. In particular, the short decoder SDec0 410 and the combined long and vectoring decoder 418 share byte rotator 430. Short decoder SDec1 412 is associated with byte rotator 432 and short decoder SDec2 414 is associated with byte rotator 434.

A plurality of pipeline registers, specifically instruction registers 450, 452 and 454, are interposed between the byte rotators 430, 432 and 434 and the instruction decoder 220 to temporarily hold the instruction bytes, predecode bits and other information, thereby shortening the decode timing cycle. The other information held in the instruction registers 450, 452 and 454 includes various information for assisting instruction decoding, including prefix (e.g. 0F) status, immediate size (8-bit or 32-bit), displacement and long decodable length designations.

Although a circuit is shown utilizing three rotators and three short decoders, in other embodiments, different numbers of circuit elements may be employed. For example, one circuit includes two rotators and two short decoders.

Instructions are stored in memory alignment, not instruction alignment, in the instruction cache 214, the branch target buffer (BTB) 456 and the instruction buffer 408 so that the location of the first instruction byte is not known. The byte rotators 430, 432 and 434 find the first byte of an instruction.

The macroinstruction decoder 230 also performs various instruction decode and exception decode operations, including validation of decode operations and selection between different types of decode operations. Functions performed during decode operations include prefix byte handling, support for vectoring to the emulation code ROM 232 for emulation of instructions, and for branch predict logic 234 operations, branch unit interfacing and return address prediction. Based on the instruction bytes and associated information, the macroinstruction decoder 230 generates operation information in groups of four operations corresponding to Op quads. The macroinstruction decoder 230 also generates instruction vectoring control information and emulation code control information. The macroinstruction decoder 230 also has output connections to the scheduler 260 and to the emulation ROM 232 for outputting the Op quad information, instruction vectoring control information and emulation code control information. The macroinstruction decoder 230 does not decode instructions when the scheduler 260 is unable to accept Op quads or is accepting Op quads from emulation code ROM 232.

The macroinstruction decoder 230 has five distinct and separate decoders, including three "short" decoders SDec0 410, SDec1 412 and SDec2 414 that function in combination to decode up to three "short" decode operations of instructions that are defined within a subset of simple instructions of the x86 instruction set. Generally, a simple instruction is an instruction that translates to fewer than three operations. The short decoders SDec0 410, SDec1 412 and SDec2 414 each typically generate one or two operations, although zero operations are generated in certain cases such as prefix decodes. Accordingly for three short decode operations, from two to six operations are generated in one decode cycle. The two to six operations from the three short decoders are subsequently packed together by operation packing logic 438 into an Op quad since a maximum of four of the six operations are valid. Specifically, the three short decoders SDec0 410, SDec1 412 and SDec2 414 each attempt to decode two operations, potentially generating six operations. Only four operations may be produced at one time so that if more than four operations are produced, the operations from the short decoder SDec2 414 are invalidated. The five decoders also include a single "long" decoder 416 and a single "vectoring" decoder 418. The long decoder 416 decodes instructions or forms of instructions having a more complex address mode form so that more than two operations are generated and short decode handling is not available. The vectoring decoder 418 handles instructions that cannot be handled by operation of the short decoders SDec0 410, SDec1 412 and SDec2 414 or by the long decoder 416. The vectoring decoder 418 does not actually decode an instruction, but rather vectors to a location of emulation ROM 232 for emulation of the instruction. Various exception conditions that are detected by the macroinstruction decoder 230 are also handled as a special form of vectoring decode operation. When activated, the long decoder 416 and the vectoring decoder 418 each generates a full Op quad. An Op quad generated by short decoders SDec0 410, SDec1 412 and SDec2 414 has the same format as an Op quad generated by the long and vectoring decoders 416 and 418. The short decoder and long decoder Op quads do not include an OpSeq field. The macroinstruction decoder 230 selects either the Op quad generated by the short decoders 410, 412 and 414 or the Op quad generated by the long decoder 416 or vectoring decoder 418 as an Op quad result of the macroinstruction decoder 230 are each decode cycle. Short decoder operation, long decoder operation and vectoring decoder operation function in parallel and independently of one another, although the results of only one decoder are used at one time.

Each of the short decoders 410, 412 and 414 decodes up to seven instruction bytes, assuming the first byte to be an operation code (opcode) byte and the instruction to be a short decode instruction. Two operations (Ops) are generated with corresponding valid bits. Appropriate values for effective address size, effective data size, the current x86-standard B-bit, and any override operand segment register are supplied for the generation of operations dependent on these parameters. The logical address of the next "sequential" instruction to be decoded is supplied for use in generating the operations for a CALL instruction. Note that the word sequential is placed in quotation marks to indicate that, although the "sequential" address generally points to an instruction which immediately precedes the present instruction, the "sequential" address may be set to any addressed location. The current branch prediction is supplied for use in generating the operations for conditional transfer control instructions. A short decode generates control signals including indications of a transfer control instruction (for example, Jcc, LOOP, JMP, CALL), an unconditional transfer control instruction (for example, JMP, CALL), a CALL instruction, a prefix byte, a cc-dependent RegOp, and a designation of whether the instruction length is address or data size dependent. Typically one or both operations are valid, but prefix byte and JMP decodes do not generate a valid op. Invalid operations appear as valid NOOP operations to pad an Op quad.

The first short decoder 410 generates operations based on more than decoding of the instruction bytes. The first short decoder 410 also determines the presence of any prefix bytes decoded during preceding decode cycles. Various prefix bytes include 0F, address size override, operand size override, six segment override bytes, REP/REPE, REPNE and LOCK bytes. Each prefix byte affects a subsequent instruction decode in a defined way. A count of prefix bytes and a count of consecutive prefix bytes are accumulated during decoding and furnished to the first short decoder SDec0 410 and the long decoder 416. The consecutive prefix byte count is used to check whether an instruction being decoded is too long. Prefix byte count information is also used to control subsequent decode cycles, including checking for certain types of instruction-specific exception conditions. Prefix counts are reset or initialized at the end of each successful non-prefix decode cycle in preparation for decoding the prefix and opcode bytes of a next instruction. Prefix counts are also reinitialized when the macroinstruction decoder 230 decodes branch condition and write instruction pointer (WRIP) operations.

Prefix bytes are processed by the first short decoder 410 in the manner of one-byte short decode instructions. At most, one prefix byte is decoded in a decode cycle, a condition that is enforced through invalidation of all short decodes following the decode of a prefix byte. Effective address size, data size, operand segment register values, and the current B-bit, are supplied to the first short decoder 410 but can decode along with preceding opcodes.

The address size prefix affects a decode of a subsequent instruction both for decoding of instructions for which the generated operation depends on effective address size and for decoding of the address mode and instruction length of modr/m instructions. The default address size is specified by a currently-specified D-bit, which is effectively toggled by the occurrence of one or more address size prefixes.

The operand size prefix also affects the decode of a subsequent instruction both for decoding of instructions for which the generated operation depends on effective data size and for decoding of the instruction length. The default operand size is specified by a currently-specified x86-standard D-bit, which is effectively toggled by the occurrence of one or more operand size prefixes.

The segment override prefixes affect the decode of a subsequent instruction only in a case when the generation of a load-store operation (LdStOps) is dependent on the effective operand segment of the instruction. The default segment is DS or SS, depending on the associated general address mode, and is replaced by the segment specified by the last segment override prefix.

The REP/REPE and REPNE prefixes do not affect the decode of a subsequent instruction. If the instruction is decoded by the macroinstruction decoder 230, rather than the emulation code ROM 232, then any preceding REP prefixes are ignored. However, if the instruction is vectored, then the generation of the vector address is modified in some cases. Specifically, if a string instruction or particular neighboring opcode is vectored, then an indication of the occurrence of one or more of the REP prefixes and designation of the last REP prefix encountered are included in the vector address. For all other instructions the vector address is not modified and the REP prefix is ignored.

A LOCK prefix inhibits all short and long decoding except the decoding of prefix bytes, forcing the subsequent instruction to be vectored. When the vector decode cycle of this subsequent instruction occurs, so long as the subsequent instruction is not a prefix, the opcode byte is checked to ensure that the instruction is within a "lockable" subset of the instructions. If the instruction is not a lockable instruction, an exception condition is recognized and the vector address generated by the vectoring decoder 418 is replaced by an exception entry point address.

Instructions decoded by the second and third short decoders 412 and 414 do not have prefix bytes so that decoders 412 and 414 assume fixed default values for address size, data size, and operand segment register values.

Typically, the three short decoders generate four or fewer operations because three consecutive short decodes are not always performed and instructions often short decode into only a single operation. However, for the rare occurrence when more than four valid operations are generated, operation packing logic 438 inhibits or invalidates the third short decoder 414 so that only two instructions are successfully decoded and at most four operations are generated for packing into an Op quad.

When the first short decoder 410 is unsuccessful, the action of the second and third short decoders 412 and 414 are invalidated. When the second short decoder 412 is unsuccessful, the action of the third short decoder 414 is invalidated. When even the first short decode is invalid, the decode cycle becomes a long or vectoring decode cycle. In general, the macroinstruction decoder 230 attempts one or more short decodes and, if such short decodes are unsuccessful, attempts one long decode. If the long decode is unsuccessful, the macroinstruction decoder 230 performs a vectoring decode. Multiple conditions cause the short decoders 410, 412 and 414 to be invalidated. Most generally, short decodes are invalidated when the instruction operation code (opcode) or the designated address mode of a modr/m instruction does not fall within a defined short decode or "simple" subset of instructions. This condition typically restricts short decode instructions to those operations that generate two or fewer operations. Short decodes are also invalidated when not all of the bytes in the instruction buffer 408 for a decoded instruction are valid. Also, "cc-dependent" operations, operations that are dependent on status flags, are only generated by the first short decoder 410 to ensure that these operations are not preceded by and ".cc" RegOps. A short decode is invalidated for a second of two consecutive short decodes when the immediately preceding short decode was a decode of a transfer control instruction, regardless of the direction taken. A short decode is invalidated for a second of two consecutive short decodes when the first short decode was a decode of a prefix byte. In general, a prefix code or a transfer control code inhibits further decodes in a cycle.

Furthermore, no more than sixteen instruction bytes are consumed by the macroinstruction decoder 230 since the instruction buffer 408 only holds sixteen bytes at one time. Also, at most four operations can be packed into an Op quad. These constraints only affect the third short decoder 414 since the length of each short decoded instruction is at most seven bytes and operations in excess of four only arise in the third short decoder 414.

In a related constraint, if the current D-bit value specifies a 16-bit address and data size default, then an instruction having a length that is address and/or data dependent can only be handled by the first short decoder 410 since the predecode information is probably incorrect. Also, when multiple instruction decoding is disabled, only the first short decoder 410 is allowed to successfully decode instructions and prefix bytes.

Validation tests are controlled by short decoder validation logic (not shown) in the macroinstruction decoder 230 and are independent of the operation of short decoders 410, 412 and 414. However, each of the short decoders 410, 412 and 414 does set zero, one or two valid bits depending on the number of operations decoded. These valid bits, a total of six for the three short decoders 410, 412 and 414, are used by the operation packing logic 438 to determine which operations to pack into an Op quad and to force invalid operations to appear as NOOP (no operation) operations. The operation packing logic 438 operates without short decoder validation information since valid short decodes and associated operations are preceded only by other valid short decodes and associated operations.

The short decoders 410, 412 and 414 also generate a plurality of signals representing various special opcode or modr/m address mode decodes. These signals indicate whether a certain form of instruction is currently being decoded by the instruction decoder 220. These signals are used by short decode validation logic to handle short decode validation situations.

The instruction bytes, which are stored unaligned in the instruction buffer 408, are aligned by byte rotators 430, 432 and 434 as the instruction bytes are transferred to the decoders 410–418. The first short decoder SDec0 410, the long decoder 416 and the vectoring decoder 418 share a first byte rotator 430. The second and third short decoders SDec1 412 and SDec2 414 use respective second and third byte rotators 432 and 434. During each decode cycle, the three short decoders SDec0 410, SDec1 412 and SDec2 414 attempt to decode what are, most efficiently, three short decode operations using three independently-operating and parallel byte rotators 430, 432 and 434. Although the multiplexing by the byte rotators 430, 432 and 434 of appropriate bytes in the instruction buffer 408 to each respective decoder SDec0 410, SDec1 412 and SDec2 414 is conceptually dependent on the preceding instruction decode operation, instruction length lookahead logic 436 uses the predecode bits to enable the decoders to operate substantially in parallel.

The long and vectoring decoders 416 and 418, in combination, perform two parallel decodes of eleven instruction bytes, taking the first byte to be an opcode byte and generating either a long instruction decode Op quad or a vectoring decode Op quad. Information analyzed by the long and vectoring decoders 416 and 418 includes effective address size, effective data size, the current B-bit and DF-bit, any override operand segment register, and logical addresses of the next sequential and target instructions to be decoded. The long and vectoring decoders 416 and 418 generate decode signals including an instruction length excluding preceding prefix bits, a designation of whether the instruction is within the long decode subset of instructions, a RET instruction, and an effective operand segment register, based on a default implied by the modr/m address mode plus any segment override.

During a decode cycle in which none of the short decoders SDec0 410, SDec1 412 and SDec2 414 successfully decodes a short instruction, the macroinstruction decoder 230 attempts to perform a long decode using the long decoder 416. If a long decode cannot be performed, a vectoring decode is performed. In some embodiments, the long and vectoring decoders 416 and 418 are conceptually separate and independent decoders, just as the long and vectoring decoders 416 and 418 are separate and independent of the short decoders 410, 412 and 414. Physically, however, the long and vectoring decoders 416 and 418 share much logic and generate similar Op quad outputs. Instructions decoded by the long decoder 416 are generally included within the short decode subset of instructions except for an address mode constraint such as that the instruction cannot be decoded by a short decoder because the instruction length is greater than seven bytes or because the address has a large displacement that would require generation of a third operation to handle to displacement. The long decoder 416 also decodes certain additional modr/m instructions that are not in the short decode subset but are sufficiently common to warrant hardware decoding. Instruction bytes for usage or decoding by the long decoder 416 are supplied from the instruction buffer 408 by the first byte rotator 430, the same instruction multiplexer that supplies instruction bytes to the first short decoder SDec0 410. However, while the first short decoder SDec0 410 receives only seven bytes, the long decoder 416 receives up to eleven consecutive instruction bytes, corresponding to the maximum length of a modr/m instruction excluding prefix bytes. Thus, the first byte rotator 430 is eleven bytes wide although only the first seven bytes are connected to the first short decoder SDec0 410. The long decoder 416 only decodes one instruction at a time so that associated predecode information within the instruction buffer 408 is not used and is typically invalid.

The first byte of the first byte rotator 430 is fully decoded as an opcode byte and, in the case of a modr/m instruction, the second instruction byte and possibly the third are fully decoded as modr/m and sib bytes, respectively. The existence of a 0F prefix is considered in decoding of the opcode byte. The 0F prefix byte inhibits all short decoding since all short decode instructions are non-0F or "one-byte" opcodes. Because all prefix bytes are located within the "one-byte" opcode space, decoding of a 0F prefix forces the next decode cycle to be a two-byte opcode instruction, such as a long or vectoring decode instruction. In addition to generating operations based on the decoding of modr/m and sib bytes, the first byte rotator 430 also determines the length of the instruction for usage by various program counters, whether the instruction is a modr/m instruction for inhibiting or invalidating the long decoder, and whether the instruction is an instruction within the long decode subset of operation codes (opcodes). The long decoder 416 always generates four operations and, like the short decoders 410, 412 and 141, presents the operations in the form of an emulation code-like Op quad, excluding an OpSeq field. The long decoder 416 handles only relatively simple modr/m instructions. A long decode Op quad has two possible forms that differ only in whether the third operation is a load operation (LdOp) or a store operation (StOp) and whether the fourth operation is a RegOp or a NOOP. A first long decode Op quad has the form:

| | |
|---|---|
| LIMM | t2,<imm32> |
| LIMM | t1,<disp32> |
| LD.b/dt8L/t8,@(<gam>)OS.a | |
| <RegOp>... | |

A second long decode Op quad has the form:

| | |
|---|---|
| LIMM | t2,<imm32> |
| LIMM | t1,<disp32> |
| ST.b/d @(<gam>),t2L/t2,OS.a | |
| NOOP | |

The @(<gam>) address mode specification represents an address calculation corresponding to that specified by the modr/m and/or sib bytes of the instruction, for example @(AX+BX*4+LD). The <imm32> and <disp32> values are four byte values containing the immediate and displacement instruction bytes when the decoded instruction contains such values.

The long decoder 416, like the first short decoder 410, generates operations taking into account the presence of any prefix bytes decoded by the short decoders during preceding decode cycles. Effective address size, data size, operand segment register values, and the current B-bit are supplied to the long decoder 416 and are used to generate operations. No indirect size or segment register specifiers are included within the final operations generated by the long decoder 416.

Only a few conditions inhibit or invalidate an otherwise successful long decode. One such condition is an instruction operation code (opcode) that is not included in the long decode subset of instructions. A second condition is that not all of the instruction buffer 408 bytes for the decoded instruction are valid.

The vectoring decoder 418 handles instructions that are not decoded by either the short decoders or the long decoder 416. Vectoring decodes are a default case when no short or long decoding is possible and sufficient valid bytes are available. Typically, the instructions handled by the vectoring decoder 418 are not included in the short decode or long decode subsets but also result from other conditions such as decoding being disabled or the detection of an exception condition. During normal operation, only non-short and non-long instructions are vectored. However, all instructions may be vectored. Undefined opcodes are always vectored. Only prefix bytes are always decoded. Prefix bytes are always decoded by the short decoders 410, 412 and 414.

When an exception condition is detected during a decode cycle, a vectoring decode is forced, generally overriding any other form of decode without regard for instruction byte validity of the decoded instruction. When a detected exception condition forces a vectoring decode cycle, the generated Op quad is undefined and the Op quad valid bit for presentation to the scheduler 260 is forced to zero. The Op quad valid bit informs the scheduler 260 that no operations are to be loaded to the scheduler 260. As a result, no Op quad is loaded into the scheduler 260 during an exception vectoring decode cycle.

Few conditions inhibit or invalidate a vectoring decode. One such condition is that not all of the bytes in the instruction buffer 408 are valid.

When an instruction is vectored, control is transferred to an emulation code entry point. An emulation code entry point is either in internal emulation code ROM 232 or in external emulation code RAM 236. The emulation code starting from the entry point address either emulates an instruction or initiates appropriate exception processing.

A vectoring decode cycle is properly considered a macroinstruction decoder 230 decode cycle. In the case of a vectoring decode, the macroinstruction decoder 230 generate the vectoring quad and generate the emulation code address into the emulation code ROM 232. Following the initial vectoring decode cycle, the macroinstruction decoder 230 remains inactive while instructions are generated by the emulation code ROM 232 or emulation code RAM 236 until a return from emulation (ERET) OpSeq is encountered. The return from emulation (ERET) sequencing action transitions back to macroinstruction decoder 230 decoding. During the decode cycles following the initial vectoring decode cycle, the macroinstruction decoder 230 remains inactive, continually attempting to decode the next "sequential" instruction but having decode cycles repeatedly invalidated until after the ERET is encountered, thus waiting by default to decode the next "sequential" instruction.

Instruction bytes for usage or decoding by the vectoring decoder 418 are supplied from the instruction buffer 408 by the first byte rotator 430, the same instruction multiplexer that supplies instruction bytes to the first short decoder SDec0 410 and to the long decoder 416. The vectoring decoder 418 receives up to eleven consecutive instruction bytes, corresponding to the maximum length of a modr/m instruction excluding prefix bytes. Thus, the full eleven byte width of the first byte rotator 430 is distributed to both the long decoder 416 and the vectoring decoder 418. The predecode information within the instruction buffer 408 is not used by the vectoring decoder 418.

As in the case of the long decoder 416, the first byte of the first byte rotator 430 is fully decoded as an opcode byte and, in the case of a modr/m instruction, the second instruction byte and possibly the third are fully decoded as modr/m and sib bytes, respectively. The vectoring decoder 418 generates operations taking into account the presence of any prefix bytes decoded by the short decoders during preceding decode cycles. The existence of a 0F prefix is considered in decoding of the opcode byte. In addition to generating operations based on the decoding of modr/m and sib bytes, the first byte rotator 430 also determines the length of the instruction for usage by various program counters, whether the instruction is a modr/m instruction for inhibiting or invalidating the long decoder, and whether the instruction is an instruction within the long decode subset of operation codes (opcodes). If not, a vectoring decode is initiated. Effective address size, data size and operand segment register values are supplied to the vectoring decoder 418 and are used to generate operations. No indirect size or segment register specifiers are included within the final operations generated by the vectoring decoder 418.

During a vectoring decode cycle, the vectoring decoder 418 generates a vectoring Op quad, generates an emulation code entry point or vector address, and initializes an emulation environment. The vectoring Op quad is specified to pass various information to initialize emulation environment scratch registers.

The value of the emulation code entry point or vector address is based on a decode of the first and second instruction bytes, for example the opcode and modr/m bytes, plus other information such as the presence of an 0F prefix, a REP prefix or the like. In the case of vectoring caused by an exception condition, the entry point or vector address is based on a simple encoded exception identifier.

The emulation environment is stored for resolving environment dependencies. All of the short decoders 410, 412 and 414 and long decoder 416 directly resolve environmental dependencies, such as dependencies upon effective address and data sizes, as operations are generated so that these operations never contain indirect size or register specifiers. However, emulation code operations do refer to such effective address and data size values for a particular instance of the instruction being emulated. The emulation environment is used to store this additional information relating to the particular instruction that is vectored. This information includes general register numbers, effective address and data sizes, an effective operand segment register number, the prefix byte count, and a record of the existence of a LOCK prefix. The emulation environment also loads a modr/m reg field and a modr/m regm field are loaded into Reg and Regm registers. The emulation environment is initialized at the end of a successful vectoring decode cycle and remains at the initial state for substantially the duration of the emulation of an instruction by emulation code, until an ERET code is encountered.

The vectoring decoder 418 generates four operations of an Op quad in one of four forms. All four forms include three LIMM operations. The four forms differ only in the immediate values of the LIMM operations and in whether the third operation is an LEA operation or a NOOP operation.

A first vectoring decode Op quad has the form:

| | |
|---|---|
| LIMM | t2,<imm32> |
| LIMM | t1,<disp32> |
| LEA | t6,@(<gam>),_.a |
| LIMM | t7,LogSeqDecPC[31..0]//logical seq. next //instr. PC |

A second vectoring decode Op quad has the form:

|  |  |
|---|---|
| LIMM | t2,<imm32> |
| LIMM | t1,<disp32> |
| NOOP | |
| LIMM | t7,LogSeqDecPC[31..0] |

A third vectoring decode Op quad has the form:

|  |  |
|---|---|
| LIMM | t2,<+/−1/2/4>//equiv to "LDK(D)S t2,+1/+2" |
| LIMM | t1,<+/−2/4/8>//equiv to "LDK(D)S t1,+2/+4" |
| NOOP | |
| LIMM | t7,LogSeqDecPC[31..0] |

A fourth vectoring decode Op quad has the form:

| | | |
|---|---|---|
| LIMM | t2,<+2/4> | //equiv to "LDKD t2,+2" |
| LIMM | t1,<disp32> | |
| LD | t6,@(SP),SS.s | |
| LIMM | t7,LogSeqDecPC[31..0] | |
| | | //predicted RET target adr |
| | | //from Return Address Stack |

The first two forms of vectoring Op quads apply for most opcodes. The first form is used for memory-referencing modr/m instructions for which the LEA operation is used to compute and load a general address mode effective operand address into a treg. The second form is used for non-modr/m and register-referencing modr/m instructions. For instructions having the second form no address is necessarily computed, although the <imm32> and <disp32> values remain useful insofar as they contain instruction bytes following the opcode byte. The third form of vectoring Op quad is used for all string instructions plus some neighboring non-modr/m instructions. A fourth form of vectoring Op quad supports special vectoring and emulation requirements for near RET instructions.

The macroinstruction decoder 230 has four program counters, including three decode program counters 420, 422 and 424, and one fetch program counter 426. A first decode program counter, called an instruction PC 420, is the logical address of the first byte, including any prefix bytes, of either the current instruction being decoded or, if no instruction is currently decoding, the next instruction to be decoded. If the decode operation is a multiple instruction decode, instruction PC 420 points to the first instruction of the multiple instructions to be decoded. The instruction PC 420 corresponds to the architectural address of an instruction and is used to generate instruction fault program counters for handling of exceptions. The instruction PC 420 is passed down the scheduler 260 with corresponding Op quads and is used by an operation commit unit (OCU) (not shown) of the scheduler 260 to produce instruction fault program counters to be saved during exception processing. When an Op quad is generated by the macroinstruction decoder 230, the current instruction PC 420 value is tagged to the Op quad and loaded into the Scheduler 260 Op quad entry along with the Op quad. A second decode program counter, called a logical decode PC 422, is the logical address of the next instruction byte to be decoded and addresses either an opcode byte or a prefix byte. A third decode program counter, called a linear decode PC 424, is the linear address of the next instruction byte to be decoded and addresses either an opcode byte or a prefix byte. The logical decode PC 422 and the linear decode PC 424 point to the same instruction byte. The linear decode PC 424 designates the address of the instruction byte currently at the first byte rotator 430.

The various decoders in the macroinstruction decoder 230 function on the basis of decoding or consuming either prefix bytes or whole instructions minus any prefix bytes so that prefixes are generally handled as one-byte instructions. Therefore, the address boundaries between instruction and prefix byte decodes are more important than instruction boundaries alone. Consequently, at the beginning of each decode cycle, the next instruction byte to be decoded is not necessarily the true beginning of an instruction.

At the beginning of a decode cycle the logical decode PC 422 and the linear decode PC 424 contain the logical and linear addresses of the next instruction to be decoded, either an instruction or a prefix byte. The linear decode PC 424 is a primary program counter value that is used during the decoding process to access the instruction buffer 408. The linear decode PC 424 represents the starting point for the decode of a cycle and specifically controls the byte rotator feeding bytes from the instruction buffer 408 to the first short decoder 410 and to the long and vectoring decoders 416 and 418. The linear decode PC 424 also is the reference point for determining the instruction addresses of any further short decode instructions or prefix bytes, thus generating control signals for the byte rotators feeding the second and third short decoders 412 and 414.

The linear decode PC 424 also acts secondarily to check for breakpoint matches during the first decode cycles of new instructions, before prefix bytes are decoded, and to check for code segment overruns by the macroinstruction decoder 230 during successful instruction decode cycles.

The logical decode PC 422 is used for program counter-related transfer control instructions, including CALL instructions. The logical decode PC 422 is supplied to the branch predict logic 234 to be summed with the displacement value of a PC-relative transfer control instruction to calculate a branch target address. The logical decode PC 422 also supports emulation code emulation of instructions. The next sequential logical decode program counter (PC) 422 is available in emulation code from storage in a temporary register by the vectoring Op quad for general usage. For example, the next sequential logical decode PC 422 is used to supply a return address that a CALL instruction pushes on a stack.

A next logical decode PC 428 is set to the next sequential logical decode program counter value and has functional utility beyond that of the logical decode PC 422. The next logical decode PC 428 directly furnishes the return address for CALL instructions decoded by the macroinstruction decoder 230. The next logical decode PC 428 also is passed to emulation code logic during vectoring decode cycles via one of the operations within the vectoring Op quad.

During a decode cycle, the linear decode PC 424 points to the next instruction bytes to be decoded. The four least significant bits of linear decode PC 424 point to the first instruction byte within the instruction buffer 408 and thereby directly indicate the amount of byte rotation necessary to align the first and subsequent instruction bytes in the instruction cache 214. The first byte rotator 430 is an instruction multiplexer, specifically a 16:1 byte multiplexer, for accessing bytes in the instruction buffer 408 that are offset by the linear decode PC 424 amount. The first byte rotator 430 is seven bytes wide for the first short decoder SDec0 410 and eleven bytes wide for the long decoder 416 and the vectoring decoder 418 in combination. Shared logic in the first short decoder SDec0 410, the long decoder 416 and the vectoring decoder 418 generate a first instruction length value ILen0 for the first instruction. The second and third byte rotators 432 and 434 are seven byte-wide instruction multiplexers, specifically 16:1 byte multiplexers. The second byte rotator 432 accesses bytes in the instruction buffer 408 that are offset by the sum of the linear decode PC 424 amount and the first instruction length ILen0. Logic in the second short decoder SDec0 412 generate a second instruction length value ILen1 for the second instruction. The third byte rotator 434 accesses bytes in the instruction buffer 408 that are offset by the sum of the linear decode PC 424 amount and the first and second instruction lengths ILen0 and ILen1. The byte rotators 430, 432 and 434 multiplex instruction bytes but not predecode bits. The byte rotators 430, 432 and 434 are controlled using predecode information in which the predecode bits associated with the first opcode byte or the first byte of the first instruction directly controls the second rotator 432. The first byte of the second instruction directly controls the third rotator 434. Each predecode code implies an instruction length but what is applied to the next rotator is a pointer. The pointer is derived by taking the four least significant bits of the program counter at the present instruction plus the length to attain the program counter to the next instruction.

The first and second short decoders SDec0 410 and SDec1 412 do generate the instruction byte lengths ILen0 and ILen1 as a matter of course so that the process of decoding multiple short decode instructions occurs serially. However, such serial processing is unacceptable for achieving a desired decoding speed. To hasten the decoding process, the three short decoders SDec0 410, SDec1 412 or SDec2 414 are operated in parallel by including separate instruction length lookahead logic that quickly, although serially, determines the instruction lengths ILen0 and ILen1 using the predecode bits associated with the instruction bytes in each instruction buffer 408.

The predecode bits associated with each instruction byte in the instruction buffer 408 are the ILen bits specifying the length of an instruction starting with that byte. A parameter more useful than ILen for computation by lookahead logic is the value ILen0 plus linear decode PC 424 (mod 16) and the value ILen0 plus ILen1 plus linear decode PC 424 (mod 16). Consequently, the four instruction length predecode bits of the six predecode bits associated with each instruction byte in the instruction buffer 408 are set to point to the first byte of the next instruction assuming that this byte is the opcode byte which begins an instruction. As a result, the predecode bits associated with the first opcode byte multiplexed by the first byte rotator 430 and applied to the first short decoder SDec0 410 directly specify the instruction buffer 408 byte index of the first opcode byte for the second short decoder SDec1 412. The predecode bits associated with the second opcode byte multiplexed by the second byte rotator 432 and applied to the second short decoder SDec1 412 directly specify the instruction buffer 408 byte index of the first opcode byte for the third short decoder SDec2 414. The instruction lookahead logic includes two four-bit-wide 16:1 multiplexers which produce instruction buffer 408 index bits for the multiplexers of second and third byte rotators 432 and 434. Structurally, all of the instruction buffer 408 predecode bits are connected separately from the instruction buffer 408 instruction bytes. The predecode bits are used solely by the lookahead logic. The instruction bytes are applied to the instruction multiplexers of the short decoders 410, 412 and 414.

The instruction lookahead logic also includes logic for determining whether sets of predecode bits used during decode cycle are valid. Specifically, the instruction lookahead logic determines whether an instruction byte is the first byte of a valid short decode instruction. If the predecode bits for a particular byte in the instruction buffer 408 point to the particular byte, implying a zero instruction length for an instruction starting at the location of the particular byte, then that byte is not the start of a short decode instruction and no further short decoding is possible. Otherwise, a short decode operation is possible and the predecode bits point to the beginning of the next instruction.

The following pseudo-RTL description summarizes the structure and functionality of the instruction buffer 408 (IBuf), the instruction multiplexers (IMux), the instruction lookahead and multiplexer control logic, and the multiplexer connections to the different instruction decoders. The instruction buffer 408 is IBuf, including instruction bytes IByte[8] and predecode bits PreDec[4]. The linear decode PC 424 is DecPC[3 . . . 0].

```
struct ExtIByte{
    IByte[8]
    PreDec[4]
} IBuf[16]
IBIndex0[3..0] = DecPC[3..0]
IBIndex1[3..0] = IBuf[IBIndex0[]].PreDec[]
IBIndex2[3..0] = IBuf[IBIndex1[]].PreDec[]
IBIndex3[3..0] = IBuf[IBIndex2[]].PreDec[]
Index0V = ~(IBIndex1[2..0] = IBIndex0[2..0])
Index1V = ~(IBIndex2[2..0] = IBIndex1[2..0])
Index2V = ~(IBIndex3[2..0] = IBIndex2[2..0])
for(i=0..10)
    IMux0[i][] = IBuf(IBIndex0[]+i) mod 16].IByte[]
    LVOpQuad...      = LongVecDecode(IMux0[10..0][])
    SDecOp0[],SDecOp1[],... = ShortDecode(IMux0[6..0][])
for (i=0..6)
    IMux1[i][] = IBuf[(IBIndex1[]+i) mod 16].IByte[]
    SDecOp2[],SDecOp3[],... = ShortDecode(IMux1[6..0][])
for (i=0..6)
    IMux2[i][] = IBuf[(IBIndex2[]+i) mod 16].IByte[]
    SDecOp4[],SDecOp5[],... = ShortDecode(IMux2[6..0][])
```

The short decoders SDec0 410, SDec1 412 or SDec2 414 each generate up to two Ops. The long and vectoring decoder 418 generates a full Op quad. The six Ops from the three short decoders SDec0 410, SDec1 412 or SDec2 414 are subsequently packed together by Op packing logic into a proper Op quad having at most four of the Ops which are guaranteed to be valid.

Either the Op quad generated by the short decoders or the Op quad generated by the long/vectoring decoder is chosen as the Op quad result of the macroinstruction decoder 230 for a decode cycle.

The instruction buffer 408 is accessed on a byte basis by instruction multiplexers of the macroinstruction decoder 230, but the instruction buffer 408 is managed on an instruction word basis each decode cycle for tracking validity of instruction bytes in the instruction buffer 408 and for determining which instruction bytes of the instruction buffer 408 are to be reloaded with new instruction bytes from the instruction cache 214. The predecode information is also used to determine whether the instruction bytes that are decoded and used by each decoder within the macroinstruction decoder 230 decoder are valid. When an instruction byte is not valid, an invalid valid signal is asserted and applied to decoder validation logic (not shown) associated with that decoder.

Control of updating of the current fetch PC 426, which is used to address the next instruction cache 214 access, is synchronized closely with the consumption of valid instruction bytes by the various decoders within the instruction buffer 270. In this manner, control of updating of the current fetch PC 426 is also managed by the control logic (not shown) within the instruction buffer 408. Control logic within the instruction buffer 408 is described in pseudo-RTL as follows:

```
        struct ExtIByte {
            IByte[8]
            PreDec[4]
        }IBuf[16]
```

Instruction buffer 408 word validity signals are described as follows:

```
IBufEmpty = ~FetchPC[4] ^ DecPC[4]) + ~DEC_ValidIF
FullFetch = ('b00 = FetchPC[3..2])
IB0V = ~IBufEmpty (~FullFetch + ('b00 >= DecPC[3..2]))
     = ~IBufEmpty (~FullFetch + ('b00 = DecPC[3..2]))
IB1V = ~IBufEmpty (~FullFetch + ('b01 >= DecPC[3..2]))
     = ~IBufEmpty (~FullFetch + ~DecPC[3])
IB2V = ~IBufEmpty (~FullFetch + ('b10 >= DecPC[3..2]))
     = ~IBufEmpty (~FullFetch + ~('b11 = DecPC[3..2]))
IB3V = ~IBufEmpty (~FullFetch + ('b11 >= DecPC[3..2]))
     = ~IBufEmpty
```

Wraparound is detected within the instruction buffer 408 in response to collective instruction byte consumption of the short decoders in logic functionally described as follows in pseudo-RTL:

DecPCWrap=(SeqDecPC[3 . . . 2]<DecPC[3 . . . 2])

Instruction buffer 408 word load control signals are described as follows:

```
LoadIB0 = ~IB0V + DecTakenXC + DecInstr majority(('b00 >= DecPC[3..2]),
                ('b00 < SeqDecPC[3..2]),DecPCWrap)
        = ~IB0V + DecTakenXC + DecInstr majority(('b00 = DecPC[3..2]),
                ~('b00 = SeqDecPC[3..2]),DecPCWrap)
LoadIB1 = ~IB1V + DecTakenXC + DecInstr majority(('b01 >= DecPC[3..2]),
                ('b01 < SeqDecPC[3..2]),DecPCWrap)
        = ~IB1V + DecTakenXC +
            DecInstr
majority(~DecPC[3],SeqDecPC[3],DecPCWrap)
LoadIB2 = ~IB2V + DecTakenXC + DecInstr majority(('b10 >= DecPC[3..2]),
                ('b10 < SeqDecPC[3..2]),DecPCWrap)
        = ~IB2V + DecTakenXC + DecInstr majority(~('b11 = DecPC[3..2]),
                ('b11 = SeqDecPC[3..2]),DecPCWrap)
LoadIB3 = ~IB3V + DecTakenXC + DecInstr majority(('b11 >= DecPC[3..2]),
                ('b11 < SeqDecPC[3..2]),DecPCWrap)
        = ~IB3V + DecTakenXC + DecInstr DecPCWrap
```

Loading of the instruction buffer 408 is described by the following pseudo-RTL:

@clk: if (LoadIB0) IBuf[3 . . . 0]=IBufIn[3 . . . 0]

@clk: if (LoadIB1) IBuf[7 . . . 4]=IBufIn[7 . . . 4]

@clk: if (LoadIB2) IBuf[11 . . . 8]=IBufIn[11 . . . 8]

@clk: if (LoadIB3) IBuf[15 . . . 12]=IBufIn[15 . . . 12]

Valid instruction byte signals that are indicative of valid bytes received from the instruction buffer 408 are described for each decoder in the instruction decoder 270 as follows:

```
IBufS0V = ~IBufEmpty ( (IBIndex1[3..2]< FetchPC[3..2]) +
            (IBIndex1[3..2]>= IBIndex0[3..2]))
IBufS1V = ~IBufEmpty majority(IBIndex1[3..2]>= FetchPC[3..2],
            IBIndex2[3..2]< FetchPC[3..2],
            IBIndex2[3..2]>= IBIndex1[3..2])
IBufS2V = ~IBufEmpty majority(IBIndex2[3..2]>= FetchPC[3..2],
```

-continued

```
            IBIndex3[3..2]< FetchPC[3..2],
            IBIndex3[3..2]>= IBIndex2[3..2])
IBufLVV = ~IBufEmpty ( (LVSeqDecPC[3..2]>= DecPC[3..2]) +
            (LVSeqDecPC[3..2]< FetchPC[3..2]) )
```

A valid bit relating to requests of the instruction fetch control circuit 218 is evaluated as follows:

```
@clk: if(SC_Vec2Dec + RUX_WrIP + ERM_StopIF +
    IC_StopIF + SI_Reset)
        DEC_ValidIF = (SC_Vec2Dec + RUX_WrIP) ~SI_Reset
```

A valid bit for instruction bytes received from the instruction cache 214 is evaluated as follows:

```
IFetchV = DEC_ValidIF ~IC_HoldIF ~ITB_HoldIF ~ITB_PgViol &
            ~(EmcMode DEC_ExtEmc)
```

A next sequential fetch PC value is evaluated as follows:

```
SeqFetchPC[31..4] = (IBufEmpty + DecPCWrap DecInstr) ?
FetchPC[31..4]+1
            :FetchPC[31..4]
SeqFetchPC[3..2] = if ( (IBufEmpty + DecPCWrap DecInstr) FetchPC[4])
            'b00
        else
```

-continued

```
            (IBufEmpty + ~DecInstr) ? DecPC[3..2]
            :SeqDecPC[3..2]
```

A new fetch PC value having two least significant bits invariably set to 'b00 is evaluated as follows:

```
DEC_NextFetchAddr[31..2] = if (SC_Vec2Dec + RUX_WrIP +
        DecTakenXC ~BtbHit + DecRetXC)
    NewDecPC[31..2]
    elseif (DecTakenXC BtbHit)
        BtbFetchAddr[31..2]
    elseif (IFetchV)
        SeqFetchPC[31..2]
    else
```

-continued

```
       FetchPc[31..2]
@clk: FetchPC[31..2] = DEC_NextFetchAddr[31..2]
```

A processor typically operates by transferring program instructions from a memory into instruction registers, then decoding and executing the instructions. Execution speed of a processor is improved by transferring, decoding and executing more than one instruction at a time. In some processors, all instructions are the same length and transferring of data from memory for decoding is simple because the memory locations of all instructions are readily determined, allowing several instructions to be simultaneously transferred into several instruction registers.

However, x86 instructions have variable lengths so that each instruction must typically be decoded to determine the instruction length before the starting location of the next decodable instruction is ascertainable, making the locating of instructions a slow, sequential process. To allow simultaneous decoding of multiple variable-length instructions, the predecoder 270 includes logic for preparing instructions for rapid decoding. Predecoder 270 determines and stores in the instruction cache 214, for many instruction bytes, the location of the next succeeding instruction by assuming that each instruction byte is the first byte of an instruction. When instructions are transferred from the instruction cache 214, logic for preparing instructions for rapid decoding locates the actual first byte of an instruction so that several subsequent instructions are rapidly located and allowing simultaneous loading of instructions into a plurality of instruction registers for simultaneous decoding and execution.

When instruction bytes are loaded from main memory 130 into the instruction cache 214, a preliminary decode operation of these instruction bytes is performed to generate additional bits that are stored with each instruction byte in the instruction cache 214. The predecode bits are fetched in combination with the associated instruction bytes, loaded into the instruction buffer 408, and subsequently used to facilitate the processing of simultaneous decoding of multiple instruction bytes. A pseudo-RTL declaration summarizes this aspect of the instruction cache 214 tag RAM and data RAM entries, as follows:

```
struct ExtICByte {
    IByte[8]
    PreDec[3]
} IDataEntry[64]
```

Predecode bits associated with each instruction byte serve to locate the next instruction boundary relative to an opcode byte. Prefix bytes are decoded in the form of single-byte long "instructions". Bits of the prefix bytes are used directly by instruction lookahead logic to generate the control signals for instruction multiplexers feeding the instruction decoders. More specifically, the following two values are quickly computed by the lookahead logic:

(DecPC[3 ... 0]+ILen0) mod 16
(DecPC[3 ... 0]+ILen0+ILen1) mod 16 where DecPC[3:0] is the linear decode PC 424, ILen0 is the instruction length of the instruction applied to the first short decoder SDec0 410 and ILen1 is the instruction length of the instruction applied to the second short decoder SDec1 412. In some embodiments, both ILen0 and ILen1 are calculated for every instruction byte in the instruction buffer 408 when instruction bytes are first loaded into the instruction buffer 408. Because instruction bytes are stored in the instruction buffer 408 with memory-alignment, the calculation of ILen0 and ILen1 are possible very early in the instruction processing path. In particular, the ILen0 and ILen1 are performed when the associated instruction bytes are loaded into the instruction cache 214 and the resulting ILen0 and ILen1 values are stored in the instruction cache 214 as predecode bits. The instruction byte in the instruction buffer 408 is indexed by Linear decode PC 424 and has a fixed value for the low four bits of the instruction byte memory address which is equal to linear decode PC 424. The instruction length ILen of an instruction starting with an opcode byte equal to linear decode PC 424 is calculated solely on the basis of the opcode byte or, in some cases, on the basis of the opcode byte and the next byte following the opcode byte.

The instruction buffer 408 index of the first byte of the next instruction is ILen plus a constant (mod 16), specifically (DecPC[3 ... 0]+ILen0) mod 16. The computation of (DecPC[3 ... 0]+ILen0+ILen1) mod 16 results simply from taking the value (DecPC[3 ... 0]+ILen0) mod 16, which is generated by the first computation indexed by (DecPC[3 ... 0]+ILen0) mod 16. In this manner, only (DecPC[3 ... 0]+ILen0) mod 16 is computed for each instruction byte and becomes the predecode value for the instruction byte.

Instruction bytes are loaded into the instruction cache 214 during cache fills sixteen bytes at a time so that predecode logic is replicated sixteen times and predecode bits for all sixteen bytes are calculated simultaneously immediately before the sixteen bytes are written into the data RAM of the instruction cache 214. Predecode logic effectively adds an extra half cycle to the miss/fill latency of the instruction cache 214.

Each of the sixteen sets of predecode logic, one set for each instruction byte loaded into the instruction cache 214, examines the associated instruction byte plus, for instruction bytes equal to some opcodes, the following one or two instruction bytes. The first instruction byte is decoded as an opcode byte, regardless of whether the byte actually is an opcode. If the first instruction byte is a modr/m opcode, the second and third instruction bytes are decoded as modr/m and sib bytes. Based on these three bytes alone, the length ILen of the instruction is determined and the instruction is assigned to be inside or outside the subset of short decode instructions of the instruction set. For some opcodes, the short decode instruction subset is defined by the opcode byte alone. For modr/m opcodes, the short decode instruction subset is specified by the opcode byte in combination with the modr/m and sib bytes. A fixed value of the four memory byte address least significant bits corresponding to a particular set of predecode logic (mod 16) is added to the computed length ILen to determine the predecode expression, (DecPC[3 ... 0]+ILen0) mod 16. If the opcode is, in fact, a short decode instruction opcode, then the resulting four-bit value is assigned as the predecode bits that are loaded into the instruction cache 214. Otherwise, the fixed four-bit memory address least significant bit value for the instruction byte is used as the predecode bits as though the instruction length was zero.

Predecode information is only used to facilitate the decoding of multiple short decode instructions, therefore instruction length is determined accurately only for short decode instructions. The length of all short decode instructions ranges from one to seven bytes. For instructions that are not short decode instructions, the predecoder 270 specifies an effective instruction length of zero to enable the instruction lookahead logic to quickly and easily determine the validity of the predecode information that is calculated during each decode cycle. In particular, instruction lookahead logic compares the values of the predecode bits and the fixed address least significant bits for an instruction byte in the instruction buffer 408. If the values match, then the instruction byte is not the starting byte of a short decode instruction.

Short decode instructions are never longer than seven bytes so that the difference between the four predecode bits and the fixed byte address least significant bit values is never more than seven bytes. Accordingly only three instruction length predecode bits of six total predecode bits are stored in the instruction cache 214 because the most significant bit is readily reconstructed from the least significant three bits plus the associated fixed byte address least significant bit value. The reconstruction or expansion of the three instruction length predecode bits into four bits is performed as instruction bytes are fetched from the instruction cache 214 and loaded into the instruction buffer 408. More specifically, the instruction buffer 408 includes input circuitry with sixteen sets of predecode expansion logic which independently and simultaneously expand the predecode bit values associated with all sixteen instruction bytes transferred from the instruction cache 214.

For the final two bytes of the sixteen bytes that are predecoded and loaded into the instruction cache 214, only one and two bytes are available for examination by the predecode logic. For non-modr/m opcodes a full predecode analysis is possible. However, for modr/m opcodes the full instruction length cannot be determined. Consequently, predecode logic for bytes 14 and 15, having address least significant bits of 1110 and 1111 respectively, are modified versions of the predecode logic associated with the byte 0 through 13. For byte 15, an effective instruction length of zero is forced for all modr/m opcodes as well as for non-short decode instructions. For byte 14, an effective instruction length of zero is forced for non-short decode instructions and for modr/m opcodes having an address mode which requires examination of a sib byte to reliably determine instruction length.

Various uncertainties arise in the predecoding process. For example, a prefix byte having a hexadecimal value of 0F may be included in the instruction byte stream. Also uncertainty concerning the effective address and operand sizes arises due to the possible presence of a prefix byte and a possible difference between the D bit value in effect at cache fill time and the D bit value in effect when the predecode information is used at decode time. Predecode logic addresses these uncertainties by handling the instruction bytes under the assumption that the opcode byte is, in fact, a one byte opcode, and that the effective address and operand sizes are both 32 bits. This assumption results in appropriate handling of a prefix byte in the same manner as handling of a long and vectoring decode so that no predecode information is used. With regard to the variable D-bit value, the assumption that the instruction byte is actually a one byte opcode leads to appropriate handling because, when the D-bit value in effect during a decode cycle indicates a sixteen-bit address, decoding of multiple instructions by the short decoder is inhibited. The proper effective address and operand size are used by the first short decoder SDec0 410 but associated predecode information is not used. The effective address sizes for the second and third short decoders SDec1 412 and SDec2 414 always match the current D-bit value.

The following pseudo-RTL description summarizes logic within the predecoder 270 logic for one instruction byte channel of the sixteen instruction byte channels. Logic in the predecoder 270 examines each of sixteen instruction bytes prior to loading into the instruction cache 214 and determines, for each instruction byte independently of the other instruction bytes, a three-bit predecode value. The three-bit predecode value is determined on the basis of a calculation of two values, ShortI and SILen[2 . . . 0], from a predecode operation performed on each instruction byte and the immediately following one or two instruction bytes. For the final two instruction bytes, bytes 14 and 15, of a group of sixteen instruction bytes, a reduced predecode operation employing analysis of only one or two instruction bytes is performed. The values ShortI and SILen[2 . . . 0] specify whether the instruction byte, as an opcode byte, is included within the short decode subset of instructions. If the instruction is a short decode instruction, then the values ShortI and SILen[2 . . . 0] also specify the length, in bytes, of the short decode instruction.

In this description a ShortI function applies to fully decode opcode, modr/m, and sib bytes for all short decode cases, excluding the determination of sib address modes for instruction byte fourteen of the sixteen instruction byte channels and excluding all modr/m opcodes for instruction byte fifteen. In contrast, the SILen[2 . . . 0] function applies to partially decode opcode, modr/m and sib bytes using non-short decode opcode and address mode cases as don't cares. Instruction length is determined using the SILen function.

```
if (ShortI)
    PreDec[2..0] = FixedAddr[2..0] + SILen[2..0]
else
    PreDec[2..0] = FixedAddr[2..0]
```

Here, FixedAddr is equal to i for instruction byte i.

The following pseudo-RTL description summarizes the pre-decode expansion logic:

```
if (PreDec[2..0] <FixedAddr[2..0])
    PreDec[3] = ~FixedAddr[3]
else
    PreDec[3] = FixedAddr[3]
```

The predecoder 270 may be implemented using various circuits, methods and techniques, including conventional logic circuits. To most simply express the function of the predecoder 270 a functional definition is given in terms of a lookup table and a small amount of additional logic. The lookup table includes 512 entries and is indexed by the first opcode byte plus an additional signal that is decoded from part of a byte following the first opcode byte. Each entry contains the following fields: ILen[2 . . . 0], ShortIV, Modr/m, NoLrgDisp, and OnlySubOpc7. The ILen field directly furnishes the instruction length value for non-modr/m instructions. For modr/m instructions, the ILen field in combination with an address mode-dependent value, furnishes the instruction length value. Final SILen[2 . . . 0] values range from 1 to 7 bytes for valid short decode instructions. The ShortIV field largely indicates whether the byte is a short decode instruction. The Modr/m field is used to gate or mask ShortIV for the sixteenth byte. Other fields represent additional constraints, in the case of modr/m opcodes, relating to whether the particular address mode or sub-opcode of the instruction is acceptable in conjunction with that opcode.

The following table designates table entries potentially corresponding to the short decode instructions. Non-short decode instruction table entries have undefined field values except for ShortIV=0. Equations following the table define the computation of the final, effective ShortI signal in response to input signals including three predecoded bytes, Opc0[7 . . . 0], Opc1[7 . . . 0], and Opc2[7 . . . 0]. For the fifteenth and sixteenth bytes, the third byte Opc2[] or the second and third bytes Opc1 and Opc2, respectively, correspond to existing bytes having values that are not previously defined.

```
RegModrm = (Opc1[7..6] = 'b11)
TableIndex[8..0] = {Opc0[7..0],RegModrm}
struct {
    ILen[3]
    ShortIV
    Modrm
    NoLrgDisp
} PreDecTable[512]
```

| Entry # | ILen | Short IV | Modr m | NoLrg Disp | Instruction Mnemonic |
|---|---|---|---|---|---|
| 02,0 | 2+ | 1 | 1 | 1 | ADD reg8,m8 |
| 02,1 | 2 | 1 | 1 | 0 | ADD reg8,r8 |
| 03,0 | 2+ | 1 | 1 | 1 | ADD reg32,m32 |
| 03,1 | 2 | 1 | 1 | 0 | ADD reg32,r32 |
| 04,x | 2 | 1 | 0 | x | ADD AL,imm8 |
| 05,x | 5 | 1 | 0 | x | ADD AX,imm32 |
| 0A,0 | 2+ | 1 | 1 | 1 | OR reg8,m8 |
| 0A,1 | 2 | 1 | 1 | 0 | OR reg8,r8 |
| 0B,0 | 2+ | 1 | 1 | 1 | OR reg32,m32 |
| 0B,1 | 2 | 1 | 1 | 0 | OR reg32,r32 |
| 0C,x | 2 | 1 | 0 | x | OR AL,imm8 |
| 0D,x | 5 | 1 | 0 | x | OR AX,imm32 |
| 0F,x | 1 | 1 | 0 | x | 0F prefix |
| 12,0 | 2+ | 1 | 1 | 1 | ADC reg8,m8 |
| 12,1 | 2 | 1 | 1 | 0 | ADC reg8,r8 |
| 13,0 | 2+ | 1 | 1 | 1 | ADC reg32,m32 |
| 13,1 | 2 | 1 | 1 | 0 | ADC reg32,r32 |
| 14,x | 2 | 1 | 0 | x | ADC AL,imm8 |
| 15,x | 5 | 1 | 0 | x | ADC AX,imm32 |
| 1A,0 | 2+ | 1 | 1 | 1 | SBB reg8,m8 |
| 1A,1 | 2 | 1 | 1 | 0 | SBB reg8,r8 |
| 1B,0 | 2+ | 1 | 1 | 1 | SBB reg32,m32 |
| 1B,1 | 2 | 1 | 1 | 0 | SBB reg32,r32 |
| 1C,x | 2 | 1 | 0 | x | SBB AL,imm8 |
| 1D,x | 5 | 1 | 0 | x | SBB AX,imm32 |
| 22,0 | 2+ | 1 | 1 | 1 | AND reg8,m8 |
| 22,1 | 2 | 1 | 1 | 0 | AND reg8,r8 |
| 23,0 | 2+ | 1 | 1 | 1 | AND reg32,m32 |
| 23,1 | 2 | 1 | 1 | 0 | AND reg32,r32 |
| 24,x | 2 | 1 | 0 | x | AND AL,imm8 |
| 25,x | 5 | 1 | 0 | x | AND AX,imm32 |
| 26,x | 1 | 1 | 1 | 1 | ES prefix |
| 2A,0 | 2+ | 1 | 1 | 1 | SUB reg8,m8 |
| 2A,1 | 2 | 1 | 1 | 0 | SUB reg8,r8 |
| 2B,0 | 2+ | 1 | 1 | 1 | SUB reg32,m32 |
| 2B,1 | 2 | 1 | 1 | 0 | SUB reg32,r32 |
| 2C,x | 2 | 1 | 0 | x | SUB AL,imm8 |
| 2D,x | 5 | 1 | 0 | x | SUB AX,imm32 |
| 2E,x | 1 | 1 | 1 | 1 | CS prefix |
| 32,0 | 2+ | 1 | 1 | 1 | XOR reg8,m8 |
| 32,1 | 2 | 1 | 1 | 0 | XOR reg8,r8 |
| 33,0 | 2+ | 1 | 1 | 1 | XOR reg32,m32 |
| 33,1 | 2 | 1 | 1 | 0 | XOR reg32,r32 |
| 34,x | 2 | 1 | 0 | x | XOR AL,imm8 |
| 35,x | 5 | 1 | 0 | x | XOR AX,imm32 |
| 36,x | 1 | 1 | 0 | x | SS prefix |
| 3A,0 | 2+ | 1 | 1 | 1 | CMP reg8,m8 |
| 3A,1 | 2 | 1 | 1 | 0 | CMP reg8,r8 |
| 3B,0 | 2+ | 1 | 1 | 1 | CMP reg32,m32 |
| 3B,1 | 2 | 1 | 1 | 0 | CMP reg32,r32 |
| 3C,x | 2 | 1 | 0 | x | CMP AL,imm8 |
| 3D,x | 5 | 1 | 0 | x | CMP AX,imm32 |
| 3E,x | 1 | 1 | 0 | x | DS prefix |
| 40,x | 1 | 1 | 0 | x | INC reg |
| 41,x | 1 | 1 | 0 | x | INC reg |
| 42,x | 1 | 1 | 0 | x | INC reg |
| 43,x | 1 | 1 | 0 | x | INC reg |
| 44,x | 1 | 1 | 0 | x | INC reg |
| 45,x | 1 | 1 | 0 | x | INC reg |

-continued

| Entry # | ILen | Short IV | Modr m | NoLrg Disp | Instruction Mnemonic |
|---|---|---|---|---|---|
| 46,x | 1 | 1 | 0 | x | INC reg |
| 47,x | 1 | 1 | 0 | x | INC reg |
| 48,x | 1 | 1 | 0 | x | DEC reg |
| 49,x | 1 | 1 | 0 | x | DEC reg |
| 4A,x | 1 | 1 | 0 | x | DEC reg |
| 4B,x | 1 | 1 | 0 | x | DEC reg |
| 4C,x | 1 | 1 | 0 | x | DEC reg |
| 4D,x | 1 | 1 | 0 | x | DEC reg |
| 4E,x | 1 | 1 | 0 | x | DEC reg |
| 4F,x | 1 | 1 | 0 | x | DEC reg |
| 50,x | 1 | 1 | 0 | x | PUSH reg |
| 51,x | 1 | 1 | 0 | x | PUSH reg |
| 52,x | 1 | 1 | 0 | x | PUSH reg |
| 53,x | 1 | 1 | 0 | x | PUSH reg |
| 54,x | 1 | 1 | 0 | x | PUSH reg |
| 55,x | 1 | 1 | 0 | x | PUSH reg |
| 56,x | 1 | 1 | 0 | x | PUSH reg |
| 57,x | 1 | 1 | 0 | x | PUSH reg |
| 58,x | 1 | 1 | 0 | x | POP reg |
| 59,x | 1 | 1 | 0 | x | POP reg |
| 5A,x | 1 | 1 | 0 | x | POP reg |
| 5B,x | 1 | 1 | 0 | x | POP reg |
| 5C,x | 1 | 1 | 0 | x | POP reg |
| 5D,x | 1 | 1 | 0 | x | POP reg |
| 5E,x | 1 | 1 | 0 | x | POP reg |
| 5F,x | 1 | 1 | 0 | x | POP reg |
| 64,x | 1 | 1 | 0 | x | FS prefix |
| 65,x | 1 | 1 | 0 | x | GS prefix |
| 66,x | 1 | 1 | 0 | x | Operand Size prefix |
| 67,x | 1 | 1 | 0 | x | Address Size prefix |
| 70,x | 2 | 1 | 0 | x | JCC disp8 |
| 71,x | 2 | 1 | 0 | x | JCC disp8 |
| 72,x | 2 | 1 | 0 | x | JCC disp8 |
| 73,x | 2 | 1 | 0 | x | JCC disp8 |
| 74,x | 2 | 1 | 0 | x | JCC disp8 |
| 75,x | 2 | 1 | 0 | x | JCC disp8 |
| 76,x | 2 | 1 | 0 | x | JCC disp8 |
| 77,x | 2 | 1 | 0 | x | JCC disp8 |
| 78,x | 2 | 1 | 0 | x | JCC disp8 |
| 79,x | 2 | 1 | 0 | x | JCC disp8 |
| 7A,x | 2 | 1 | 0 | x | JCC disp8 |
| 7B,x | 2 | 1 | 0 | x | JCC disp8 |
| 7C,x | 2 | 1 | 0 | x | JCC disp8 |
| 7D,x | 2 | 1 | 0 | x | JCC disp8 |
| 7E,x | 2 | 1 | 0 | x | JCC disp8 |
| 7F,x | 2 | 1 | 0 | x | JCC disp8 |
| 80,0 | 3+ | 1 | 1 | 1 | CMP m8,imm8 |
| 80,1 | 3 | 1 | 1 | 0 | "op"r8,imm8 |
| 81,1 | 6 | 1 | 1 | 0 | "op"r32,imm32 |
| 82,0 | 3+ | 1 | 1 | 1 | CMP m8,imm8 |
| 82,1 | 3 | 1 | 1 | 0 | "op"r8,imm8 |
| 83,0 | 3+ | 1 | 1 | 1 | CMP m32,imm8 |
| 83,1 | 3 | 1 | 1 | 0 | "op"r32,imm8 |
| 88,0 | 2+ | 1 | 1 | 0 | MOV m8,reg8 |
| 88,1 | 2 | 1 | 1 | 0 | MOV r8,reg8 |
| 89,0 | 2+ | 1 | 1 | 0 | MOV m32,reg8 |
| 89,1 | 2 | 1 | 1 | 0 | MOV r32,reg8 |
| 8A,0 | 2+ | 1 | 1 | 0 | MOV reg8,m8 |
| 8A,1 | 2 | 1 | 1 | 0 | MOV reg8,r8 |
| 8B,0 | 2+ | 1 | 1 | 0 | MOV reg32,m32 |
| 8B,1 | 2 | 1 | 1 | 0 | MOV reg32,r32 |
| 8D,0 | 2+ | 1 | 1 | 0 | LEA reg32,mem |
| 90,x | 1 | 1 | 0 | x | XCHG AX,AX/NOP |
| A0,x | 5 | 1 | 0 | x | MOV AL,offs |
| A1,x | 5 | 1 | 0 | x | MOV AX,offs |
| A2,x | 5 | 1 | 0 | x | MOV offs,AL |
| A3,x | 5 | 1 | 0 | x | MOV offs,AX |
| B0,x | 2 | 1 | 0 | x | MOV reg8,imm8 |
| B1,x | 2 | 1 | 0 | x | MOV reg8,imm8 |
| B2,x | 2 | 1 | 0 | x | MOV reg8,imm8 |
| B3,x | 2 | 1 | 0 | x | MOV reg8,imm8 |
| B4,x | 2 | 1 | 0 | x | MOV reg8,imm8 |
| B5,x | 2 | 1 | 0 | x | MOV reg8,imm8 |
| B6,x | 2 | 1 | 0 | x | MOV reg8,imm8 |
| B7,x | 2 | 1 | 0 | x | MOV reg8,imm8 |
| B8,x | 5 | 1 | 0 | x | MOV reg32,imm32 |
| B9,x | 5 | 1 | 0 | x | MOV reg32,imm32 |
| BA,x | 5 | 1 | 0 | x | MOV reg32,imm32 |
| BB,x | 5 | 1 | 0 | x | MOV reg32,imm32 |
| BC,x | 5 | 1 | 0 | x | MOV reg32,imm32 |

-continued

| Entry # | ILen | Short IV | Modrm | NoLrg Disp | Instruction Mnemonic |
|---|---|---|---|---|---|
| BD,x | 5 | 1 | 0 | x | MOV reg32,imm32 |
| BE,x | 5 | 1 | 0 | x | MOV reg32,imm32 |
| BF,x | 5 | 1 | 0 | x | MOV reg32,imm32 |
| C0,1 | 3 | 1 | 1 | 0 | Shift r8,imm8 |
| C1,1 | 3 | 1 | 1 | 0 | Shift r32,imm8 |
| C6,0 | 3+ | 1 | 1 | 1 | MOV m8,imm8 |
| C7,0 | 6+ | 1 | 1 | 1 | MOV m32,imm32 |
| D0,1 | 2 | 1 | 1 | 0 | Shift r8,1 |
| D1,1 | 2 | 1 | 1 | 0 | Shift r32,1 |
| D2,1 | 2 | 1 | 1 | 0 | Shift r8,CL |
| D3,1 | 2 | 1 | 1 | 0 | Shift r32,CL |
| E2,x | 2 | 1 | 0 | x | LOOP |
| E8,x | 5 | 1 | 0 | x | CALL disp32 |
| E9,x | 5 | 1 | 0 | x | JMP disp32 |
| EB,x | 2 | 1 | 0 | x | JMP disp8 |
| F0,x | 1 | 1 | 0 | x | LOCK prefix |
| F2,x | 1 | 1 | 0 | x | REPNE prefix |
| F3,x | 1 | 1 | 0 | x | REP/REPE prefix |
| F6,1 | 2 | 1 | 1 | 0 | NOT r8 |
| F7,1 | 2 | 1 | 1 | 0 | NOT r32 |
| default | x | 0 | x | x | all other table entries |

Logic for calculating the effective ShortI value is described by the following pseudo-RTL, as follows:

```
LrgDisp = "disp32" + "da32"
        = (Opc1[7..6] = 'b10) +
        (Opc1[7..6,2..0] = 'b00101) +
        ((Opc1[7..6,2..0] = 'b00100) (Opc2[2..0] = 'b101))
DA16 = (Opc1[7..6,2..0] = 'b00110)
```

Logic for ensuring that only NOT r/m is recognized as a short decode for this opcode byte value is described as follows:

SubOpc2=(Opc1[5 . . . 3]='b010)

OnlySubOpc2=(Opc0[7 . . . 0]='b11110x)

Logic for ensuring that only CMP m,imm is recognized as a short decode for this opcode byte value and not for other "op"s is described as follows:

SubOpc7=(Opc1[5 . . . 3]='b111)

OnlySubOpc7=(Opc0[7 . . . 0]='b10000xxx)~RegModrm

Logic for ensuring that only non-rotate shift instructions are recognized as short decodes is described as follows:

RotShift=(Opc0[7 . . . 0]='b110x00xx) (Opc 1 [5]='b0)

Logic for determining the ShortI value for the first fourteen bytes is described as follows:

```
ShortI = ShortIV &
        ~(Modrm (NoLrgDisp(LrgDisp + DA16) +
        OnlySubOpc7~SubOpc7 +
            RotShift))
```

Logic for determining the ShortI value for the fifteen byte is described as follows:

```
ShortI = ShortIV &
        ~(Modrm (NoLrgDisp(LrgDisp + DA16) +
        OnlySubOpc7~SubOpc7 +
            RotShift + (Opc1[7 . . . 6, 2 . . . 0] =
            'b00100)) )
```

Logic for determining the ShortI value for the sixteen byte is described as follows:

ShortI=ShortIV &~Modrm

Logic for determining the ILen value is described as follows:

```
Sib = (Opc1[7..6,2..0] = (~'b11xxx 'bxx100))
Disp8 = (Opc1[7..6] = 'b01)
ALen[2..0] = 3'b0;
if (Sib)  ALen[] = ALen[] + 1;
if (Disp8) ALen[] = ALen[] + 1;
if (LrgDisp) ALen[] = ALen[] + 4
SILen[2..0] = (Modrm) ? (ILen[2..0] + ALen[2..0]) mod 8
              : ILen[2..0]
```

For the instruction MOV m32,imm32 with (Disp8 Sib), then final length ALen=8 which ultimately results causes this instruction byte to be treated as a nonshort decode opcode despite determining a ShortI value of 1.

During each decode cycle, the macroinstruction decoder 230 checks for several exception conditions, including an instruction breakpoint, a pending nonmaskable interrupt (NMI), a pending interrupt (INTR), a code segment overrun, an instruction fetch page fault, an instruction length greater than sixteen bytes, a nonlockable instruction with a LOCK prefix, a floating point not available condition, and a pending floating point error condition. Some conditions are evaluated only during an otherwise successful decode cycle, other conditions are evaluated irrespective of any decoding actions during the cycle. When an active exception condition is detected, all instruction decode cycles including short, long and vectoring decode cycles, are inhibited and an "exception" vectoring decode is forced in the decode cycle following exception detection. The recognition of an exception condition is only overridden or inhibited by inactivity of the macroinstruction decoder 230, for example, when emulation code Op quads are accepted by the scheduler 260, rather than short and long or vector decoder Op quads. In effect, recognition and handling of any exception conditions are delayed until an ERET Op seq returns control to the macroinstruction decoder 230.

During the decode cycle that forces exception vectoring, a special emulation code vector address is generated in place of a normal instruction vector address. The vectoring Op quad that is generated by the long and vectoring decoders 416 and 418 is undefined. The exception vector address is a fixed value except for low-order bits for identifying the particular exception condition that is recognized and handled. When multiple exception conditions are detected simultaneously, the exceptions are ordered in a priority order and the highest priority exception is recognized.

The instruction breakpoint exception, the highest priority exception condition, is recognized when the linear decode PC 424 points to the first byte of an instruction including prefixes, the linear decode PC 424 matches a breakpoint address that is enabled as an instruction breakpoint, and none of the instruction breakpoint mask flags are clear. One mask flag (RF) specifically masks recognition of instruction breakpoints. Another mask flag (BNTF) temporarily masks NMI requests and instruction breakpoints.

The pending NMI exception, the penultimate priority exception, is recognized when an NMI request is pending and none of the NMI mask flags are clear. One mask (NF) specifically masks nonmaskable interrupts. Another mask flag (BNTF) temporarily masks NMI requests and instruction breakpoints.

The pending INTR exception, the next exception in priority following the pending NMI exception, is recognized when an INTR request is pending and the interrupt flag (IF) and temporary interrupt flag (ITF) are clear.

The code segment overrun exception, the next exception in priority following the pending INTR exception, is recognized when the macroinstruction decoder 230 attempts to successfully decode a set of instructions beyond a current code segment limit.

The instruction fetch page fault exception, having a priority immediately lower than the code segment overrun exception, is recognized when the macroinstruction decoder 230 requires additional valid instruction bytes from the instruction buffer 408 before decoding of another instruction or prefix byte is possible and the instruction translation look-aside buffer (ITB) signals that a page fault has occurred on the current instruction fetch. A faulting condition of the instruction fetch control circuit 218 is repeatedly retried so that the ITB continually reports a page fault until the page fault is recognized by the macroinstruction decoder 230 and subsequent exception handling processing stops and redirects instruction fetching to a new address. The fault indication from the ITB has the same timing as instructions loaded from the instruction cache 214 and, therefore, is registered in the subsequent decode cycle. The ITB does not necessarily signal a fault on consecutive instruction fetch attempts so that the macroinstruction decoder 230 holds the fault indication until fetching is redirected to a new instruction address. Upon recognition of a page fault, additional fault information is loaded into a special register field.

The instruction length greater than sixteen bytes exception, which has a priority just below the instruction fetch page fault exception, is recognized when the macroinstruction decoder 230 attempts to successfully decode an instruction having a total length including prefix bytes of greater than fifteen bytes. The instruction length greater than sixteen bytes exception is detected by counting the number of prefix bytes before an actual instruction is decoded and computing the length of the rest of the instruction when it is decoded. If the sum of the prefix bytes and the remaining instruction length is greater than sixteen bytes, an error is recognized.

The nonlockable instruction with a LOCK prefix exception, having a priority below the instruction length exception, is recognized when the macroinstruction decoder 230 attempts to successfully decode an instruction having a LOCK prefix, in which the instruction is not included in the lockable instruction subset. The nonlockable LOCK instruction exception is detected based on decode of the opcode byte and existence of a 0F prefix. The nonlockable LOCK instruction exception only occurs during vectoring decode cycles since the LOCK prefix inhibits short and long decodes.

The floating point not available exception, having a next to lowest priority, is recognized when the macroinstruction decoder 230 attempts to successfully decode a WAIT instruction or an ESC instruction that is not a processor control ESC, and the reporting of a floating point error is pending. Macroinstruction decoder 230 detects the floating point not available exception based on decoding of an opcode and modr/m byte, in addition to the existence of a 0F prefix.

During each decode cycle, the macroinstruction decoder 230 attempts to perform some form of instruction decode of one or more instructions. Typically, the macroinstruction decoder 230 succeeds in performing either one or multiple short decodes, one long decode or an instruction vectoring decode. Occasionally no decode is successful for three types of conditions including detection of an active exception condition, lack of a sufficient number of valid bytes in the instruction buffer 408, or the macroinstruction decoder 230 does not advance due to an external reason.

When an active exception condition is detected all forms of instruction decode are inhibited and, during the second decode cycle after detection of the exception condition, an exception vectoring decode cycle is forced, producing an invalid Op quad.

When an insufficient number of valid bytes are available in the instruction buffer 408 either no valid bytes are held in the instruction buffer 408 or at least the first opcode is valid and one of the decoders decodes the instruction but the decoded instruction length requires further valid bytes in the instruction buffer 408, not all of which are currently available.

When an external reason prevents macroinstruction decoder 230 advancement either the scheduler 260 is full and unable to accept an additional Op quad during a decode cycle or the scheduler 260 is currently accepting emulation code Op quads so that the macroinstruction decoder 230 is inactive awaiting a return to decoding.

In the latter two cases, the decode state of the macroinstruction decoder 230 is inhibited from advancing and the macroinstruction decoder 230 simply retries the same decodes in the next decode cycle. Control of macroinstruction decoder 230 inhibition is based on the generation of a set of decode valid signals with a signal corresponding to each of the decoders. For each decoder there are multiple reasons which are combined into decoder valid signals to determine whether that decoder is able to successfully perform a decode. The decoder valid signals for all of the decoders are then monitored, in combination, to determine the type of decode cycle to perform. The type of decode cycle is indicative of the particular decoder to perform the decode. The external considerations are also appraised to determine whether the selected decode cycle type is to succeed. Signals indicative of the selected type of decode cycle select between various signals internal to the macroinstruction decoder 230 generated by the different decoders, such as alternative next decode PC values, and also are applied to control an Op quad multiplexer 444 which selects the input Op quad applied to the scheduler 260 from the Op quads generated by the short decoders, the long decoder 416 and the vectoring decoder 418.

In the case of vectoring decode cycles, the macroinstruction decoder 230 also generates signals that initiate vectoring to an entry point in either internal emulation code ROM 232 or external emulation code RAM 236. The macroinstruction decoder 230 then monitors the active duration of emulation code fetching and loading into the scheduler 260.

The branch target buffer (BTB) 456 is a circuit employed for usage in a two-level branch prediction algorithm that is disclosed in detail in U.S. Pat. No. 5,454,117, entitled CONFIGURABLE BRANCH PREDICTION FOR A PROCESSOR PERFORMING SPECULATIVE EXECUTION (Puziol et al., issued Sep. 26, 1995), U.S. Pat. No. 5,327,547, entitled TWO-LEVEL BRANCH PREDICTION CACHE (Stiles et al., issued Jul. 5, 1994), U.S. Pat. No. 5,163,140, entitled TWO-LEVEL BRANCH PREDICTION CACHE (Stiles et al., issued Nov. 10, 1992), and U.S. Pat. No. 5,093,778, entitled INTEGRATED SINGLE STRUCTURE BRANCH PREDICTION CACHE (Favor et al., issued Mar. 3, 1993). The BTB 456 stores quadword data from the first successful fetch of the instruction cache 214 following an event such as a cache miss. The BTB 456 is used to avoid a one cycle delay that would normally occur between the decode of a transfer instruction and a decode of the target instructions. The BTB 456 includes sixteen entries, each entry having sixteen instruction bytes with associated predecode bits. The BTB 456 is indexed by the branch address and is accessed during the decode cycle. Instructions from the BTB 456 are sent to the instruction decoder 220, eliminating the taken-branch penalty, for a cache hit of the BTB 456 when a branch history table (not shown) predicts a taken branch.

During each decode cycle, the linear decode PC 424 is used in a direct-mapped manner to address the BTB 456. If a hit, which is realized before the end of the decode cycle, occurs with a BTB entry, a PC-relative conditional transfer control instruction is decoded by a short decoder and the control transfer is predicted taken, then two actions occur. First, the initial target linear fetch address directed to the instruction cache 214 is changed from the actual target address to a value which points to an instruction byte immediately following the valid target bytes contained in the BTB entry. This modified fetch address is contained in the BTB entry and directly accessed from the BTB entry. Second, the instruction byte and predecode information from the entry is loaded into the instruction buffer 408 at the end of the decode cycle. If a PC-relative conditional transfer control instruction is decoded by a short decoder and the control transfer is predicted taken, but a miss occurs, then a new BTB entry is created with the results of the target instruction fetch. Specifically, simultaneously with the first successful load of target instruction bytes into the instruction buffer 408 from the instruction cache 214, the same information is loaded into a chosen BTB entry, replacing the previous contents. The target fetch and instruction buffer 408 load otherwise proceed normally.

Each entry includes a tag part and a data part. The data part holds sixteen extended instruction bytes including a memory byte and three associated predecode bits. The correspondence of the memory byte is memory-aligned with the corresponding instruction buffer 408 location. The tag part of a BTB entry holds a 30-bit tag including the 32-bit linear decode PC 424 associated with the transfer control instruction having a cached target, less bits [4:1], an entry valid bit and the 30-bit modified initial target linear instruction fetch address. No explicit instruction word valid bits are used since the distance between the true target address and the modified target address directly implies the number and designation of valid instruction words within the BTB 456.

The purpose of the BTB 456 is to capture branch targets within small to medium sized loops for the time period a loop and nested loops are actively executed. In accordance with this purpose, at detection of a slightest possibility of an inconsistency, the entire BTB is invalidated and flushed. The BTB 456 is invalidated and flushed upon a miss of the instruction cache 214, any form of invalidation of instruction cache 214, an ITB miss, or any form of ITB invalidation. Branch targets outside temporal or spatial locality are not effectively cached. Typically, the BTB 456 contains only a small number of entries so that complexity is reduced while the majority of performance benefit of ideal branch target caching is achieved.

Figure 5:
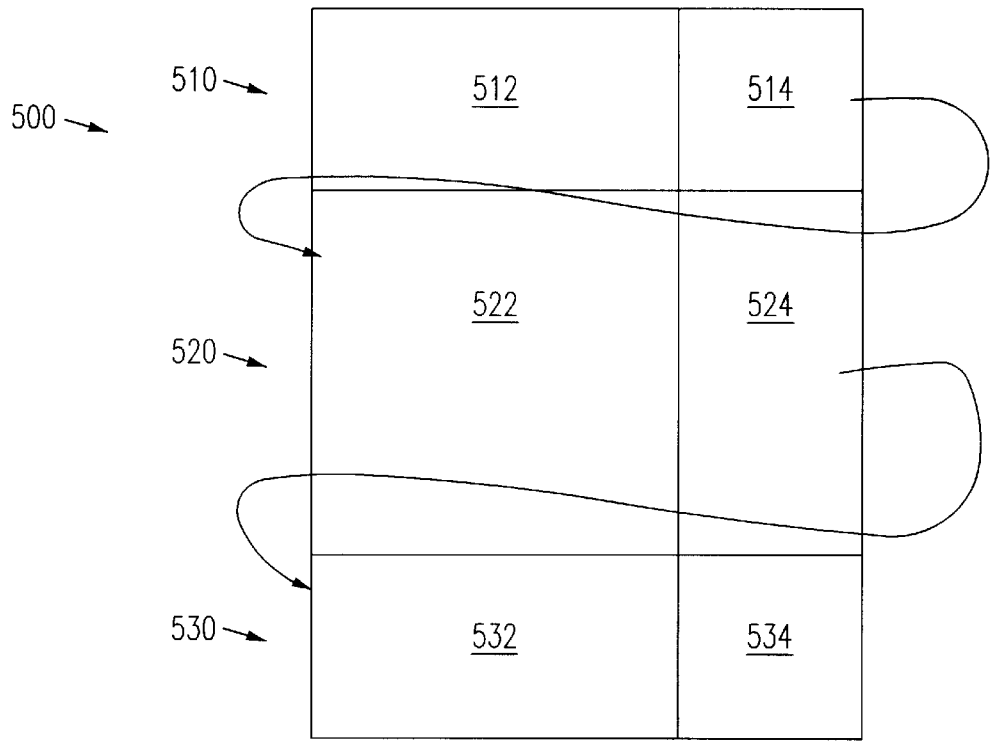
FIG. 5 is a block diagram of a memory including sixteen addressable memory locations holding sixteen instruction bytes that make up, for example, three variable length instructions, in combination with predecode bits indicative of following-instruction location information.

The instruction cache 214 stores information in the form of a list of a plurality of instruction bytes in a predetermined order. This predetermined order is specified by associating a pointer with each element in the list that points to the starting point of the next element in the list. The pointers for the instruction cache 214 list are the predecode bits. One aspect of predecoder 270 operations is the generation of these pointers and storage of the pointers as predecode bits in the instruction cache 214. Referring to FIG. 5, a list 500 is shown having three instructions 510, 520 and 530 in a sequence. Each instruction 510, 520 and 530 includes respective instruction byte data 512, 522 and 532 and respective pointers 514, 524 and 534 where the first two pointers 514 and 524 point to the respective instructions 520 and 530 in the list 500. Typically, the instruction byte data and pointers are stored in a binary format with the number of instruction bytes in an instruction byte data group being variable. In this example, the first instruction byte data group 512 includes four instruction bytes, the second instruction byte data group 522 includes six instruction bytes and the third instruction byte data group 532 includes three instruction bytes. The first byte of each instruction is an opcode byte and the address of the opcode byte is the address of the instruction.

For lists in which the opcode byte of successive instructions are separated by a known maximum number of bytes, the pointers are defined as an offset between the current address and the next address so that the bit width of the pointers is limited to correspond to the maximum number of bytes. Accordingly, for a maximum number $2^m$ of bytes that separate any two instructions, the pointer is m bits wide. The size of memory storage is advantageously reduced. When the address of the next instruction is sought, the pointer value is easily expanded into a full storage address for usage by an addressable storage device. In some embodiments of the predecoder 270, various predefined pointer values represent special events, such as the end of the list or instructions that exceed a specified instruction byte length. Consequently, the maximum number of storage locations from one instruction to the next is reduced to $2^m$ less the number of special event instances. The list 500 includes pointers 514, 524 and 534 that are stored as 3-bit values and the pointer 534 of the last instruction 530 is set to a code that indicates the end of the list 500.

A pointer that points to a next instruction is equal to the m least significant bits of the address of the next instruction. Thus, pointers 514 and 524 are equal to the m least significant bits of the addresses of instructions 520 and 530, respectively. Pointer 534 of the third instruction 530 is set to a code, for example zero, that indicates the end of the list.

Figure 6:
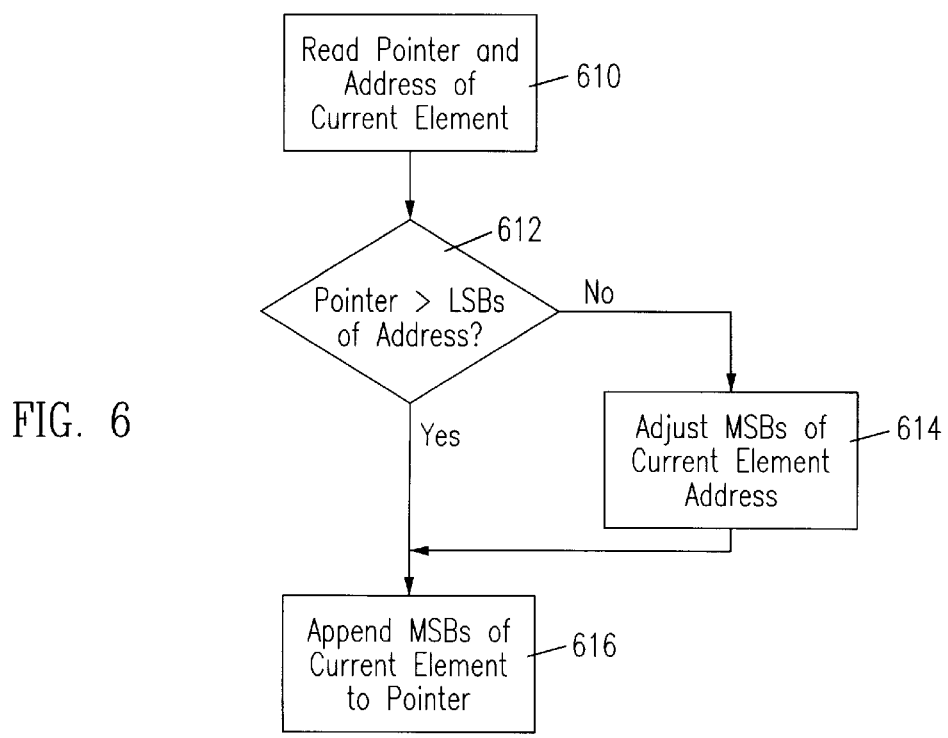
FIG. 6 is a flow chart illustrating a method for efficiently storing a pointer and rapidly identifying the address of a next element in a list of a plurality of elements in accordance with one embodiment of the present invention.

Referring to FIG. 6, a flow chart shows a method for generating a next instruction address from a pointer. In a first step 610, the associated pointer and starting address of an instruction are read. The value of the pointer is compared to the value of the m least significant bits of the instruction starting address in logical step 612. If the value of the pointer is greater than the value of the m least significant bits of the instruction starting address, the next instruction is located within the same page as the current instruction. For an instruction buffer memory 408 having $2^n$ memory locations, the remaining n-m most significant bits of the current instruction is located. In step 616, the storage location of the next instruction is determined by appending the n-m most significant bits of the current instruction starting address to the pointer, the pointer bits being used as the m least significant bits. If the pointer value is less than the value of the m least significant bits of the address of the current instruction, the next instruction is located on the page following the current instruction. The n-m most significant bits of the storage address of the current instruction is adjusted, for example by incrementing the bits, in step 614 prior to being appended to the pointer in step 616.

Figure 7:
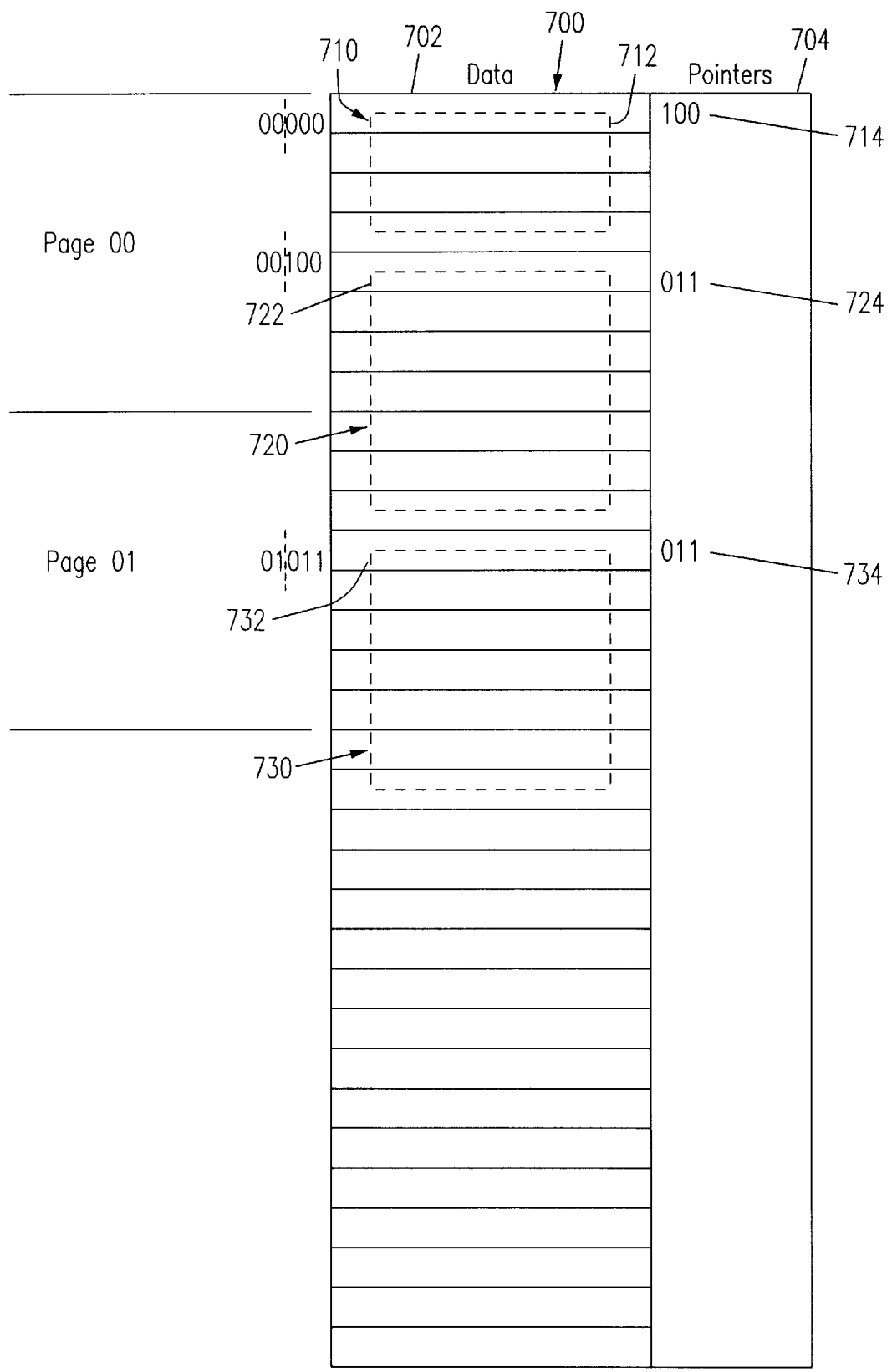
FIG. 7 is a pictorial diagram illustrating a 32-word memory storage, such as an instruction cache, for storing a plurality of memory elements or units and pointers, in which the elements of the list are ordered in increasing sequential address locations.

Referring to FIG. 7, a memory 700 is shown to illustrate operation of the predecoder 270 for handling the instruction cache 214 as a list. In this example, the memory 700 has a storage capacity of 32 instruction bytes 702 which is extended by three bits of pointer information 704 per instruction byte. In various embodiments, the pointer bits may be stored with the instruction bytes or contained in a separate memory. Also in this example, three instructions 710, 720 and 730 having instruction sizes of four, seven, and seven instruction bytes, respectively, are stored in memory 700. The first byte of each of the instructions 710, 720 and 730 is an opcode instruction byte 712, 722 and 732, respectively. The opcode instruction byte 712 is stored in memory location 0000 and the opcode instruction byte 722 is stored in memory location 00100 so that a pointer 714 from the first instruction 710 to the second instruction 720 is 100, which is equal to the three least significant bits of the address of the second instruction 720. The opcode instruction byte 732 is stored in memory location 01011 so that a pointer 724 associated with the second instruction 720 is 011.

To traverse the memory 700, the pointer 714 (100) associated with the first instruction 710 in memory location 00000 is read and compared to the three least significant bits of the first instruction 710 address (000). The pointer 714 (100) is greater than the first instruction 710 address (000) so that the instruction address of the second instruction 720 is determined by appending the pointer 714 (100), which represents the least significant bits of the address of the second instruction 720, to the two most significant bits (00) of the address of the first instruction 710 to produce the address of the second instruction 720 at memory location 00100. The location of the third instruction 730 is identified by reading the pointer 724 and comparing the pointer value to the three least significant bits (100) of the address of the opcode instruction byte 722. The pointer 724 (011) is smaller than the three least significant bits of the address of the opcode instruction byte 722 (100) so that the third instruction 730 is located on the subsequent page (01) after page (00) of the second instruction 720. The remaining most significant bits (00) of the address of the second instruction 720 are incremented by one and appended to the pointer 724 to generate the address of the third instruction 730 (01011). The third instruction 730 is the last instruction in the list so that the three least significant bits of the third instruction address are stored in the third pointer 734 (011), indicating the end of the list.

One special event that is represented by a pointer is the end of a list. The pointer indicates the end of a list when the pointer is equal to the least significant bits of the current instruction. Another special event is a number of instruction bytes within an instruction that exceeds the maximum allowed instruction length. The pointer also indicates an illegal instruction length when the pointer is equal to the least significant bits of the current instruction.

In this manner, only an occasional increment of a few bits furnishes memory space conservation of a typical offset list method without performing a time-consuming addition operation. This technique advantageously allows for fast traversal of a list while reducing the space consumed to store each pointer.

Instruction codes are composed of bytes of binary ones and zeros. Nearly every combination of bits are used as opcodes, the first instruction bytes, so that nearly any opcode value could appear to be the first instruction byte. This concept is illustrated by the pictorial memory 800 representation shown in FIG. 8, which shows three instructions 810, 830 and 850. The first instruction 810 is a four-byte instruction including instruction bytes 812, 814, 816 and 818. In the four-byte instruction 810, any of the instruction bytes 812, 814, 816 and 818 could be the actual first instruction byte. To decode the instruction 810, a rotator first ascertains which instruction byte is the first. To ascertain which byte of instruction 810 is first, each of instruction bytes 812, 814, 816 and 818 is assumed to be the starting byte of the instruction. For every instruction byte 812, 814, 816 and 818, the byte plus, for some instructions, subsequent instruction bytes identify bytes that could possibly be an instruction. Once an instruction byte is identified as an actual opcode that is the beginning byte of an instruction, subsequent instruction locations are readily identified from the information associated with the first actual byte 812 and information with the first bytes of subsequent instructions 832 and 852 since the predecode bits indicate the number of instruction bytes in each instruction.

For example, if instructions starting with byte 812 (01110100) were four bytes long and instructions starting with byte 814 (10110100) were five bytes long, byte 812 could represent the start of an instruction with a four-byte length and byte 814 could represent the start of an instruction with a five-byte length. While only one of these bytes could represent the start of an instruction, prior to the actual knowledge of which byte is the starting byte, both bytes could be assumed to be starting bytes for the purpose of associating the location of the start of the next instruction with each byte 812 and 814. Thus, pointer information 822 and 824 furnish the location of the next instruction byte if either respective byte 812 and 814 is the first byte of an instruction. When byte 812 is identified as the actual starting byte of the instruction 810, the location of the following instruction 830 is immediately available using the pointer 822. Pointer 824 is ignored because byte 814 is not the first byte of an instruction. The pointers associated with bytes that are not actual first bytes are always ignored, resulting in wasted analysis. However, this wasted analysis is greatly overshadowed by the benefit of rapid knowledge of the start of all actual instructions and simultaneous decoding of multiple instructions.

Certain instructions, such as complex instructions or instructions that execute over many cycles, are not executed simultaneously with other instructions even if decoded simultaneously. The analysis to determine the first byte of an instruction is simplified if no attempt is made to decode these complex instructions in parallel. Accordingly, some instructions that generally execute rapidly are classified as "short decodable" instructions. For short decodable instructions, performance is improved by decoding a plurality of instructions in parallel. Other instructions that are not short decodable take longer to execute so that no benefit is obtained by rapid decoding. Accordingly, the location of a subsequent instruction is only determined in advance if the instruction is short decodable.

Figure 9:
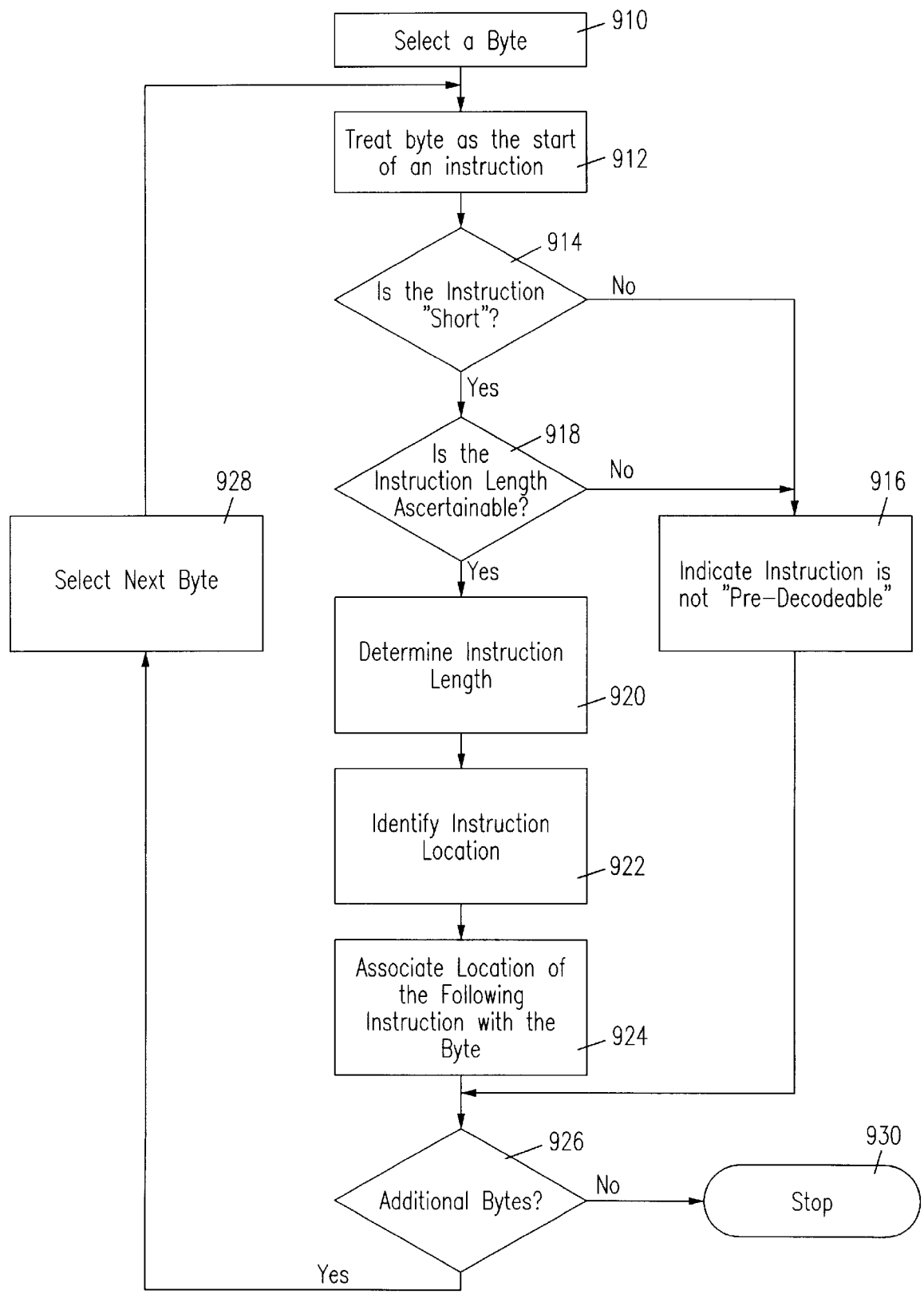
FIG. 9 is a flow chart illustrating a method of preparing computer instructions for rapid decoding in accordance with an embodiment of the present invention.

Referring to the flow chart shown in FIG. 9, a predecoding method 900 of preparing computer instructions for rapid decoding is shown. In step 910, an instruction byte is selected and assumed to be the starting byte of an instruction in step 912. The instruction byte is read and a determination is made whether the instruction byte belongs to the set of short decodable instructions in step 914. For some instruction bytes, subsequent adjacent instruction bytes are also read to determine short decodable status. If the instruction byte is not within the set of short decodable instructions, the instruction is indicated to be of a "non-short-decodable" class in step 916. Although this indication may be made in various ways in different embodiments, in one embodiment an instruction is identified to be non-short-decodable by specifying an instruction length of zero. Typically no valid instructions have an instruction length of zero. If the instruction is a short decodable instruction, step 918 determines whether the instruction length of the instruction is ascertainable. Step 918 typically prohibits predecoding of instructions that do not contain all information to allow a determination of instruction length. If the instruction length is not ascertainable, the instruction is indicated to be of a "nonshort-decodable" class in step 916. Otherwise, the instruction length is ascertainable and determined in step 920 in accordance with the instruction set definition of the processor. The location of the next instruction is then determined in step 922 using the memory location of the first instruction and the instruction length furnished by the pointer. The location of the following instruction, referenced to the first byte, is stored in step 924. These steps are typically repeated in accordance with looping step 926, which determines whether additional bytes are in the memory, and the select next byte step 928. When the final instruction byte in the memory is analyzed, the method terminates in step 930.

To determine the length of an instruction in step 920, information that is not in the opcode instruction byte but which is instead contained in subsequent bytes is used for some instructions. In some instruction sets, including the x86 instruction set, certain instructions cause the interpretation of following instructions to change. For example, in the x86 instruction set, instruction lengths sometimes vary depending upon the D-bit. For some instructions, the predecode instruction length is not affected by the data and address size. For other instructions, the D-bit sets a 2× instruction length. For still other instructions, the D-bit designates a special instruction length that is not 2×. Thus a D-bit interpretation change can result in a change in instruction length. Tracking the interpretation of an instruction prior to actual execution of the instruction is often difficult or impossible. In some cases, some interpretations of the instruction are short decodable interpretations and other interpretations are non-short decodable. In these cases, the instruction is assumed to be short decodable. The method, of course, performs correctly when the assumption is correct and the location of the following instruction is correct. If the assumption is incorrect, the location of the following instruction is incorrect, but irrelevant, because the location information is only used for short decodable instructions. At execution time, the selection of a different processor operating mode causes no search for short decodable instructions to be performed so that the incorrect assumption does not affect performance.

Figure 10:
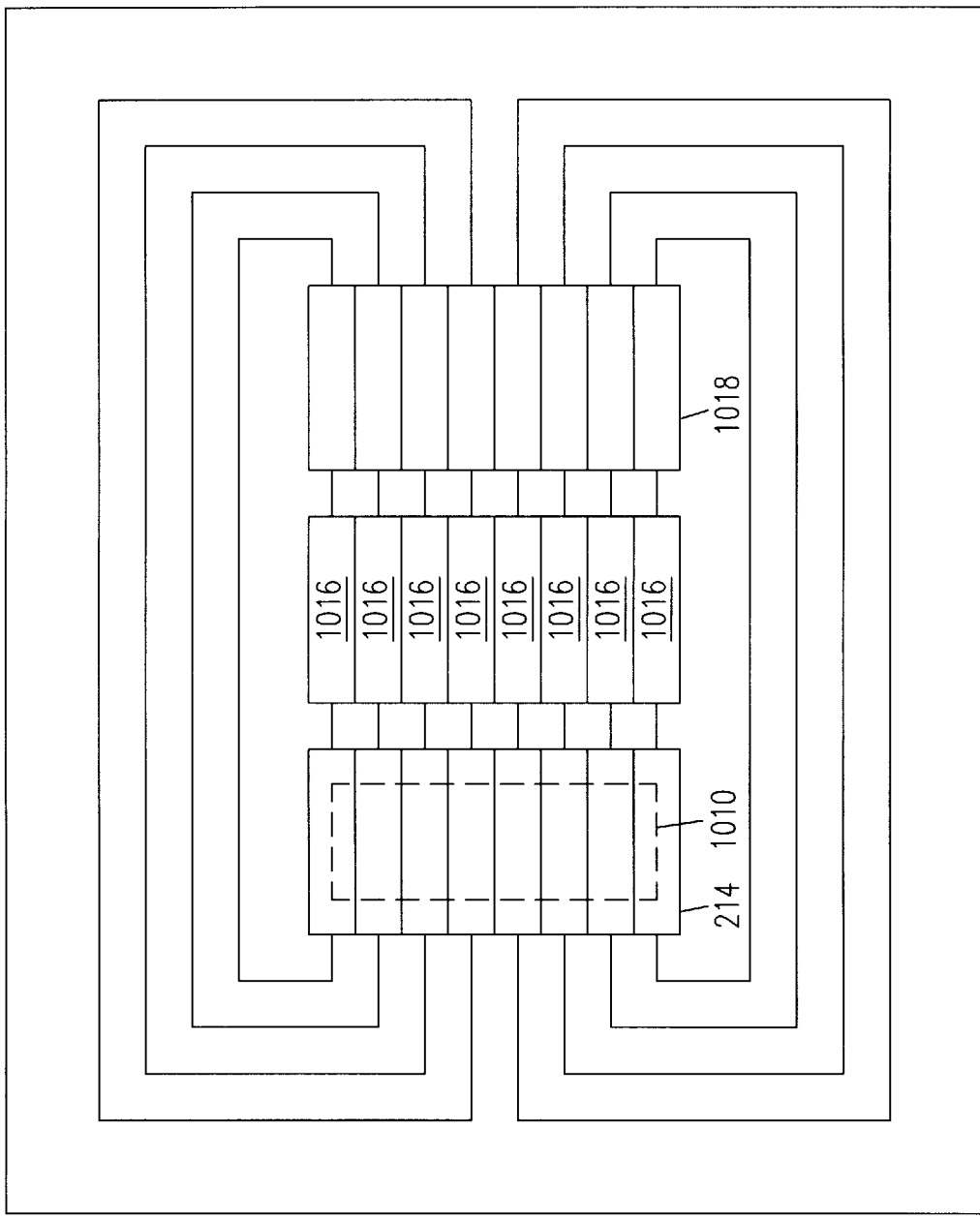
FIG. 10 is a schematic block diagram showing a circuit for preparing computer instructions for rapid decoding in accordance with the present invention.

FIG. 10 is a schematic diagram showing the operation of one embodiment of predecode logic 270 for transferring instructions from the instruction cache 214 to the macroinstruction decoder 230. The cache memory 214 holds a group of instruction bytes 1010. One instruction length computation module 1016 per cache memory location is connected to the cache memory 214 to read instruction bytes contained in the cache memory 214. In other embodiments, fewer instruction length computation modules 1016 are used. However, one module 996 per instruction byte furnishes the fastest computation. The output signal of the instruction length computation module 1016 indicates a binary length of an instruction. If the instruction is not predecodable, either because the instruction is not short decodable or inadequate information is contained in the cache memory 214 to determine an instruction length, the instruction length computation module 1016 indicates this status, for example, by setting the instruction length to zero.

A next instruction computation module 1018 adds the output signal of the instruction length computation module 1016 to a location code of the corresponding byte in the cache memory 214 to produce the location code of the instruction following the instruction containing the corresponding byte. This location code is stored in the cache memory 214 to be read when the macroinstruction decoder 230 decodes the instruction bytes 1010 stored in the cache memory 214. This predecode information is determined and stored soon after the instruction byte is placed in the cache memory 214. This computation is performed regardless of whether the instruction byte is a first instruction byte, or opcode. Only the predecode information for an actual first instruction is ultimately used for decoding instructions. However, the operation of computing predecode information for all instruction bytes furnishes the location of a true next instruction most rapidly.

Figure 11:
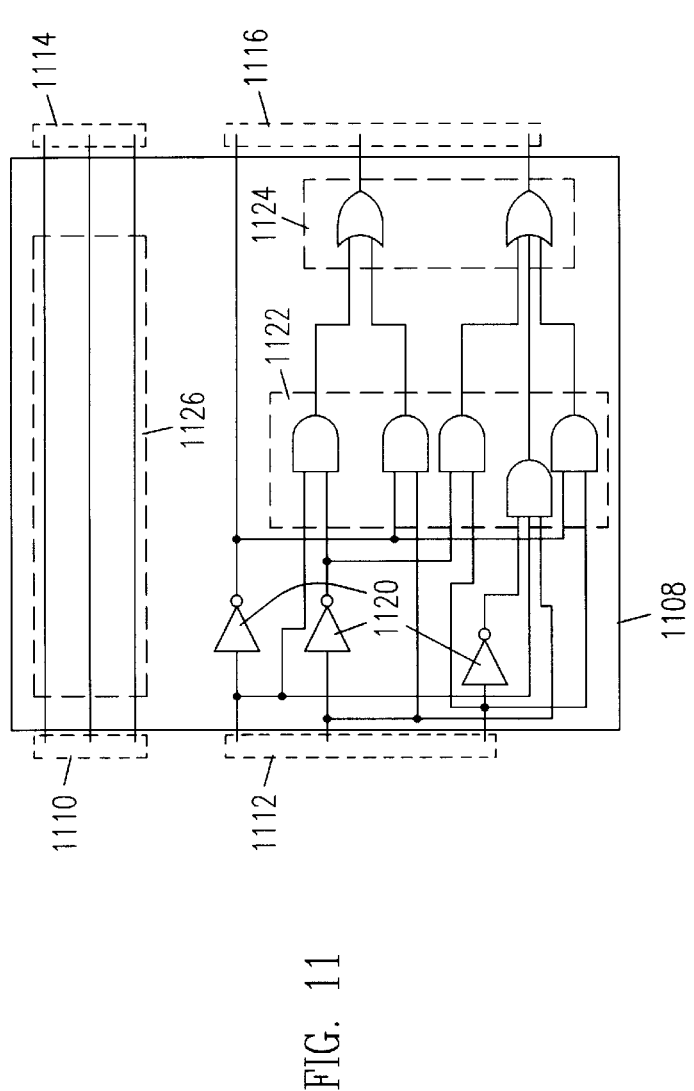
FIG. 11 is a schematic circuit diagram showing an embodiment of a circuit for preparing computer instructions for rapid decoding in accordance with an embodiment of the present invention.

Referring to FIG. 11, a schematic circuit diagram shows an embodiment of a next instruction computation module 1108 for connecting output signals of two instruction length computation modules 1016 that are connected to cache memory locations 0000 and 0001. For each input signal 1110 and 1112, the next instruction computation module 1108 adds the input signals 1110 and 1112 to the memory location code corresponding to the input signals. The input signal 1110 connects to an instruction length computation module 1016 that computes the instruction length for the byte or bytes starting at cache memory location 0000. The next instruction computation module 1108 adds this input signal to binary 0000 to produce an output signal 1114. For cache memory location 0000, this sum is equal to the input signal. The next instruction location computation module 1108 transfers the input signal 1110 to the output signal 1114 via a bus 1126.

Input signal 1112 are connected to receive the output signal of the instruction length computation module 1016 for the byte or bytes beginning at cache memory location 0001. Output signals 1116 are equal to a binary representation of the input signals 1112 added to 0001. Inverters 1120, AND gates 1122 and OR gates 1124 furnish this next instruction computation function. Output signals 1114 and 1116 are typically connected to the corresponding cache memory locations which hold the location of the next instruction for future potential decoding.

Figure 12:
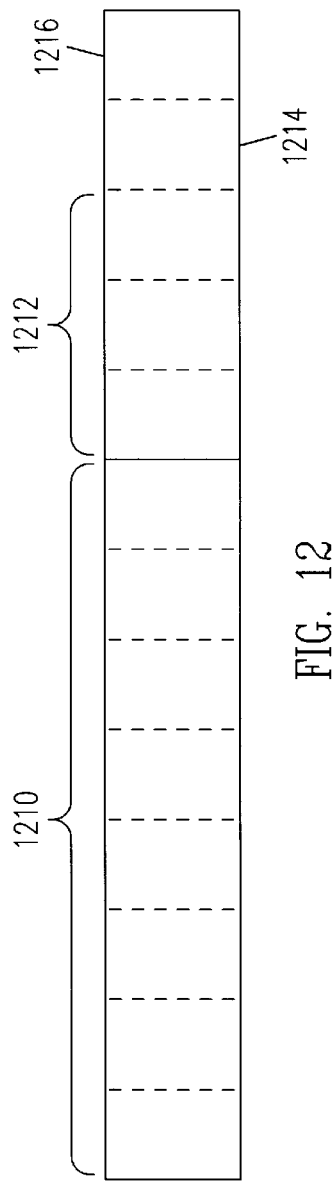
FIG. 12 is a schematic pictorial diagram of an addressable memory location containing an instruction code byte and a code for the location of the next instruction assuming that the instruction code byte is the starting byte of an instruction.

Referring to FIG. 12, a schematic pictorial illustration of an arrangement of bits in the cache memory 214 is shown. Instruction bits 1210 are stored adjacent to a predecode code 1212 which indicates the next location. Eight instruction bits 1210 and five predecode bits 1212 including three next instruction location code bits 1212, a D-bit 1214 and a HASMODRM bit 1215 are illustrated. In other embodiments, different numbers of bits are used to encode instruction data and predecode information.

System Embodiments

Figure 13:
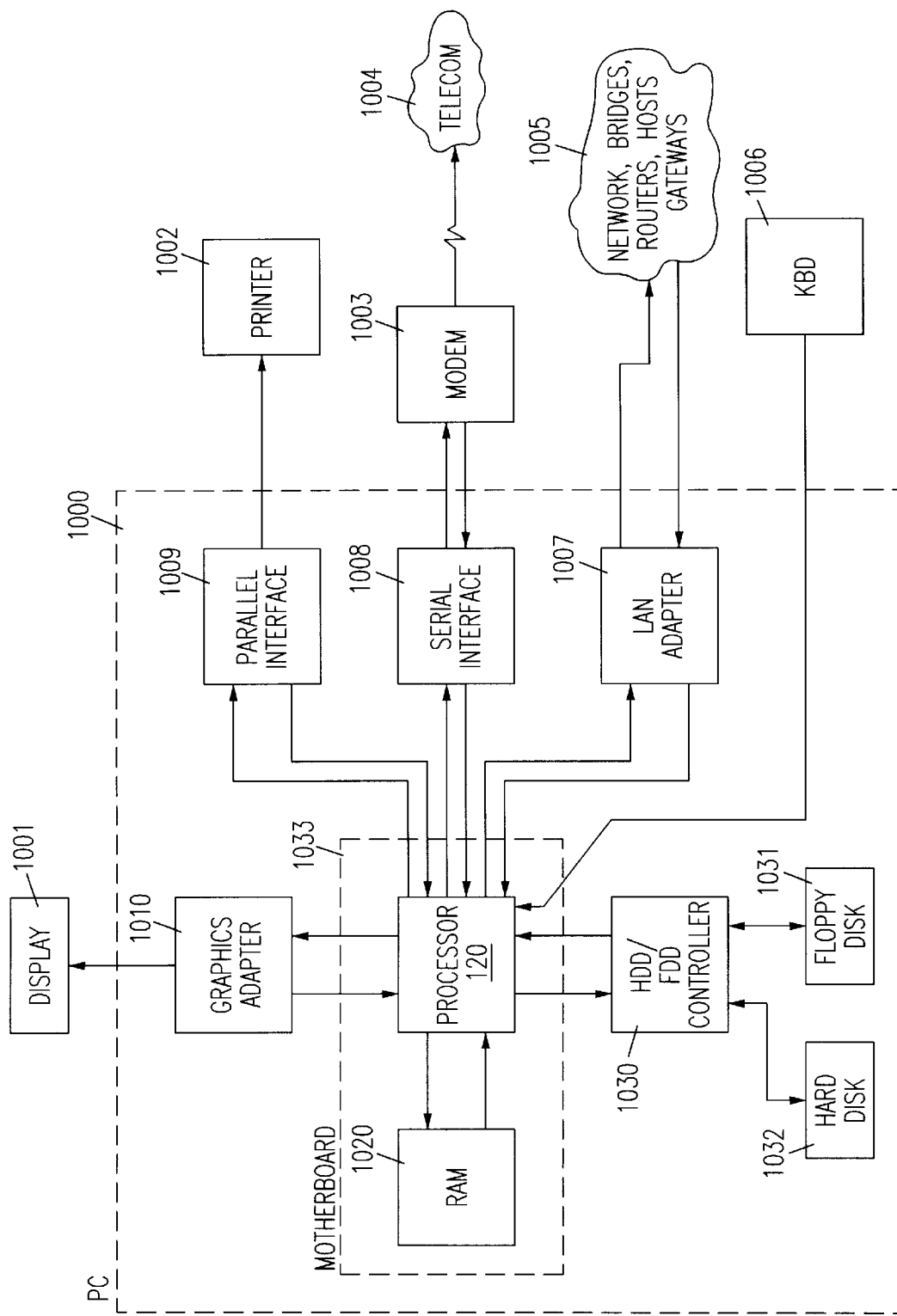
FIG. 13 is a block diagram of a personal computer incorporating a processor having an instruction decoder including emulation using indirect specifiers in accordance with an embodiment of the present invention.
Figure 14:
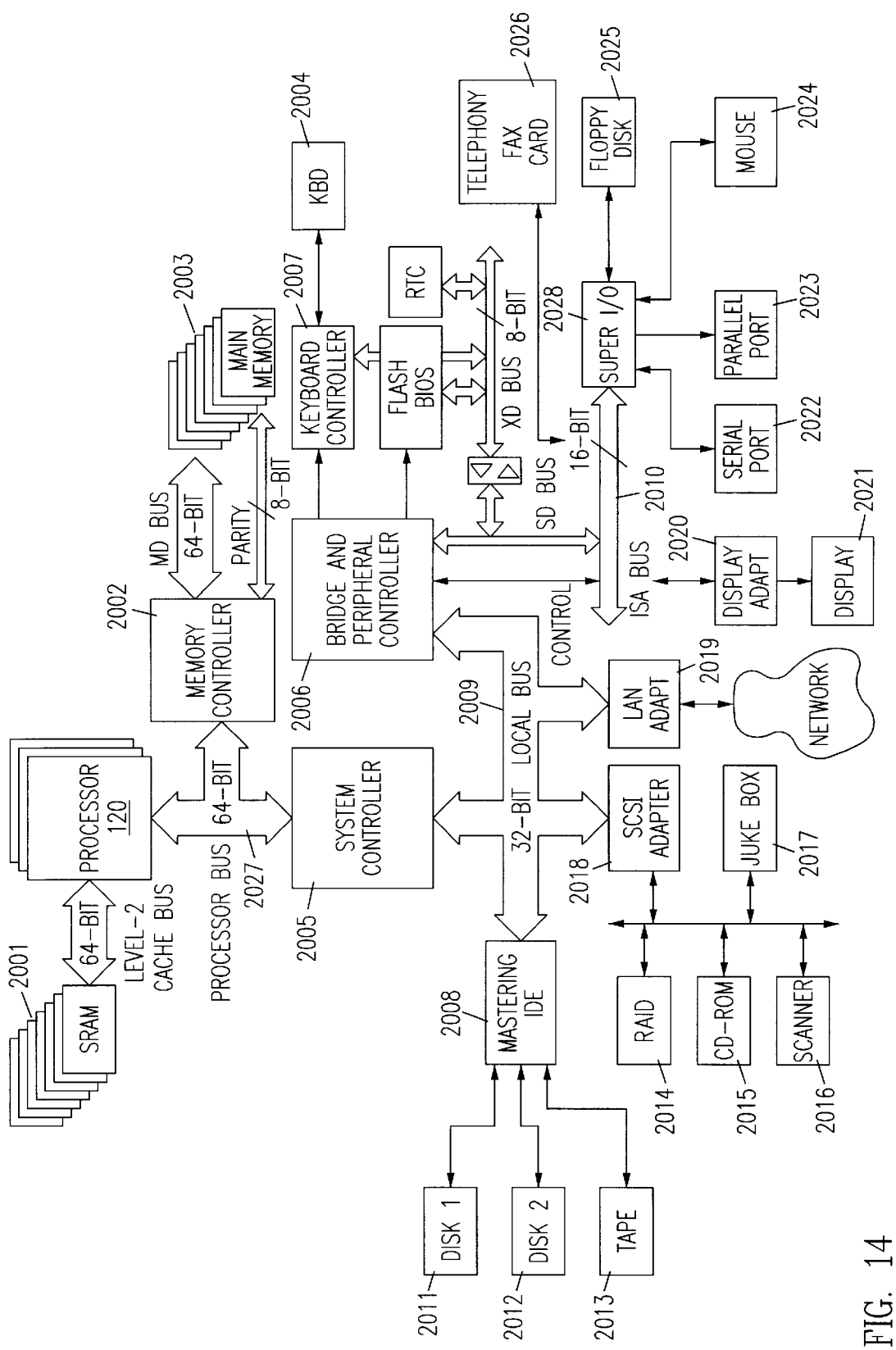
FIG. 14 is a block diagram of a networked server computer incorporating a processor having an instruction decoder including emulation using indirect specifiers in accordance with an embodiment of the present invention.
Figure 15:
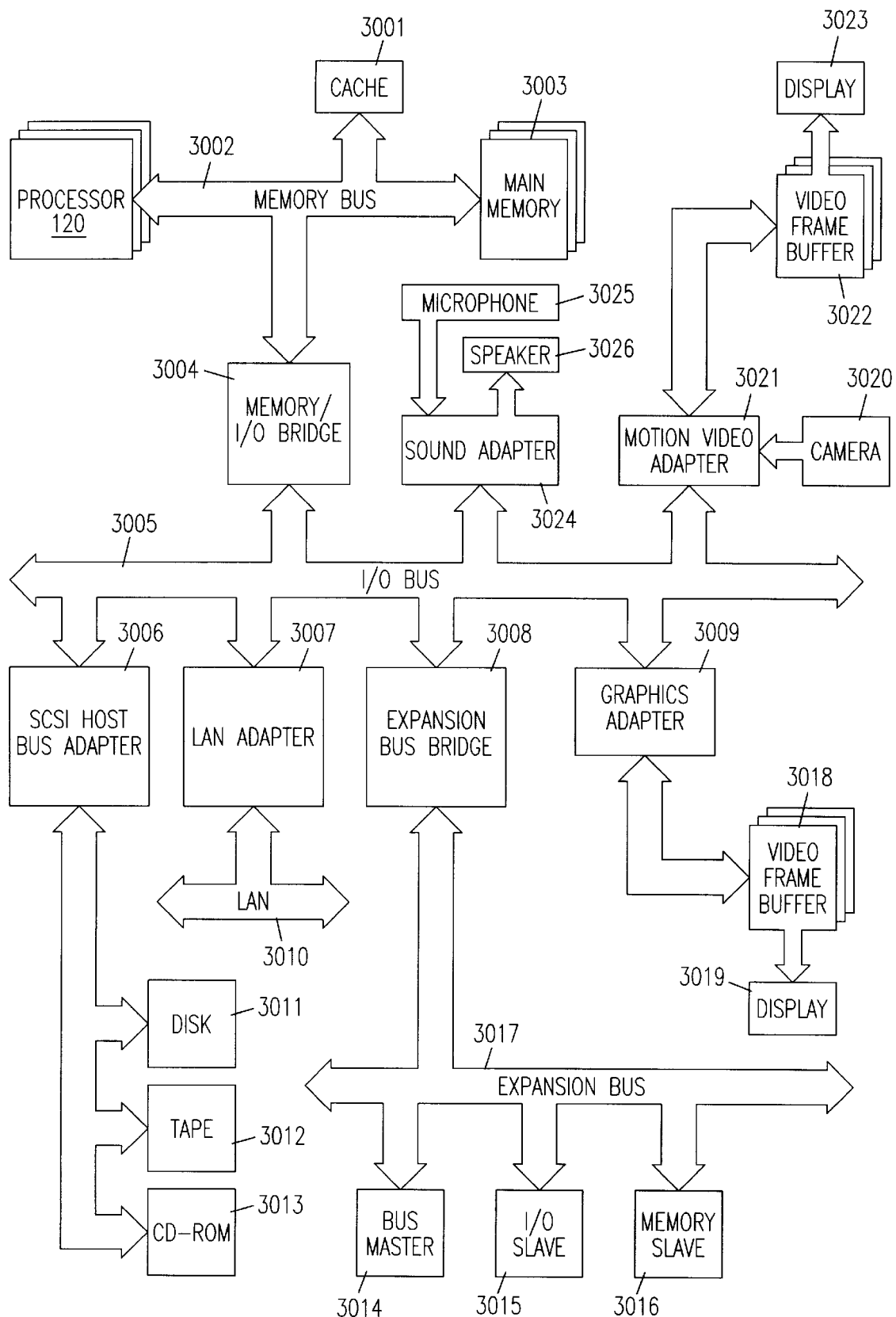
FIG. 15 is a block diagram of a multimedia computer incorporating a processor having an instruction decoder including emulation using indirect specifiers in accordance with an embodiment of the present invention.

Superscalar processor 120 may be incorporated into a wide variety of system configurations, illustratively into standalone and networked personal computer systems, workstation systems, multimedia systems, network server systems, multiprocessor systems, embedded systems, integrated telephony systems, video conferencing systems, etc. FIGS. 13–15 depict an illustrative set of suitable system configurations for a processor, such as superscalar processor 120, that has an instruction decoder including emulation using indirect specifiers. In particular, FIGS. 13–15 depict suitable combinations of a superscalar processor having an instruction decoder including emulation using indirect specifiers (hereinafter, superscalar processor 120) with suitable bus configurations, memory hierarchies and cache configurations, I/O interfaces, controllers, devices, and peripheral components.

The set of system configurations depicted in FIGS. 13–15 is merely illustrative and alternate combinations of bus configurations, memory hierarchies, I/O interfaces, controllers, devices, and peripheral components are also suitable. For example, suitable configurations for a system incorporating superscalar processor 120 include combinations of components, cards, interfaces, and devices such as:

1. video display devices, monitors, flat-panel displays, and touch screens;
2. pointing devices and keyboards;
3. coprocessors, floating point processors, graphics processors, I/O controllers, and UARTs;
4. secondary and tertiary storage devices, controllers, and interfaces, caches, RAM, ROM, flash memory, static RAM, dynamic RAM
5. CD-ROMs, fixed disks, removable media storage devices, floppy disks, WORMs, IDE controllers, enhanced-IDE controllers, SCSI devices, scanners and jukeboxes;
6. PCMCIA interfaces and devices, ISA busses and devices, EISA busses and devices, PCI local busses and devices, VESA local busses and devices, Micro Channel Architecture busses and devices;
7. network interfaces, adapters and cards such as for ethernet, token ring, 10Base-T, twisted pairs, untwisted pairs, ATM networks, frame-relay, ISDN, etc.;
8. video cards and devices, 2-D and 3-D graphics cards, frame buffers, MPEG/JPEG compression/decompression logic and devices, video-conferencing cards and devices, and video cameras and frame capture devices;
9. computer integrated telephony cards and devices, modem cards and devices, fax cards and devices;
10. sound cards and devices, audio and video input devices, microphones, and speakers;
11. data acquisition and control cards and interfaces, compression/decompression logic and devices, encryption/decryption logic and devices; and
12. tape backup units, redundant/fault tolerant components and devices such as RAID and ECC memory. Suitable combinations of such components, cards, interfaces, and devices (including those enumerated above as well as comparable components, cards, interfaces, and devices) are too numerous to list. However, those skilled in the art will appreciate the full set of suitable combinations and will recognize suitable couplings between such components, cards, interfaces, and devices. FIGS. 13–15 are illustrative of an exemplary subset of the full set of suitable combinations.

A networked personal computer incorporating superscalar processor 120 is shown in FIG. 13. Superscalar processor 120 is coupled to memory subsystem 1020. In the embodiment of FIG. 13, memory subsystem 1020 is shown as RAM, although alternative embodiments include a cache or caches interposed between the RAM and superscalar processor 120. Control logic and storage for such a cache may be distributed among the memory subsystem 1020 and the superscalar processor 120. For example, the level 1 caches (i.e., instruction cache 214 and data cache 216) and cache control logic 212 may be included in superscalar processor 120 as shown in FIG. 2 and the level 2 cache may be included as part of memory subsystem 1020. Alternative distributions are also suitable, although the level 1 caches are preferably on-chip with the out-of-order execution engine 222 (see FIG. 2) of superscalar processor 120.

In the embodiment of FIG. 13, superscalar processor 120 and memory subsystem 1020 are included as parts of motherboard 1033. A series of adapters, interfaces and controllers couple the processor to devices and peripheral components. These adapters, interfaces and controllers are typically be coupled to the processor as cards in a backplane bus of motherboard 1033. However, alternative embodiments may incorporate individual adapters, interfaces and controllers into motherboard 1033. For example, graphics adapter 1010 may be included on motherboard 1033 with superscalar processor 120. In either case, graphics adapter is coupled to superscalar processor 120 via busses such as those described below with reference to FIG. 14 and 15. Graphics adapter 1010 drives signals to control display 1001 in accordance with screen updates supplied by superscalar processor 120. Parallel interface 1009 and serial interface 1008 provide parallel port and serial port signaling interfaces for respectively interfacing to parallel port devices (e.g., printers such as parallel printer 1002, tape backup units, etc.) and to serial devices (e.g., modem 1003, pointing devices, and printers). In the embodiment of FIG. 13, parallel interface 1009 and serial interface 1008 are shown as separate interfaces although each is often incorporated with a hard disk/floppy disk controller (such as 1030) as a multifunction card. Hard disk/floppy disk controller 1030 controls access to the media of hard disk 1032 and to floppy disk 1031. Typically, hard disk/floppy disk controllers such as hard disk/floppy disk controller 1030 provide some level of buffering of reads and writes. Hard disk/floppy disk controller 1030 may also provide limited caching for data transfers to and from the disk media.

Suitable designs for graphics adapter 1010, parallel interface 1009, serial interface 1008, and hard disk/floppy disk controller 1030 are well known in the art. For example, implementations of graphics adapter cards conforming to the VGA standard are commonly available and suitable designs are well known to those skilled in the art. Designs for parallel and serial interfaces, such as those conforming to the Centronics parallel interface and to the RS-232C serial interface specifications, respectively, are also well known to those skilled in the art. Similarly, designs for IDE and SCSI disk controllers are well known in the art and suitable implementations are commonly available. In each case, graphics adapter 1010, parallel interface 1009, serial interface 1008, and hard disk/floppy disk controller 1030 are of any such suitable design.

Finally, LAN adapter 1007 provides a network interface to local area networks such as 802.3 ethernet, 10base-T, twisted pair, and token ring networks. As with the other adapters and interfaces, LAN adapter 1007 is typically coupled to the processor as a card in the backplane bus of motherboard 1033. However, alternative embodiments may incorporate LAN adapter 1007 into motherboard 1033. Suitable cards and devices providing network interfaces are well known in the art and LAN adapter 1007 is any such suitable card or device.

Because of the high performance associated with its superscalar design, superscalar processor 120 is particularly attractive as the processor, or a one of multiple processors, in a network server configuration such as than shown in FIG. 14. In the network server configuration of FIG. 14, multiple instances of superscalar processor 120 are shown coupled to a level 2 cache 2001 and to a processor bus 2027. In the embodiment FIG. 14, superscalar processor 120 includes an on-board level 1 cache (i.e., instruction cache 214 and data cache 216) and level 2 cache control logic. The level 2 cache control logic (not shown) is coupled to level 2 cache 2001 via a 64-bit cache bus. Alternate embodiments of superscalar processor 120, such as the embodiment of FIG. 2, may offload the functionality of level 2 cache control logic. In such an alternative embodiment, level 2 cache control logic may be interposed between superscalar processor 120 and level 2 cache 2001. In the context of bus structures presented in FIG. 14, level 2 cache control logic could be coupled to superscalar processor 120 via processor bus 2027. Suitable modifications to the level 2 cache configuration of FIG. 14 will be apparent to those skilled in the art.

Referring again to FIG. 14, superscalar processor 120 is coupled to a memory controller 2002 and to a system controller 2005 via a 64-bit processor bus 2027. Memory controller 2002 provides a 64-bit interface to memory 2003 including an 8-bit parity interface to support Error Correcting Codes (ECC). ECC memory is desirable, but optional, and alternative embodiments may forgo the parity interface. System controller 2005 provides the interface (or bridge) between the 64-bit processor bus 2027 and the 32-bit local bus 2009. Local bus 2009 is any high-speed I/O bus, for example, a VESA Local bus (VL bus) or Peripheral Component Interconnect (PCI) bus. System controller 2005 provides buffering to support the potentially disparate clock rates of processor bus 2027 and local bus 2009. System controller 2005 arbitrates for use of the two busses (2027 and 2009) and may, in certain configurations, support burst data transactions across the two busses. Suitable designs for interbus bridges, such as system controller 2005 (bridging processor bus 2027 and local bus 2009) and bridge and peripheral controller 2006 (bridging local bus 2009 and ISA bus 2010, as described below) are well known in the art. For example, U.S. Pat. No. 5,414,820, "Crossing Transfers for Maximizing the Effective Bandwith of a Dual-Bus Architecture," to McFarland et al., the entirety of which is incorporated herein by reference, describes a design suitable for bridging a high-speed system bus and a slower I/O bus. System controller 2005 and bridge and peripheral controller 2006 are of any such suitable design.

Local bus 2009 couples to multiple local bus devices and components (illustratively, to IDE controller 2008, SCSI Adapter 2018, LAN Adapter 2019, and bridge and peripheral controller 2006). Certain of the local bus devices and components on local bus 2009 may optionally be provided as cards coupled to the local bus 2009 by a modular connector. In the embodiment of FIG. 14, IDE controller 2008, SCSI adapter 2018, and LAN adapter 2019 are provided as cards coupled to the local bus 2009 by a modular connector. Bridge and peripheral controller 2006 is directly connected to the local bus 2009. Alternate configurations (including configurations in which one or more of the IDE controller 2008, SCSI adapter 2018, and LAN adapter 2019 are directly connected to local bus 2009) are also suitable and will be appreciated by those skilled in the art. In addition, alternative embodiments may couple a display adapter to local bus 2009 thereby taking advantage of the generally higher bandwidth and throughput of local bus 2009 for screen updates (when compared to alternatives such as ISA, EISA, and Micro Channel Architecture busses). Because display device requirements are typically less demanding in network server configurations than in personal computer or workstation configurations, display adapter 2020 is shown coupled to the lower bandwidth ISA bus 2010.

IDE controller 2008 is representative of a variety of controller designs (including IDE, enhanced IDE, ATA, and Enhanced Small Device Interface (ESDI) controller designs) for interfacing storage devices such as disks, tape drives, and CD-ROMs. IDE controller 2008 is coupled to two disks (hard disk 2011 and floppy disk 2012) and to a tape backup unit 2013. Alternative configurations may interface an IDE/ enhanced IDE CD-ROM via IDE controller 2008, although a both a CD-ROM 2015 and a CD jukebox 2017 are interfaced via a Small Computer System Interface (SCSI) adapter 2018 in the embodiment of FIG. 14. Suitable designs for hard disks, floppy disks, CD-ROMs, and tape drives are all well known in the art and modular components based on those designs are commonly available for IDE, enhanced IDE, and ATA based controller designs. IDE controller 2008 is of any such suitable design, including enhanced IDE, ATA, and ESDI alternatives.

SCSI adapter 2018 is coupled to local bus 2009 and to multiple SCSI devices (illustratively, to a Redundant Array of Inexpensive Disks (RAID) 2014, CD-ROM 2015, scanner 2016, and CD jukebox 2017) in a daisy chain configuration. For illustrative purposes, the daisy chain of SCSI devices is shown as a bus in FIG. 14. Additional SCSI devices may also be coupled to SCSI adapter 2018 and additional SCSI adapters may be coupled to local bus 2009 to provide even larger numbers of SCSI device connections. Additionally, SCSI adapter 2018 and/or additional SCSI adapters may be coupled to an Industry Standard Architecture (ISA) bus such as ISA bus 2010, although coupling to a local bus such as local bus 2009 is generally preferable because of the higher bandwidth and throughput of local busses conforming to standards such as the VL bus or PCI standards.

In addition to the set of SCSI devices shown in FIG. 14, additional hard disks printers, LAN adapters and other computer systems may be coupled to superscalar processor 120 via a SCSI adapter such as SCSI adapter 2018. Additionally, SCSI adapter 2018 is representative of suitable alternative device adapters such as SCSI-2 and ESDI adapters. Suitable designs for RAIDs, scanners, CD-ROM jukeboxes, hard disks, CD-ROMs, printers, LAN adapters and tape drives are all well known in the art and modular components based on those designs are commonly available for SCSI adapter designs. SCSI adapter 2018 is of any such suitable design, including SCSI-2 and ESDI alternatives.

LAN adapter 2019 is coupled to local bus 2009 and, in the embodiment of FIG. 14, provides support for an IEEE 802.3 Carrier Sense Multiple Access with Collision Detection (CSMA/CD) local area network, although adapters for alternative network configurations and for media variations of an 802.3 network are also be suitable. LAN adapter 2019 is therefore representative of suitable alternative device adapters such as those based on IEEE 802.x standards (e.g., 802.3 baseband ethernet on coaxial media, twisted and untwisted pair media, and 10base-T, 802.3 broadband networks, 802.4 token passing networks, 802.5 token ring networks, etc.), and those based on Fiber Distributed Data Interface (FDDI) standards. Designs for such suitable network adapters are well known in the art and modular components based on those designs are commonly available for both VL bus and PCI bus connections. In addition, suitable designs for network adapters with ISA, SCSI, and SCSI-2 interfaces are also are well known in the art and modular components based on those designs are also commonly available. Alternative embodiments may therefore incorporate LAN adapters such as LAN adapter 2019 coupled to superscalar processor 120 via ISA bus 2010 or SCSI adapter 2018, although coupling to a local bus such as local bus 2009 is generally preferable to the ISA bus alternative because of the higher bandwidth and throughput of local busses conforming to standards such as the VL bus or PCI standards. LAN adapter 2019 is of any suitable design, for any suitable network topology and medium, and is coupled to any of the suitable bus structures (e.g., VL bus, PCI bus, ISA bus, SCSI, etc.).

ISA bus 2010 is coupled to local bus 2009 via bridge and peripheral controller 2006. Suitable bridges, like system controller 2005 bridge, are well known in the art and bridge and peripheral controller 2006 is of any suitable design. ISA bus 2010 provides a lower-speed (when compared to local bus 2009), 16-bit I/O bus and provides modular connections for a variety of peripheral components including display adapter 2020, telephony card 2026, and a multifunction I/O card such as super I/O 2028. Display adapter s such as display adapter 2020 are w ell known in the art and provide varying degrees of support for advanced graphics functions. For example, simple text display adapters provide text and character based graphics only. More sophisticated display adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. As described above, display device requirements have typically been less demanding in network server configurations than in personal computer or workstation configurations. As a result, display adapter 2020 is shown coupled to the relatively low bandwidth ISA bus 2010. However, alternative embodiments may couple an advanced or specialized display adapter to local bus 2009 thereby taking advantage of the generally higher bandwidth and throughput of local bus 2009 for screen updates (when compared to alternatives such as ISA, EISA, and Micro Channel Architecture busses).

Super I/O 2028 provides support for a serial port 2022, a parallel port 2023, a pointing device 2024, and a disk 2025. Suitable designs for combination ISA cards such as super I/O 2028 are well known in the art and such cards are commonly available. Super I/O 2028 is of any such suitable design. Modems may be coupled via serial port 2022 and printers may be coupled via either the serial port 2022 or parallel port 2023 provided by super I/O 2028. Alternatively, a single function ISA card may be used for such purposes. Modem and fax/modem cards are one example of such a single function card. Telephony card 2026 is representative of cards providing voice, fax, and speech recognition, modem, fax-on-demand services, etc. Suitable telephony cards typically conform to standards defining a modular architecture for integrating computer-based application with telephony hardware. These standards include the Communicating Applications Specification (CAS) and the more comprehensive Signal Computing System Architecture (SCSA) standard. Telephony card 2026 is of any such suitable design.

Preferably, a high performance server configuration, such as that shown in FIG. 14, includes a hierarchy of busses with varying performance characteristics each matched to the devices and components coupled thereto. Those skilled in the art will recognize a variety of suitable variations on the bus hierarchy of FIG. 14, including the elimination individual busses, the addition of multiple instances of individual busses, and redistribution of devices and components among the various busses. The server configuration of FIG. 14 is representative of all such suitable variations.

A multimedia workstation configuration for superscalar processor 120 shown in FIG. 15. As with the server configuration of FIG. 14, the multimedia workstation configuration includes a hierarchy of busses with varying performance characteristics each matched to the devices and components coupled thereto. Those skilled in the art will recognize a variety of suitable variations on the bus hierarchy of FIG. 15. Memory bus 3002 couples superscalar processor 120, cache 3001, memory 3003, and bridge 3004. As with the network server configuration of FIG. 14, a variety of cache configurations are suitable for a multimedia workstation. In the embodiment FIG. 15, superscalar processor 120 includes an on-board level 1 cache (i.e., the instruction cache 214 and data cache 216 of FIG. 2). A level 2 cache (i.e., cache 3001) including control logic is coupled to superscalar processor 120 via memory bus 3002. Alternate embodiments of superscalar processor 120, may incorporate functionality of level 2 cache control logic thereby enabling a direct connection to level 2 cache storage. Furthermore, alternative embodiments may relocate all cache support to cache 3001, although at least a level 1 cache is preferably on-chip with the out-of-order execution engine 222 (see FIG. 2) of superscalar processor 120. Suitable modifications to the cache configuration of FIG. 14 will be apparent to those skilled in the art.

I/O bus 3005 is comparable to local bus 2009 of FIG. 14 and is preferably a high speed I/O bus such as a VL bus or PCI bus. SCSI adapter 3006, LAN adapter expansion bus bridge 3008, graphics adapter 3009, sound adapter 3024, and motion video adapter 3021 are coupled to each other and to superscalar processor 120 via I/O bus 3005. SCSI adapter 3006, LAN adapter 3007, and expansion bus bridge 3008, together with the components and devices coupled to each are comparable to corresponding adapters, components, and devices discussed above with reference to FIG. 14.

In particular, SCSI adapter 3006 is coupled to multiple SCSI devices (illustratively, disk 3011, tape backup unit 3012, and CD-ROM 3013) in a daisy chain configuration. For illustrative purposes, the daisy chain of SCSI devices is shown as a bus. Additional SCSI devices may also be coupled to SCSI adapter 3006. Suitable designs for SCSI adapter 3006 are discussed above with reference to the comparable SCSI adapter 2018 of FIG. 14. Variations on the set of SCSI devices, and on SCSI configurations in general (each of which has been described above with reference to FIG. 14) are also applicable in the multimedia workstation configuration of FIG. 15. Similarly, suitable designs and variations on LAN adapter 3007 are also described above in the context of the comparable LAN adapter 2019 (see FIG. 14). Furthermore, suitable designs and variations on expansion bus 3017 are described above in the context of the comparable ISA bus 2010 (see FIG. 14). As described above, suitable designs for SCSI adapter 2018 and ISA bus 2010 are well known in the art and modular components based on such suitable designs are commonly available. SCSI adapter 3006, LAN adapter 3007, and expansion bus 3017 (together with the components and devices coupled thereto) are comparable. SCSI adapter 3006, LAN adapter 3007, expansion bus bridge 3008, and expansion bus 3017 are therefore also of any such suitable designs.

As shown above in FIG. 2, out-of-order execution engine 222 of superscalar processor 120 includes a multimedia unit 157 for executing multimedia extensions to the x86 instruction set. Referring again to FIG. 15, multimedia adapters, such as sound adapter 3024, motion video adapter 3021, and graphics adapter 3009, are each coupled to superscalar processor 120 via I/O bus 3005 and memory bus 3002 to provide for high-bandwidth transfers of multimedia data between the multimedia adapters, memory 3003, and secondary storage devices (e.g., disk 3011). Sound adapter 3024 provides digital-to-analog (D/A) and analog-to-digital (A/D) interfaces for respectively synthesizing and sampling audio signals. The D/A and A/D interfaces of sound adapter 3024 are respectively coupled to an audio performance device, such as a speaker 3026, and an audio signal acquisition device, such as a microphone 3025. Other suitable audio performance devices include mixing consoles, signal processing devices, synthesizers, MIDI sequencers and power amplifiers. Other suitable audio signal acquisition devices include signal processing devices and digital samplers. Suitable designs for sound cards are well known in the art and sound adapter 3024 is of any such suitable design.

Motion video adapter 3021 provides support for capture and compression of video signals, for example, from video camera 3020. In addition, motion video adapter 3021 supplies a display device 3023 such as a television, high-definition television, or a high resolution computer monitor with display signals via a frame buffer 3022. Alternative embodiments of motion video adapter 3021 may eliminate the frame buffer 3022 and directly drive a raster display. Furthermore, alternative embodiments of motion video adapter 3021 may decouple the video input and video output functionality of motion video adapter 3021, and instead provide separate video input and video output components.

Because video information requires large amounts of storage space, it is generally compressed. Accordingly, to display compressed video information, for example from data represented on a compact disk in CD-ROM 3013, the compressed video information must be decompressed. High bandwidth burst mode data transfers are supported by I/O bus 3005, which is preferably a local bus such as PCI with support for arbitrary length burst data transfers. In the multimedia workstation configuration of FIG. 15, video compression and decompression can be performed by superscalar processor 120 (executing multimedia instructions in multimedia unit 157) and/or by motion video adapter 3021. Thus, memory bus 3002 and bridge 3004 preferably support burst data transfers across the bridge (3004) between memory bus 3002 and I/O bus 3005. Suitable designs for motion video adapters typically provide support for the Moving Pictures Expert Group (MPEG) standards for video encoding and decoding (e.g., MPEG-1 and MPEG-2) and for JPEG. In addition, motion video adapter 3021 may support video conferencing by providing implementing video compression/decompression algorithms in accordance with H.261 (the standard compression algorithm for H.320 video-conferencing). Suitable designs for implementing such compression/decompression algorithms are well known in the art and motion video adapter 3021 is of any such suitable design.

Graphics adapters such as graphics adapter 3009 are well known in the art and provide varying degrees of support for advanced graphics functions. For example, graphics adapters, such as those implementing SVGA, XGA, VESA, CGA, and Hercules graphics standards provide multibit color and higher display resolutions. Specialized display adapters may provide more advanced features, such as hardware support for 24-bit color, 3-D graphics, hidden surface removal, lighting models, Gouraud shading, depth queuing, and texture mapping. Suitable designs for graphics adapters are well known in the art and modular components based on these designs are commonly available. Graphics adapter 3009 is of any such suitable design. Alternative embodiments my combine the graphics display functionality of graphics adapter 3009 with the motion video display functionality of motion video adapter 3021 outputting on a single high-resolution display device.

CROSS-REFERENCE

The present invention is related to subject matter disclosed in the following co-pending patent applications:

1. U.S. patent application Ser. No. 08/649,981, entitled, "Instruction Predecode and Multiple Instruction Decode," naming John G. Favor and Amos Ben-Meir as inventors and filed on even date herewith;
2. U.S. patent application Ser. No. 08/592,150, entitled, "Self-Modifying Code Handling System" naming Amos Ben-Meir and John G. Favor as inventors and filed on Jan. 26, 1996;
3. U.S. patent application Ser. No. 08/592,209, entitled, "Out-of-Order Load/Store Execution Control," naming John G. Favor, Amos Ben-Meir, Warren G. Stapleton, Jeffrey E. Trull and Mark E. Roberts as inventors and filed on Jan. 26, 1996;
4. U.S. patent application Ser. No. 08/649,242, entitled, "Out-of-Order Processing With Operation Bumping to Reduce Pipeline Delay," naming John G. Favor and Amos Ben-Meir as inventors and filed on even date herewith;
5. U.S. patent application Ser. No. 08/650,055 entitled, "Scan Chain for Rapidly Identifying First or Second Objects of Selected Types In A Sequential List," naming John G. Favor, Amos Ben-Meir and Jeffrey E. Trull as inventors and filed on even date herewith;
6. U.S. patent application Ser. No. 08/649,984, entitled, "Instruction Decoder Including Two-Way Emulation Code Branching," naming John G. Favor as inventor and filed on even date herewith;
7. U.S. patent application Ser. No. 08/649,980, entitled, "Instruction Decoder Including Emulation Using Indirect Specifiers," naming John G. Favor as inventor and filed on even date herewith;
8. U.S. patent application Ser. No. 08/649,983, entitled, "RISC 86 Instruction Set," naming John G. Favor as inventor and filed on even date herewith; and
9. U.S. patent application Ser. No. 08/649,982, entitled, "Flexible Implementation of a System Management Mode (SMM) in a Processor," naming John G. Favor and Frederick D. Weber as inventors and filed on even date herewith;
10. U.S. patent application Ser. No. 08/592,041, entitled, "Design for a Simulation Module Using an Object-Oriented Programming Language," naming Warren G. Stapleton as inventor and filed on Jan. 26, 1996;
11. U.S. patent application Ser. No. 08/592,828, entitled, "Method for Analyzing The Performance of a Microprocessor," naming Warren G.
Stapleton as inventor and filed on Jan. 26, 1996;
12. U.S. patent application Ser. No. 08/592,829, entitled, "Method for Simulating Cache Operation," naming Warren G. Stapleton as inventor and filed on Jan. 26, 1996;
13. U.S. patent application Ser. No. 08/649,847, entitled, "Unified Multi-Function Operation Scheduler for Out-Of-Order Execution In A Superscalar Processor" naming John G. Favor, Amos Ben-Meir and Warren G. Stapleton as inventors and filed on even date herewith; and
14. U.S. patent application Ser. No. 08/649,847, entitled, "A Cache Controller With Table Walk Logic Tightly Coupled to Second Level Access Logic" filed on even date herewith;

each of which is incorporated herein by reference, in its entirety.

While the invention has been described with reference to various embodiments, it will be understood that these embodiments are illustrative and that the scope of the invention is not limited to them. Many variations, modifications, additions, and improvements of the embodiments described are possible. Additionally, structures and functionality presented as hardware in the exemplary embodiment may be implemented as software, firmware, or microcode in alternative embodiments. For example, the description depicts a macroinstruction decoder having short decode pathways including three rotators 430, 432 and 434, three instruction registers 450, 452 and 454 and three short decoders SDec0 410, SDec1 412 and SDec2 414. In other embodiments, different numbers of short decoder pathways are employed. A decoder that employs two decoding pathways is highly suitable. These and other variations, modifications, additions, and improvements may fall within the scope of the invention as defined in the claims which follow.

What is claimed is:

1. An apparatus for receiving a plurality of variable-length instructions arranged in a memory alignment from an instruction source and preparing the instructions for execution comprising:

an instruction cache coupled to the instruction source and having a plurality of instruction storage elements and a corresponding plurality of predecode storage elements, each of the variable-length instructions being stored in one or more instruction storage elements in the memory alignment and the predecode storage elements for storing predecode information corresponding to the variable-length instructions stored in each instruction storage element;

a predecoder coupled to the instruction cache for accessing the variable-length instructions and assigning predecode information indicative of instruction length to the predecode storage elements assuming each instruction storage element stores a first instruction byte of a variable-length instruction;

a buffer circuit coupled to the predecoder for holding the variable-length instructions and the corresponding predecode information, converting the variable length instructions from the memory alignment to an instruction alignment, and designating the first instruction byte location of a variable-length instruction; and a decoder circuit coupled to the instruction cache to receive the variable-length instructions in the instruction alignment and the predecode information, the decoder circuit including a plurality of decoders for receiving a plurality of variable-length instructions, each beginning at the designated first instruction byte locations, and decoding the plurality of variable-length instructions in parallel.

2. An apparatus according to claim 1 wherein the buffer circuit further comprises:

an instruction buffer coupled to the instruction cache for holding the variable-length instructions and for continually reloading with new variable-length instructions as variable-length instructions are decoded by the decoder circuit; and a predecode expansion circuit coupled to the instruction buffer for converting the predecode information indicative of instruction length to an instruction length.

3. An apparatus according to claim 1 wherein the buffer circuit further comprises:

an instruction buffer coupled to the instruction cache including a sixteen instruction byte storage for storing sixteen bytes of the variable-length instructions, and sixteen multiple-bit predecode element storage corresponding to the sixteen instruction byte storage; and a predecode expansion circuit coupled to the instruction buffer for converting the predecode information indicative of instruction length to an instruction length and storing the instruction length in an instruction byte storage.

4. An apparatus according to claim 1 wherein the buffer circuit further comprises:

an instruction buffer coupled to the instruction cache for holding the variable-length instructions and for continually reloading with new variable-length instructions as variable-length instructions are decoded by the decoder circuit; and a plurality of instruction multiplexers respectively coupled to the plurality of decoders, the instruction multiplexers for converting the variable-length instructions in the instruction buffer from a memory alignment to an instruction alignment.

5. An apparatus according to claim 1 wherein the buffer circuit further comprises:

an instruction buffer coupled to the instruction cache for holding the variable-length instructions and for continually reloading with new variable-length instructions as variable-length instructions are decoded by the decoder circuit;

a plurality of instruction multiplexers respectively coupled to the plurality of decoders, the instruction multiplexers for converting the variable-length instructions in the instruction buffer from a memory alignment to an instruction alignment; and a program counter coupled to the plurality of instruction multiplexers and supplying a program count representing an initial point for decoding instructions, the program count being combined with the predecode information indicative of instruction length to designate the first instruction byte location of a variable-length instruction.

6. An apparatus according to claim 1 wherein the buffer circuit further comprises:

an instruction buffer coupled to the instruction cache;

a program counter coupled to the plurality of instruction multiplexers and supplying a program count representing an initial point for decoding instructions; and an instruction lookahead logic circuit coupled to the instruction buffer, the program counter and the plurality of decoders, the instruction lookahead logic circuit for deriving the first instruction byte location of a variable-length instruction based on the program count and the predecode information indicative of instruction length, the first instruction byte locations being rapidly derived so that the decoders decode variable-length instructions in parallel.

7. An apparatus according to claim 1 wherein the buffer circuit further comprises:

an instruction buffer coupled to the instruction cache;

a plurality of instruction multiplexers respectively coupled to the plurality of decoders, the instruction multiplexers for converting the variable-length instructions in the instruction buffer from a memory alignment to an instruction alignment;

a program counter coupled to the plurality of instruction multiplexers and supplying a program count representing an initial point for decoding instructions; and an instruction lookahead logic circuit coupled to the instruction buffer, the plurality of instruction multiplexers, the program counter and the plurality of decoders, the instruction lookahead logic circuit for deriving the first instruction byte location of a variable-length instruction based on the program count and the predecode information indicative of instruction length, the first instruction byte locations being rapidly derived so that the decoders decode variable-length instructions in parallel.

8. An apparatus according to claim 7 wherein the instruction lookahead logic circuit further comprises:

a circuit for determining whether the predecode information is valid based on the predecode information indicative of instruction length.

9. An apparatus for receiving a plurality of variable-length instructions arranged in a memory alignment from an instruction source and preparing the instructions for execution comprising:

an instruction cache coupled to the instruction source and having a plurality of instruction storage elements and a corresponding plurality of predecode storage elements, each of the variable-length instructions being stored in one or more instruction storage elements in the memory alignment and the predecode storage elements for storing predecode information corresponding to the variable-length instructions stored in each instruction storage element;

a predecoder coupled to the instruction cache for accessing the variable-length instructions, assigning predecode information indicative of instruction length to the predecode storage elements assuming each instruction storage element stores a first instruction byte of a variable-length instruction, and designating the variable-length instructions as first-type and second-type variable-length instructions based on the information indicative of instruction length;

a buffer circuit coupled to the predecoder for holding the variable-length instructions and the corresponding predecode information, converting the variable length instructions from the memory alignment to an instruction alignment, and designating the first instruction byte location of a variable-length instruction; and a decoder circuit coupled to the instruction cache to receive the variable-length instructions in the instruction alignment and the predecode information, the decoder circuit including a plurality of first type decoders and a second type decoder, the first type decoders for receiving a plurality of first-type variable-length instructions, each beginning at the designated first instruction byte locations, and decoding the plurality of first-type variable-length instructions in parallel, the second type decoder for decoding a second-type variable length instruction.

10. An apparatus according to claim 9 wherein the buffer circuit further comprises:

an instruction buffer coupled to the instruction cache for holding first-type and second-type variable-length instructions and for continually reloading with new variable-length instructions as variable-length instructions are decoded by the decoder circuit; and a predecode expansion circuit coupled to the instruction buffer for converting the predecode information indicative of instruction length to an instruction length.

11. An apparatus according to claim 9 wherein the buffer circuit further comprises:

an instruction buffer coupled to the instruction cache including a sixteen instruction byte storage for storing sixteen bytes of the variable-length instructions, and sixteen multiple-bit predecode element storage corresponding to the sixteen instruction byte storage; and a predecode expansion circuit coupled to the instruction buffer for converting the predecode information indicative of instruction length to an instruction length and storing the instruction length in an instruction byte storage.

12. An apparatus according to claim 9 wherein the buffer circuit further comprises:

an instruction buffer coupled to the instruction cache for holding the variable-length instructions and for continually reloading with new variable-length instructions as variable-length instructions are decoded by the decoder circuit; and a plurality of instruction multiplexers respectively coupled to the plurality of first type decoders, the instruction multiplexers for converting the first-type variable-length instructions in the instruction buffer from a memory alignment to an instruction alignment.

13. An apparatus according to claim 12 wherein one instruction multiplexer of the plurality of instruction multiplexers is coupled to the second type decoder and coupled to one respective first type decoder.

14. An apparatus according to claim 9 wherein the buffer circuit further comprises:

an instruction buffer coupled to the instruction cache for holding the variable-length instructions and for continually reloading with new variable-length instructions as variable-length instructions are decoded by the decoder circuit;

a plurality of instruction multiplexers respectively coupled to the plurality of first type decoders, the instruction multiplexers for converting the variable-length instructions in the instruction buffer from a memory alignment to an instruction alignment; and a program counter coupled to the plurality of instruction multiplexers and supplying a program count representing an initial point for decoding instructions, the program count being combined with the predecode information indicative of instruction length to designate the first instruction byte location of a variable-length instruction.

15. An apparatus according to claim 14 wherein one instruction multiplexer of the plurality of instruction multiplexers is coupled to the second type decoder and coupled to one respective first type decoder.

16. An apparatus according to claim 9 wherein the buffer circuit further comprises:

an instruction buffer coupled to the instruction cache;

a program counter coupled to the plurality of instruction multiplexers and supplying a program count representing an initial point for decoding instructions; and an instruction lookahead logic circuit coupled to the instruction buffer, the program counter and the plurality of first type decoders, the instruction lookahead logic circuit for deriving the first instruction byte location of a variable-length instruction based on the program count and the predecode information indicative of instruction length, the first instruction byte locations being rapidly derived so that the first type decoders decode variable-length instructions in parallel.

17. An apparatus according to claim 9 wherein the buffer circuit further comprises:

an instruction buffer coupled to the instruction cache;

a plurality of instruction multiplexers respectively coupled to the plurality of first type decoders, the instruction multiplexers for converting the variable-length instructions in the instruction buffer from a memory alignment to an instruction alignment;

a program counter coupled to the plurality of instruction multiplexers and supplying a program count representing an initial point for decoding instructions; and an instruction lookahead logic circuit coupled to the instruction buffer, the plurality of instruction multiplexers, the program counter and the plurality of first type decoders, the instruction lookahead logic circuit for deriving the first instruction byte location of a variable-length instruction based on the program count and the predecode information indicative of instruction length, the first instruction byte locations being rapidly derived so that the first type decoders decode variable-length instructions in parallel.

18. An apparatus according to claim 17 wherein the instruction lookahead logic circuit further comprises:

a circuit for determining whether the predecode information is valid based on the predecode information indicative of instruction length.

19. An apparatus according to claim 9 further comprising:

a branch target buffer coupled to the instruction cache and the buffer circuit, the branch target buffer for storing a plurality of target instructions, the branch target buffer and the instruction cache alternatively supplying variable-length instructions to the buffer circuit.

20. A method of receiving a plurality of variable-length instructions arranged in a memory alignment from an instruction source and preparing the instructions for execution, comprising the steps of:

receiving the plurality of variable-length instructions from the instruction source;

storing the variable-length instructions in a plurality of instruction storage elements, each of the variable-length instructions being stored in one or more instruction storage elements in the memory alignment;

accessing the variable-length instructions and assigning predecode information indicative of instruction length to the instruction storage elements assuming each instruction storage element stores a first instruction byte of a variable-length instruction;

storing predecode information corresponding to the variable-length instructions in a plurality of predecode storage elements corresponding to the plurality of instruction storage elements;

holding the variable-length instructions and the corresponding predecode information in a buffer;

converting the variable length instructions from the memory alignment to an instruction alignment;

designating the first instruction byte location of a variable-length instruction;

receiving the variable-length instructions in the instruction alignment at a plurality of decoders, each variable-length instruction beginning at the designated first instruction byte locations; and decoding the plurality of variable-length instructions in parallel.

21. A method according to claim 20, further comprising the steps of:

supplying a program count representing an initial point for decoding instructions; and deriving the first instruction byte location of a variable-length instruction based on the program count and the predecode information indicative of instruction length, the first instruction byte locations being rapidly derived so that the decoders decode variable-length instructions in parallel.

22. A method of receiving a plurality of variable-length instructions arranged in a memory alignment from an instruction source and preparing the instructions for execution, comprising the steps of:

receiving the plurality of variable-length instructions from the instruction source;

storing the variable-length instructions in a plurality of instruction storage elements, each of the variable-length instructions being stored in one or more instruction storage elements in the memory alignment;

accessing the variable-length instructions and assigning predecode information indicative of instruction length to the instruction storage elements assuming each instruction storage element stores a first instruction byte of a variable-length instruction;

storing predecode information corresponding to the variable-length instructions in a plurality of predecode storage elements corresponding to the plurality of instruction storage elements;

holding the variable-length instructions and the corresponding predecode information in a buffer;

converting the variable length instructions from the memory alignment to an instruction alignment;

designating the first instruction byte location of a variable-length instruction;

designating the variable-length instructions as first-type and second-type variable-length instructions based on the information indicative of instruction length;

receiving the variable-length instructions in the instruction alignment at a plurality of decoders including a plurality of first type decoders and a second type decoder, the first type decoders for receiving a plurality of first-type variable-length instructions, each variable-length instruction beginning at the designated first instruction byte locations;

decoding the plurality of first-type variable-length instructions in parallel; and decoding a second-type variable length instruction.

23. A computer system comprising:

a memory subsystem which stores data and instructions; and a processor operably coupled to access the data and instructions stored in the memory subsystem, wherein the processor includes a circuit for receiving a plurality of variable-length instructions arranged in a memory alignment from an instruction source and preparing the instructions for execution, the circuit including:

an instruction cache coupled to the instruction source and having a plurality of instruction storage elements and a corresponding plurality of predecode storage elements, each of the variable-length instructions being stored in one or more instruction storage elements in the memory alignment and the predecode storage elements for storing predecode information corresponding to the variable-length instructions stored in each instruction storage element;

a predecoder coupled to the instruction cache for accessing the variable-length instructions and assigning predecode information indicative of instruction length to the predecode storage elements assuming each instruction storage element stores a first instruction byte of a variable-length instruction;

a buffer circuit coupled to the predecoder for holding the variable-length instructions and the corresponding predecode information, converting the variable length instructions from the memory alignment to an instruction alignment, and designating the first instruction byte location of a variable-length instruction; and a decoder circuit coupled to the instruction cache to receive the variable-length instructions in the instruction alignment and the predecode information, the decoder circuit including a plurality of decoders for receiving a plurality of variable-length instructions, each beginning at the designated first instruction byte locations, and decoding the plurality of variable-length instructions in parallel.

24. The computer system of claim 23, wherein the processor and the memory subsystem are components of a motherboard.

25. The computer system of claim 24, wherein the motherboard further comprises a backplane bus operably connected to the processor, and wherein the computer system further comprises one or more devices on cards connected to the motherboard via the backplane bus.

26. The computer system of claim 23, further comprising a parallel device interface operably coupled to the processor.

27. The computer system of claim 26, further comprising a printer connected to the processor via the parallel interface.

28. The computer system of claim 23, further comprising a serial device interface operably coupled to the processor.

29. The computer system of claim 28, further comprising a modem connected to the processor via the serial interface.

30. The computer system of claim 23, further comprising a graphics adapter operably coupled to the processor.

31. The computer system of claim 30, further comprising a video display connected to the processor via the graphics adapter.

32. The computer system of claim 23, further comprising a local area network adapter operably coupled to the processor.

33. The computer system of claim 32, further comprising a network of devices connected to the processor via the network adapter.

34. The computer system of claim 23, further comprising a disk controller operably coupled to the processor.

35. The computer system of claim 34, further comprising a hard disk connected to the processor via the disk controller.

36. The computer system of claim 34, further comprising a floppy disk connected to the processor via the disk controller.

37. A network server comprising:

a superscalar processor including a circuit for receiving a plurality of variable-length instructions arranged in a memory alignment from an instruction source and preparing the instructions for execution including:

an instruction cache coupled to the instruction source and having a plurality of instruction storage elements and a corresponding plurality of predecode storage elements, each of the variable-length instructions being stored in one or more instruction storage elements in the memory alignment and the predecode storage elements for storing predecode information corresponding to the variable-length instructions stored in each instruction storage element;

a predecoder coupled to the instruction cache for accessing the variable-length instructions and assigning predecode information indicative of instruction length to the predecode storage elements assuming each instruction storage element stores a first instruction byte of a variable-length instruction;

a buffer circuit coupled to the predecoder for holding the variable-length instructions and the corresponding predecode information, converting the variable length instructions from the memory alignment to an instruction alignment, and designating the first instruction byte location of a variable-length instruction; and a decoder circuit coupled to the instruction cache to receive the variable-length instructions in the instruction alignment and the predecode information, the decoder circuit including a plurality of decoders for receiving a plurality of variable-length instructions, each beginning at the designated first instruction byte locations, and decoding the plurality of variable-length instructions in parallel;

a memory;

a processor bus coupled between the memory and the superscalar processor;

a local bus and an I/O bus;

first and second bridges, respectively coupling the processor bus to the local bus and the local bus to the I/O bus; and a LAN adapter coupled to one of the local bus and the I/O bus.

38. A network server, as recited in claim 37, further comprising:

a data storage device coupled to one of the local bus and the I/O bus.

39. A network server, as recited in claim 38, wherein the storage device comprises a hard disk.

40. A network server, as recited in claim 39, wherein the hard disk is selected from the group consisting of an IDE disk, an enhanced IDE disk, an ATA disk, an ESDI disk, and a SCSI disk.

41. A network server, as recited in claim 38, wherein the storage device comprises a tape unit.

42. A network server, as recited in claim 41, wherein the tape unit is selected from the group consisting of an IDE tape unit, an enhanced IDE tape unit, an ATA tape unit, an ESDI tape unit, and a SCSI tape unit.

43. A network server, as recited in claim 38, wherein the storage device comprises a CD-ROM.

44. A network server, as recited in claim 43, wherein the CD-ROM is selected from the group consisting of an IDE CD-ROM, an enhanced IDE CD-ROM, an ATA CD-ROM, an ESDI CD-ROM, and a SCSI CD-ROM.

45. A network server, as recited in claim 38, wherein the storage device comprises a jukebox.

46. A network server, as recited in claim 38, wherein the storage device comprises a RAID.

47. A network server, as recited in claim 38, wherein the storage device comprises a flash memory.

48. A network server, as recited in claim 37, wherein the LAN adapter is selected from the group consisting of a baseband network LAN adapter, a broadband network LAN adapter, a token passing network LAN adapter, a token ring network LAN adapter, a 10base-T network LAN adapter, and an ethernet LAN adapter.

49. A network server, as recited in claim 37, wherein the local bus comprises a VL bus.

50. A network server, as recited in claim 37, wherein the local bus comprises a PCI bus.

51. A network server, as recited in claim 37, wherein the I/O bus is selected from the group consisting of an ISA bus, an EISA bus, a Micro Channel Architecture Bus, and a local bus.

52. A network server, as recited in claim 37, further comprising:
a communications device coupled to one of the local bus and the I/O bus.

53. A network server, as recited in claim 52, wherein the communications device comprises one of a modem, a faxmodem, and an integrated telephony device.

54. A network server, as recited in claim 54, wherein the communications device further comprises a printed circuit card coupled to one of the local bus and the I/O bus via a modular connector.

55. A network server, as recited in claim 54, wherein the communications device is coupled to one of the local bus and the I/O bus via a serial interface.

56. A network server, as recited in claim 37, further comprising:
an I/O device coupled to one of the local bus and the I/O bus.

57. A network server, as recited in claim 56, wherein the I/O device is selected from the group consisting of a text display adapter, a graphics adapter, a 3-D graphics adapter, a SVGA display adapter, an XGA adapter, a display adapter supporting VESA graphics standards, a CGA adapter, an adapter supporting Hercules graphics standards.

58. A network server, as recited in claim 56, wherein the I/O device is selected from the group consisting of a pointing device, a mouse, a trackball, and a keyboard.

59. A network server comprising:
a superscalar processor including a circuit for receiving a plurality of variable-length instructions arranged in a memory alignment from an instruction source and preparing the instructions for execution including:
an instruction cache coupled to the instruction source and having a plurality of instruction storage elements and a corresponding plurality of predecode storage elements, each of the variable-length instructions being stored in one or more instruction storage elements in the memory alignment and the predecode storage elements for storing predecode information corresponding to the variable-length instructions stored in each instruction storage element;
a predecoder coupled to the instruction cache for accessing the variable-length instructions and assigning predecode information indicative of instruction length to the predecode storage elements assuming each instruction storage element stores a first instruction byte of a variable-length instruction;
a buffer circuit coupled to the predecoder for holding the variable-length instructions and the corresponding predecode information, converting the variable length instructions from the memory alignment to an instruction alignment, and designating the first instruction byte location of a variable-length instruction; and
a decoder circuit coupled to the instruction cache to receive the variable-length instructions in the instruction alignment and the predecode information, the decoder circuit including a plurality of decoders for receiving a plurality of variable-length instructions, each beginning at the designated first instruction byte locations, and decoding the plurality of variable-length instructions in parallel; and
a LAN adapter coupled to the superscalar processor.

60. A network server, as recited in claim 59, wherein the LAN adapter is selected from the group consisting of a baseband network LAN adapter, a broadband network LAN adapter, a token passing network LAN adapter, a token ring network LAN adapter, a 10base-T network LAN adapter, and an ethernet LAN adapter.

61. A network server, as recited in claim 59, further comprising a hard disk coupled to the superscalar processor.

62. A network server, as recited in claim 61, wherein the hard disk is selected from the group consisting of an IDE disk, an enhanced IDE disk, an ATA disk, an ESDI disk, and a SCSI disk.

63. A network server, as recited in claim 59, further comprising a tape unit coupled to the superscalar processor.

64. A network server, as recited in claim 63, wherein the tape unit is selected from the group consisting of an IDE tape unit, an enhanced IDE tape unit, an ATA tape unit, an ESDI tape unit, and a SCSI tape unit.

65. A network server, as recited in claim 59, further comprising a CD-ROM coupled to the superscalar processor.

66. A network server, as recited in claim 65, wherein the CD-ROM is selected from the group consisting of an IDE CD-ROM, an enhanced IDE CD-ROM, an ATA CD-ROM, an ESDI CD-ROM, and a SCSI CD-ROM.

67. A network server, as recited in claim 59, further comprising a jukebox coupled to the superscalar processor.

68. A network server, as recited in claim 59, further comprising a RAID coupled to the superscalar processor.

69. A network server, as recited in claim 59, further comprising a flash memory coupled to the superscalar processor.

70. A network server, as recited in claim 59, further comprising a modem coupled to the superscalar processor.

71. A network server, as recited in claim 59, further comprising a faxmodem coupled to the superscalar processor.

72. A network server, as recited in claim 59, further comprising an integrated telephony device coupled to the superscalar processor.

73. A network server, as recited in claim 59, further comprising a display adapter coupled to the superscalar processor, the display adapter selected from the group consisting of a text display adapter, a graphics adapter, a 3-D graphics adapter, a SVGA display adapter, an XGA adapter, a display adapter supporting VESA graphics standards, a CGA adapter, an adapter supporting Hercules graphics standards.

74. A network server, as recited in claim 59, further comprising an I/O device coupled to the superscalar processor, the I/O device selected from the group consisting of a pointing device, a mouse, a trackball, and a keyboard.

75. A multimedia computer system incorporating a processor including an instruction buffer system, the multimedia computer system comprising:
a multimedia performance device;
a multimedia adapter coupled to the multimedia performance device and coupled to the multimedia signal acquisition device, the multimedia adapter including a signal conversion interface for synthesizing and sampling multimedia signals;
an input/output bus coupled to the multimedia adapter for communicating transfers of multimedia data;
a superscalar processor coupled to the input/output bus for processing multimedia data and controlling communication of multimedia data between the superscalar processor and the multimedia adapter, the superscalar processor including a circuit for receiving a plurality of variable-length instructions arranged in a memory alignment from an instruction source and preparing the instructions for execution including:

an instruction cache coupled to the instruction source and having a plurality of instruction storage elements and a corresponding plurality of predecode storage elements, each of the variable-length instructions being stored in one or more instruction storage elements in the memory alignment and the predecode storage elements for storing predecode information corresponding to the variable-length instructions stored in each instruction storage element;

a predecoder coupled to the instruction cache for accessing the variable-length instructions and assigning predecode information indicative of instruction length to the predecode storage elements assuming each instruction storage element stores a first instruction byte of a variable-length instruction;

a buffer circuit coupled to the predecoder for holding the variable-length instructions and the corresponding predecode information, converting the variable length instructions from the memory alignment to an instruction alignment, and designating the first instruction byte location of a variable-length instruction; and a decoder circuit coupled to the instruction cache to receive the variable-length instructions in the instruction alignment and the predecode information, the decoder circuit including a plurality of decoders for receiving a plurality of variable-length instructions, each beginning at the designated first instruction byte locations, and decoding the plurality of variable-length instructions in parallel.

76. A multimedia computer system according to claim 75 further comprising:

a multimedia signal acquisition device.

77. A multimedia computer system according to claim 76 wherein:

the multimedia performance device includes a motion video display selected from the group of televisions, high-definition televisions and high resolution computer monitors;

the multimedia signal acquisition device includes a video camera; and the multimedia adapter includes a motion video adapter.

78. A multimedia computer system according to claim 77 wherein:

the multimedia performance device includes a video frame buffer.

79. A multimedia computer system according to claim 77 wherein:

the multimedia adapter performance device includes a system for video encoding and decoding in accordance with Moving Pictures Expert Group (MPEG) standards.

80. A multimedia computer system according to claim 75 wherein:

the multimedia performance device includes a video frame buffer and a graphics display selected from the group of televisions, high-definition televisions and high resolution computer monitors; and the multimedia adapter includes a graphics adapter selected from the group of SVGA, XGA, VESA, CGA and Hercules graphic standard adapters.

81. A multimedia computer system according to claim 75 wherein:

the multimedia performance device includes an audio performance device selected from among the group of mixing consoles, signal processing devices, synthesizers, MIDI sequencers, power amplifiers and speakers; and the multimedia adapter includes an audio adapter selected from among the group of D/A interfaces and A/D interfaces.

82. A multimedia computer system according to claim 81 further comprising:

a multimedia signal acquisition device including an audio signal acquisition device selected from among the group including microphones, signal processing devices and digital samplers.

83. A multimedia computer system according to claim 75 further comprising:

an SCSI adapter coupled to the input/output bus; and a read/write storage media coupled to the SCSI adapter for storing and accessing data including multimedia data.

84. A multimedia computer system according to claim 83 wherein the read/write storage media include media selected from among the group of magnetic disk drives, magnetic tape drives and CD-ROM drives.

85. A multimedia computer system according to claim 75 further comprising:

a local area network (LAN) adapter coupled to the input/output bus.

* * * * *

UNITED STATES PATENT AND TRADEMARK OFFICE
CERTIFICATE OF CORRECTION

PATENT NO.    : 5,819,056
ISSUE DATE    : October 6, 1998
INVENTOR(S)   : Favor, John G.

It is certified that error appears in the above-identified patent and that said Letters Patent is hereby corrected as shown below:

Column 46, line 52; please delete "08/649,847" and insert --08/649,243--.

Signed and Sealed this

Seventh Day of September, 1999

Attest:

Q. TODD DICKINSON

Attesting Officer

Acting Commissioner of Patents and Trademarks